United States Patent
Yanai et al.

(10) Patent No.: US 8,879,162 B2
(45) Date of Patent: Nov. 4, 2014

(54) ZOOM LENS AND IMAGE PICKUP APPARATUS EQUIPPED WITH SAME

(75) Inventors: Tetsuya Yanai, Kodaira (JP); Mayu Miki, Musashino (JP); Masahiro Imamura, Hachioji (JP); Toshihide Nozawa, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 429 days.

(21) Appl. No.: 13/291,436

(22) Filed: Nov. 8, 2011

(65) Prior Publication Data

US 2012/0113312 A1 May 10, 2012

(30) Foreign Application Priority Data

Nov. 9, 2010 (JP) ................................. 2010-250912
Apr. 15, 2011 (JP) ................................. 2011-091466

(51) Int. Cl.
*G02B 15/14* (2006.01)

(52) U.S. Cl.
USPC ........... 359/680; 359/682; 359/689; 359/691; 359/716; 359/717; 359/740; 359/749

(58) Field of Classification Search
USPC ......... 359/680, 682, 689, 691, 716, 717, 740, 359/749, 753
See application file for complete search history.

(56) References Cited

U.S. PATENT DOCUMENTS

| | | | |
|---|---|---|---|
| 7,180,679 B2 | 2/2007 | Nose et al. | |
| 7,233,448 B2 | 6/2007 | Imamura | |
| 7,742,236 B2 | 6/2010 | Ohata | |
| 8,279,533 B2 | 10/2012 | Tomioka | |
| 8,405,918 B2 | 3/2013 | Kato et al. | |
| 2005/0200968 A1 | 9/2005 | Nose et al. | |
| 2006/0072211 A1 | 4/2006 | Imamura | |
| 2009/0091843 A1 | 4/2009 | Ohata | |
| 2009/0153979 A1 | 6/2009 | Ichikawa et al. | |
| 2011/0096407 A1* | 4/2011 | Ohata et al. | 359/686 |
| 2011/0170202 A1 | 7/2011 | Tomioka | |
| 2012/0044577 A1 | 2/2012 | Kato et al. | |

FOREIGN PATENT DOCUMENTS

| | | |
|---|---|---|
| JP | 2003-084197 | 3/2003 |
| JP | 2005-258064 | 9/2005 |
| JP | 2006-023437 | 1/2006 |
| JP | 2009-092740 | 4/2009 |
| JP | 2009-163222 | 7/2009 |
| JP | 2009-237477 | 10/2009 |
| JP | 2011-141465 | 7/2011 |
| JP | 2012-042811 | 3/2012 |

* cited by examiner

*Primary Examiner* — Evelyn A. Lester
(74) *Attorney, Agent, or Firm* — Kenyon & Kenyon LLP

(57) ABSTRACT

A zoom lens comprises, in order from its object side, a first lens unit having a negative refractive power and a second lens unit having a positive refractive power. The first lens unit comprises a first lens having a negative refractive power and a second lens having a positive refractive power. The zoom lens satisfies the following conditional expressions (1), (2), and (3):

$$n_{1n} \leq 1.70 \quad (1),$$

$$n_{1p} \leq 1.70 \quad (2), \text{ and}$$

$$|\nu_{1n} - \nu_{1p}| \geq 31 \quad (3),$$

where $n_{1n}$ is the refractive index of the first lens having a negative refractive power in the first lens unit for the d-line, $\nu_{1n}$ is the Abbe constant of the first lens having a negative refractive power in the first lens unit, $n_{1p}$ is the refractive index of the second lens having a positive refractive power in the first lens unit for the d-line, and $\nu_{1p}$ is the Abbe constant of the second lens having a positive refractive power in the first lens unit.

26 Claims, 41 Drawing Sheets

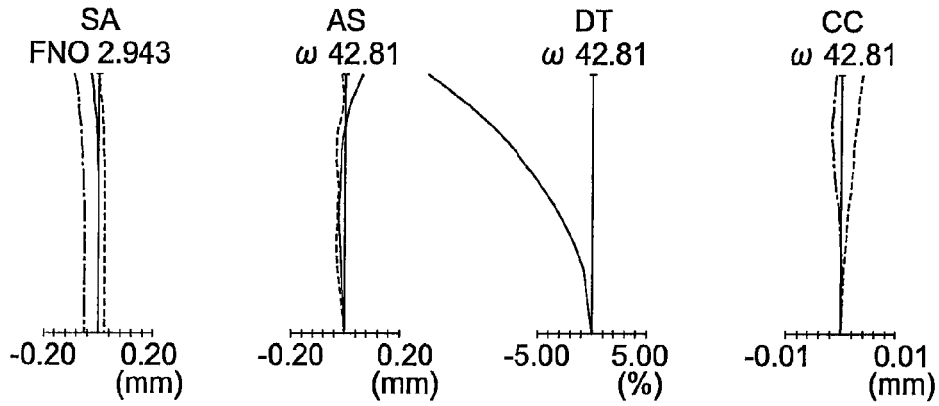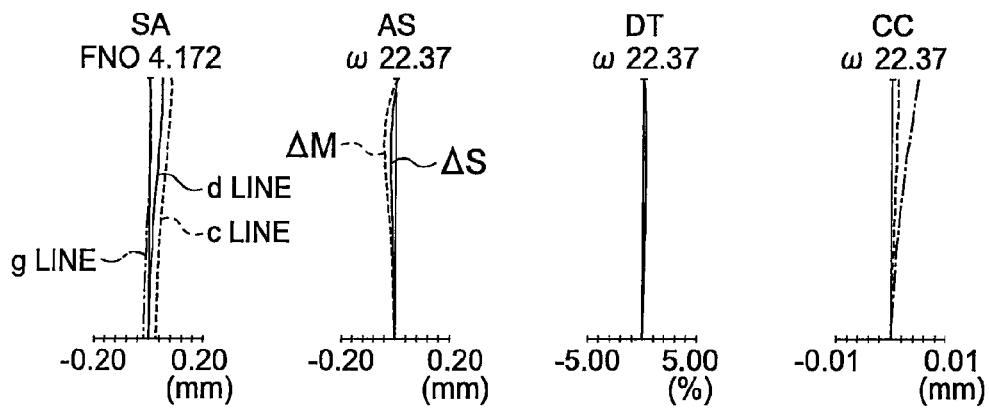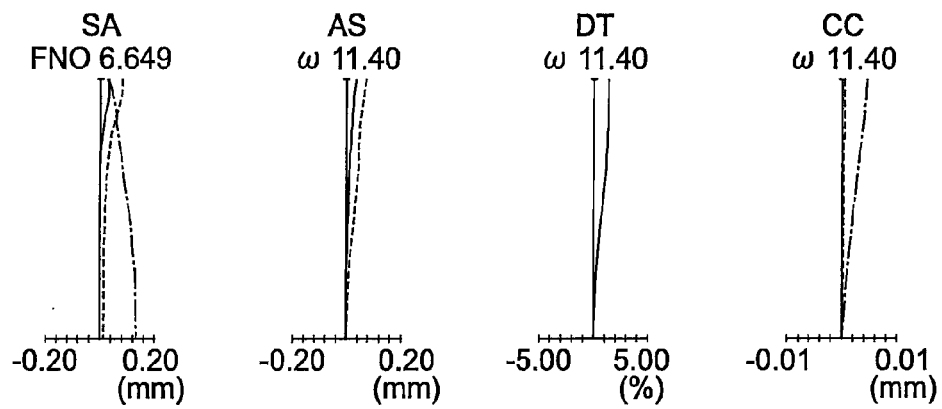

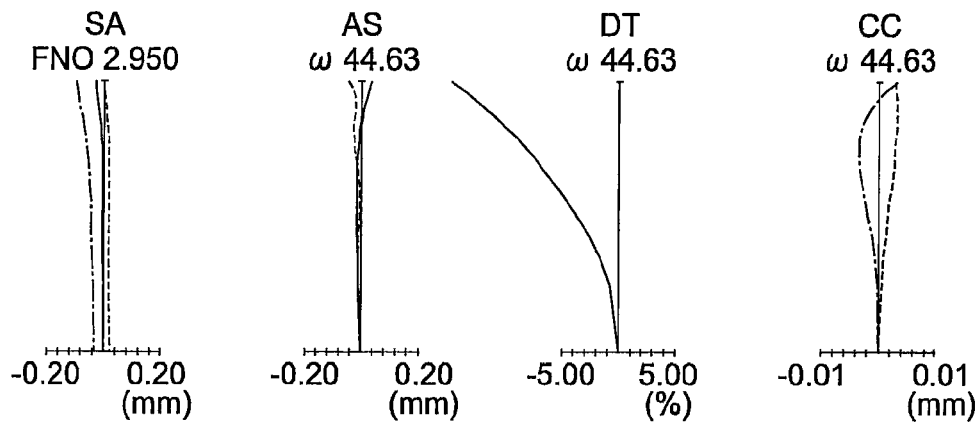
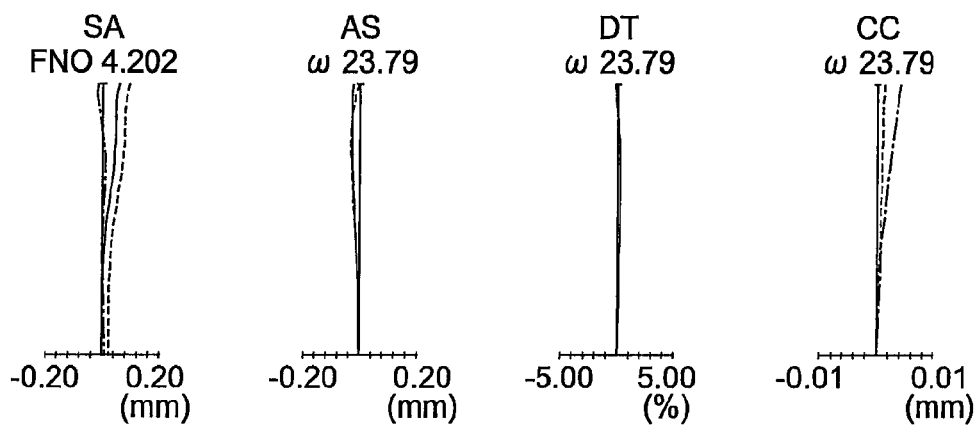
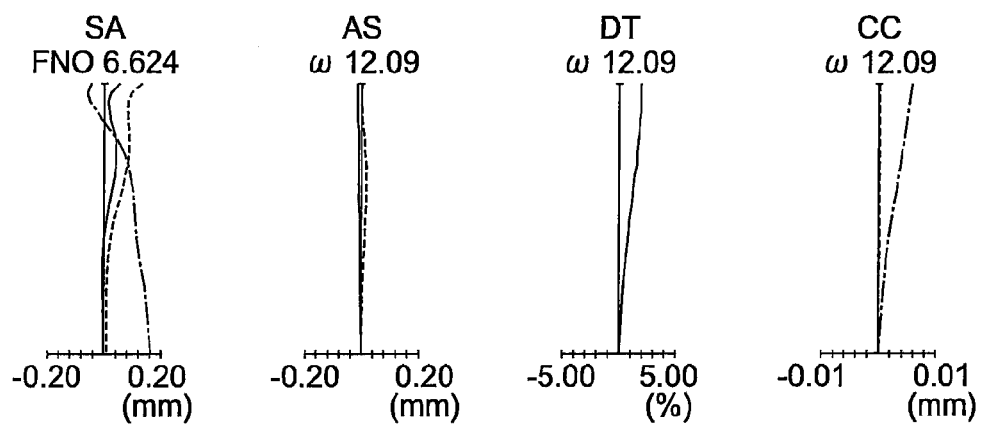

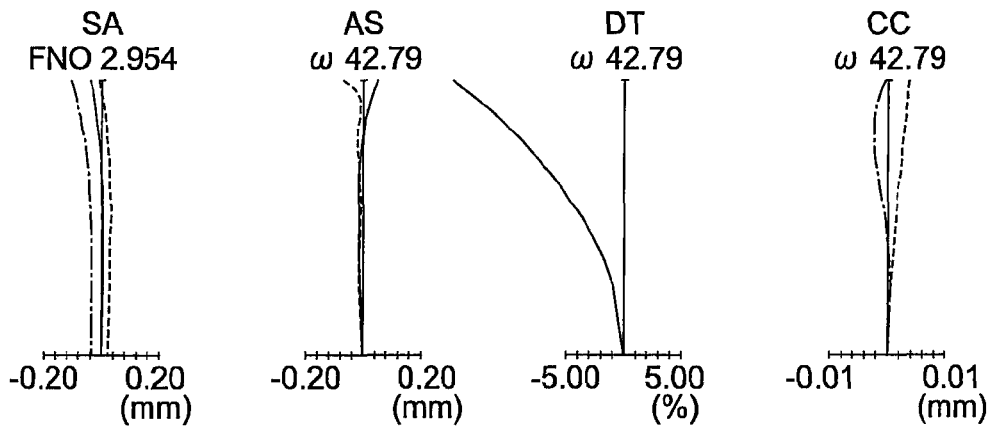
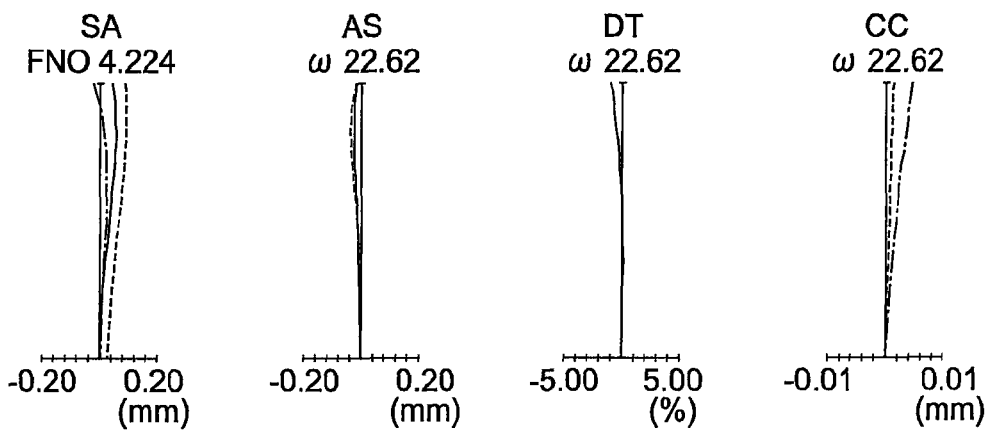
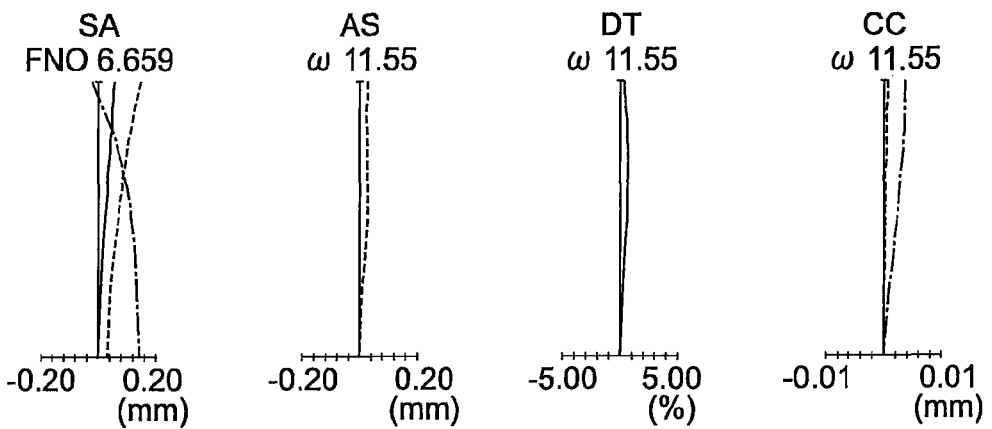

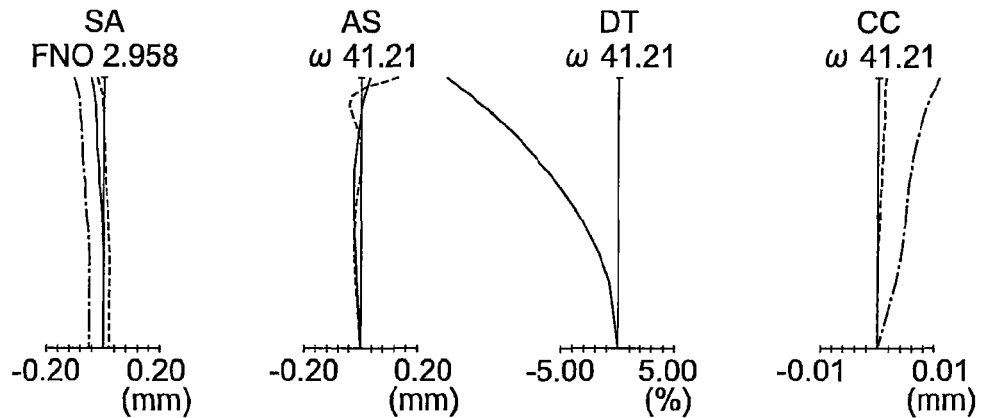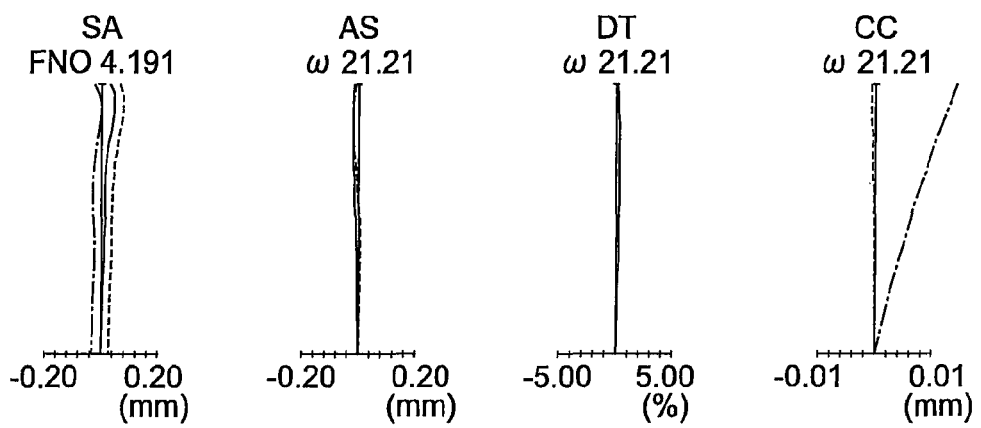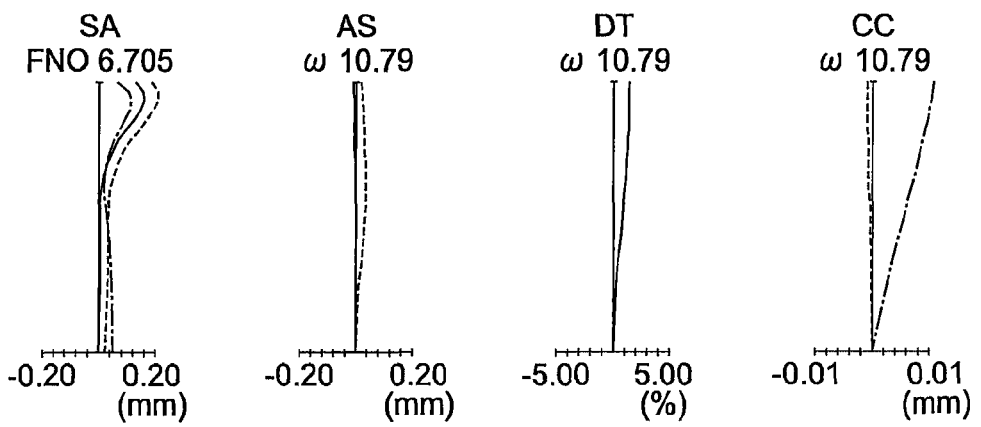

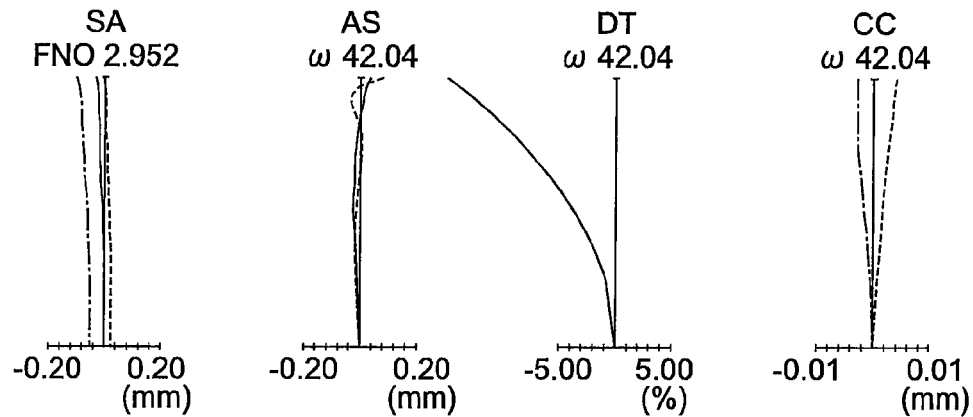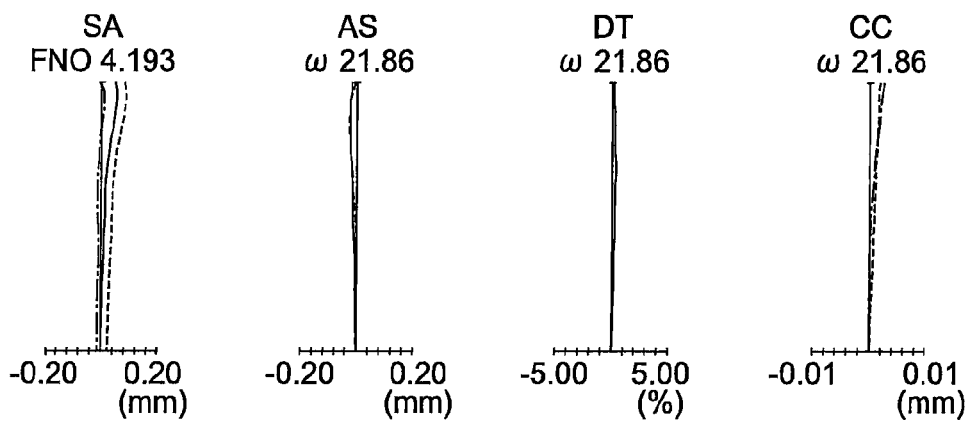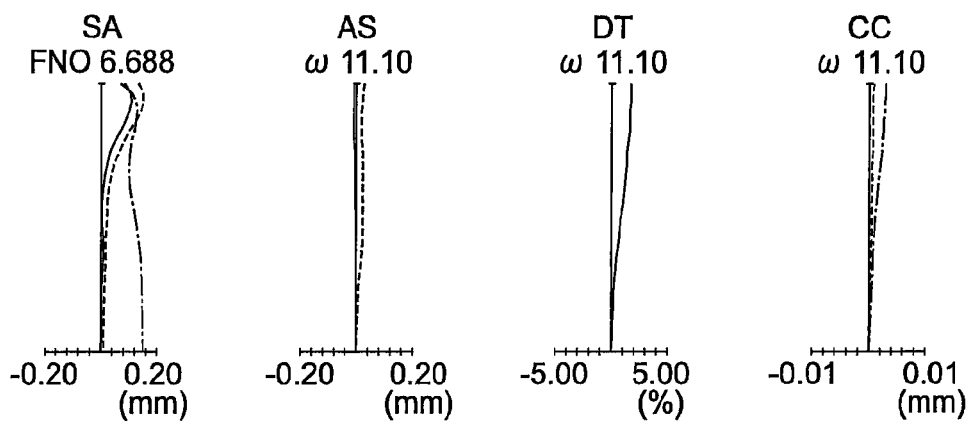

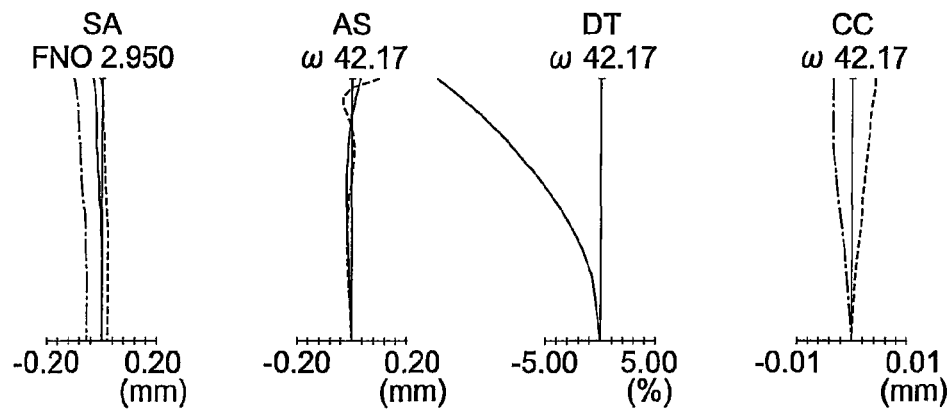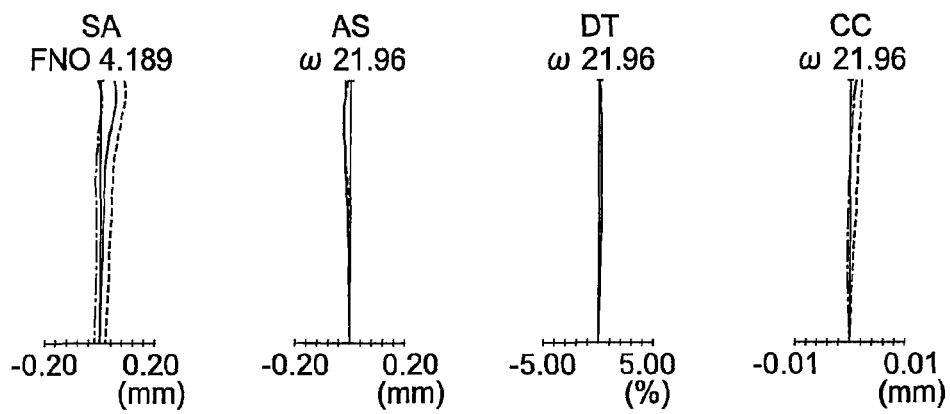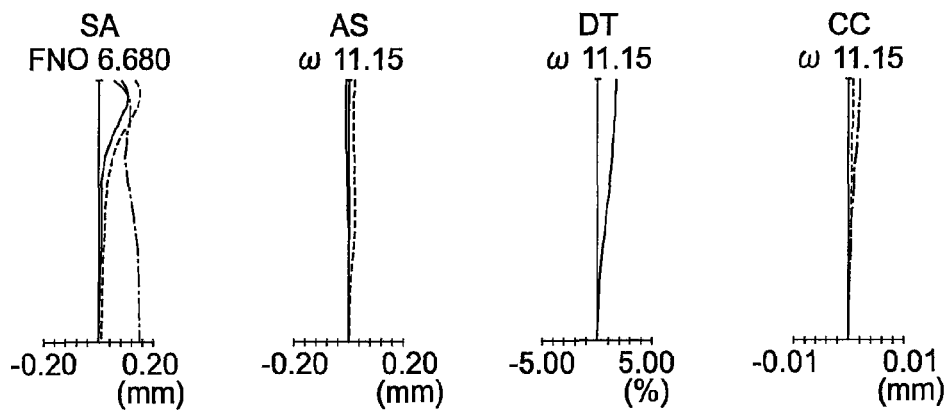

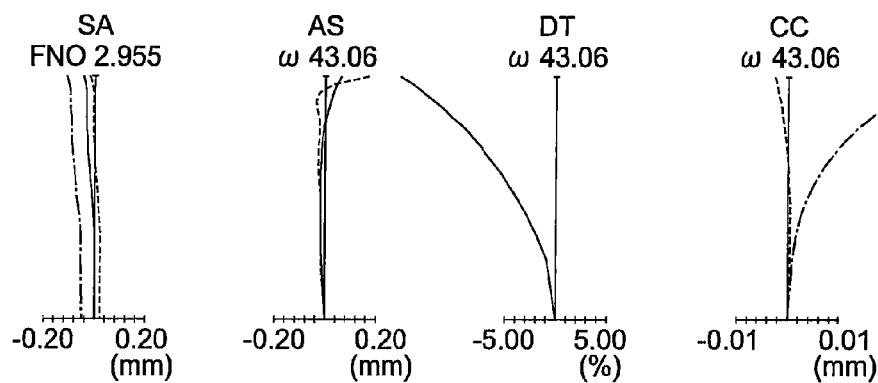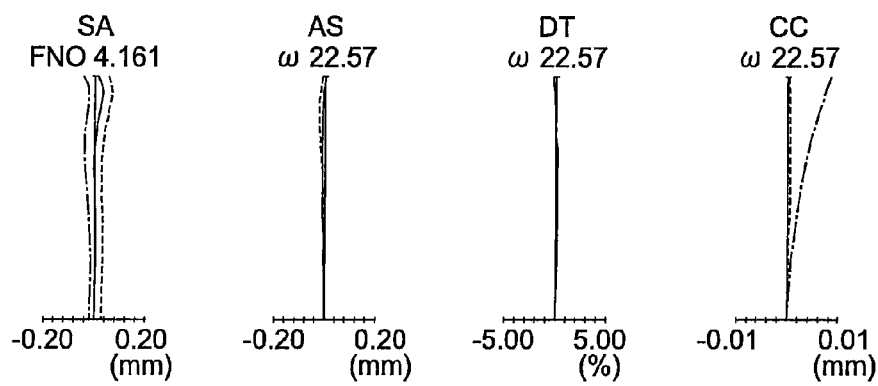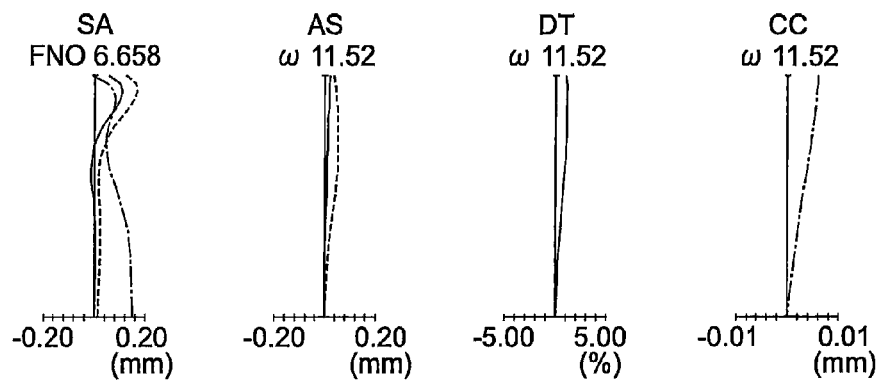

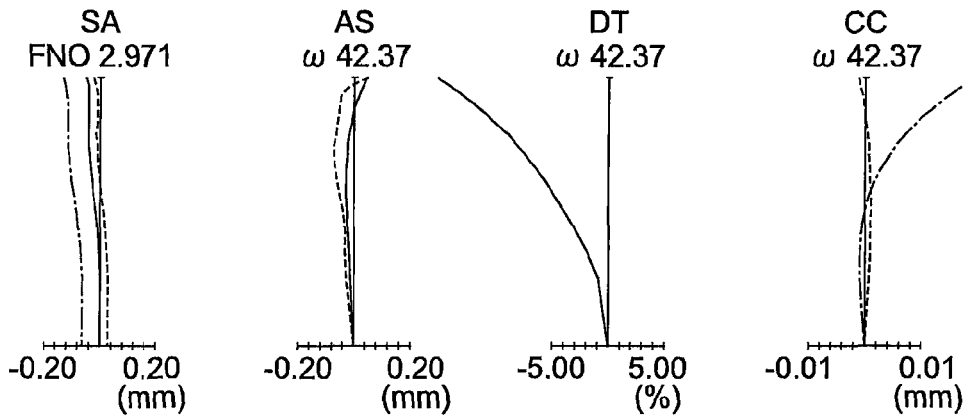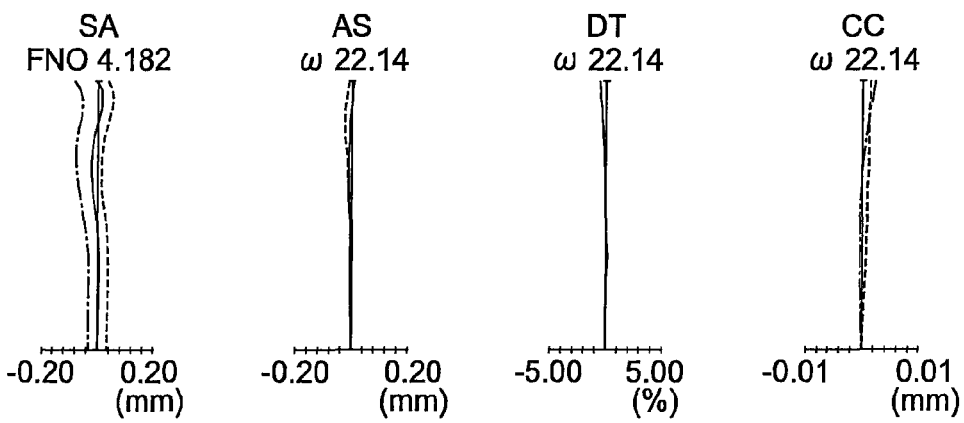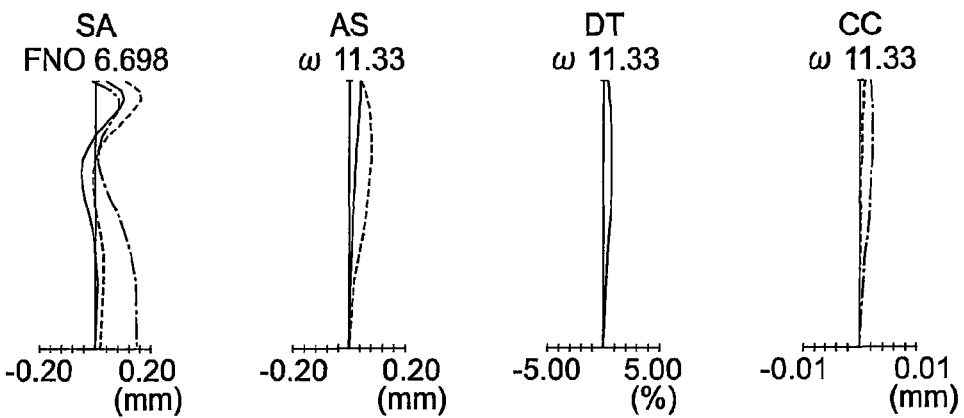

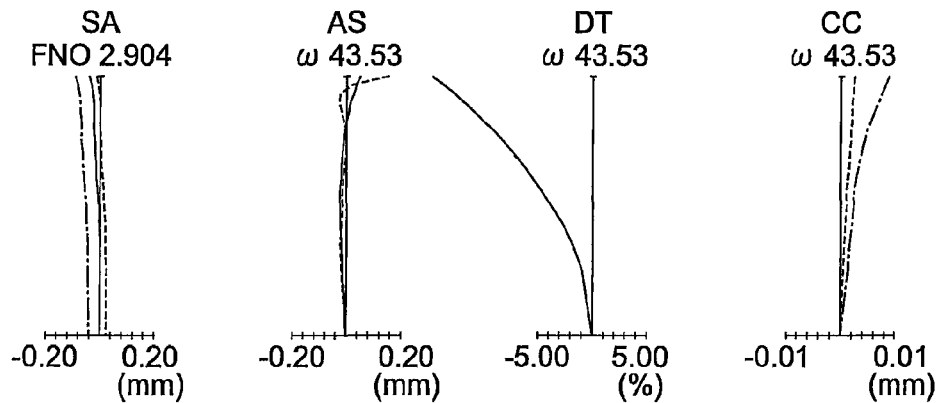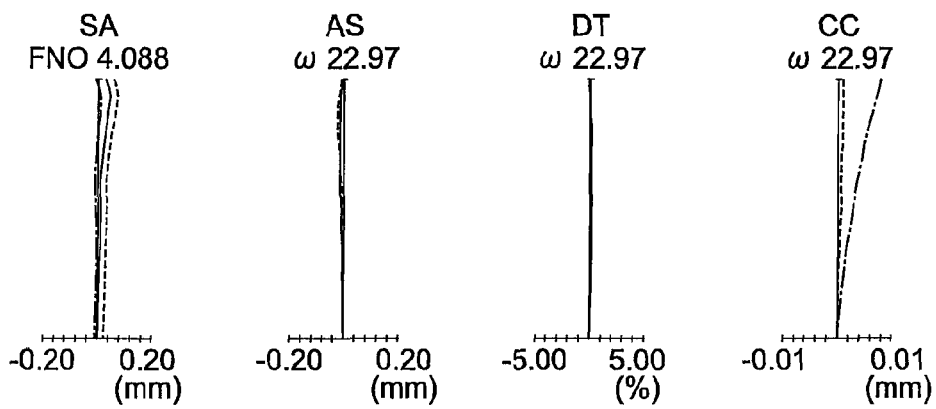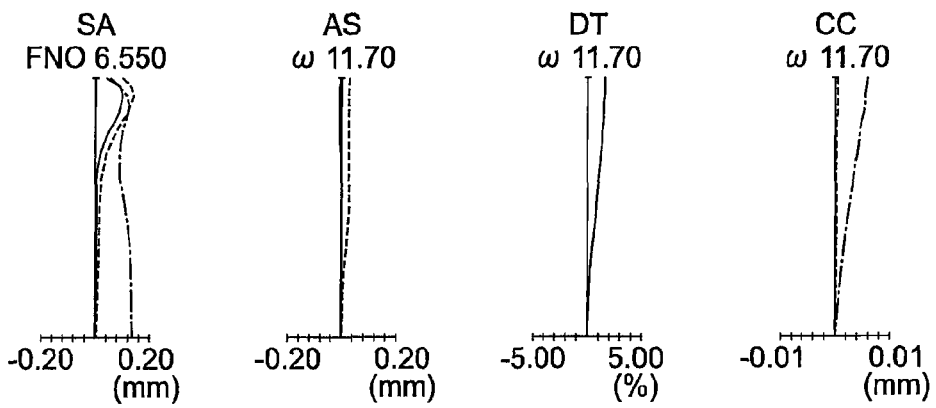

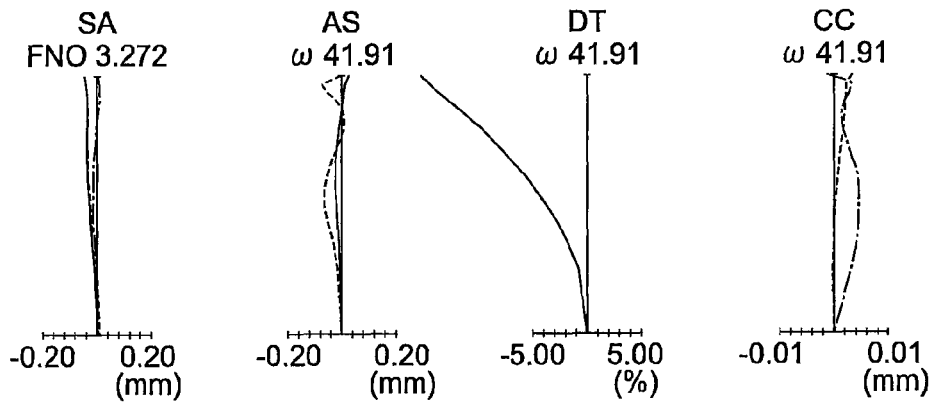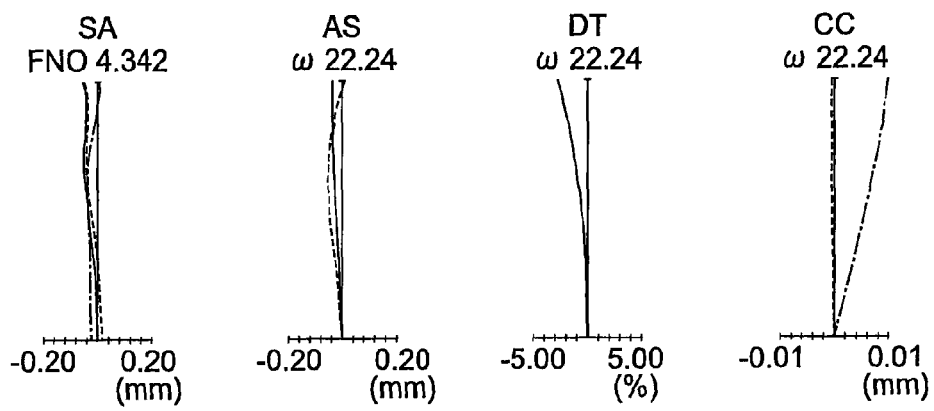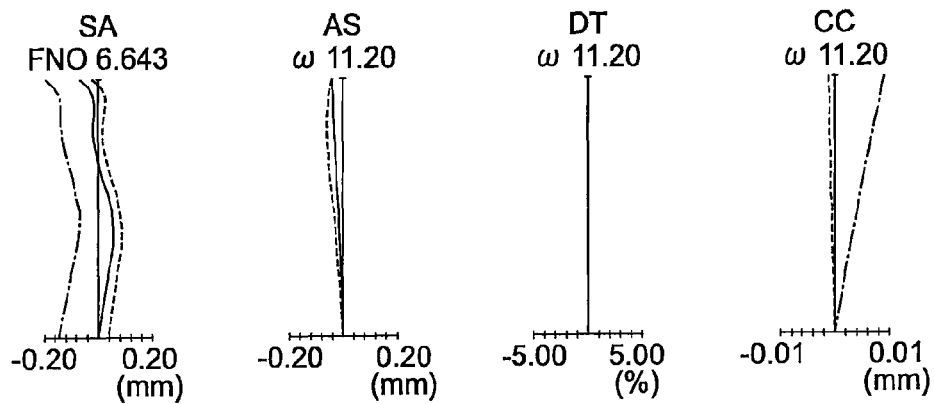

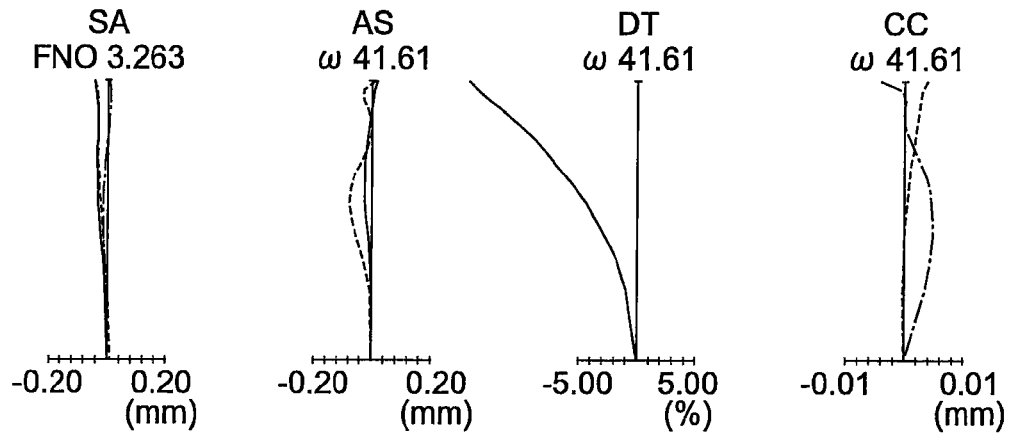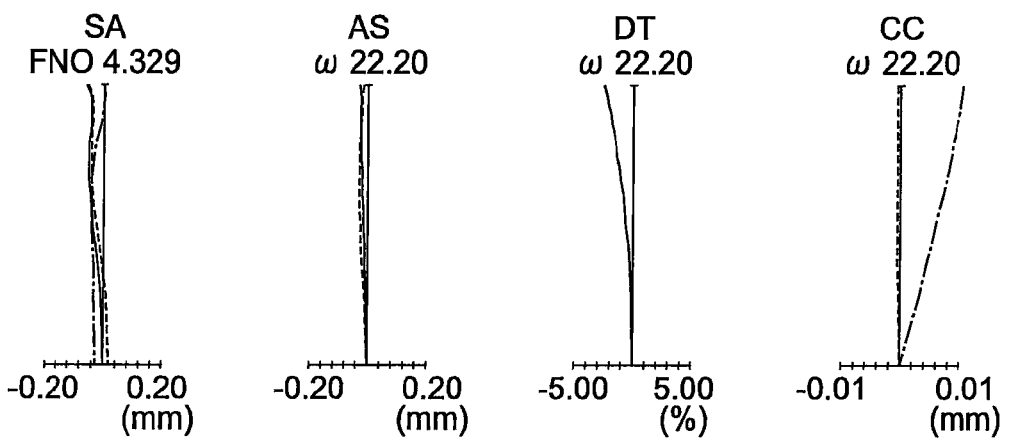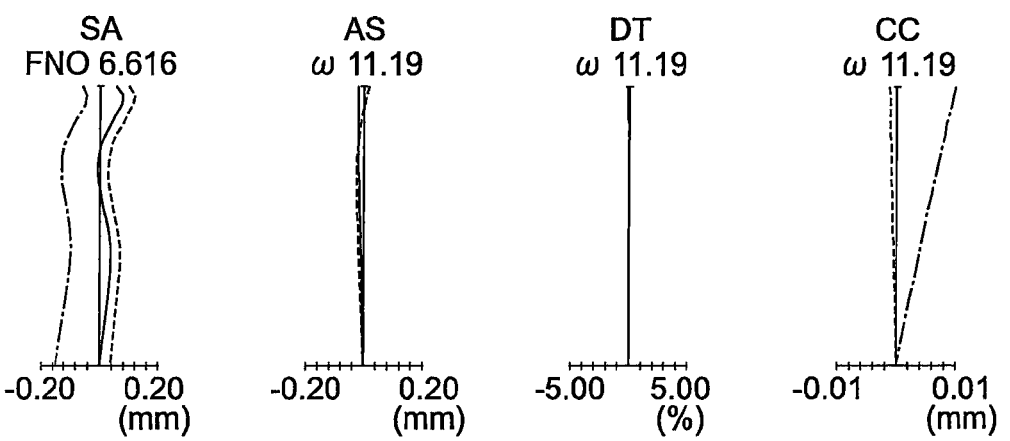

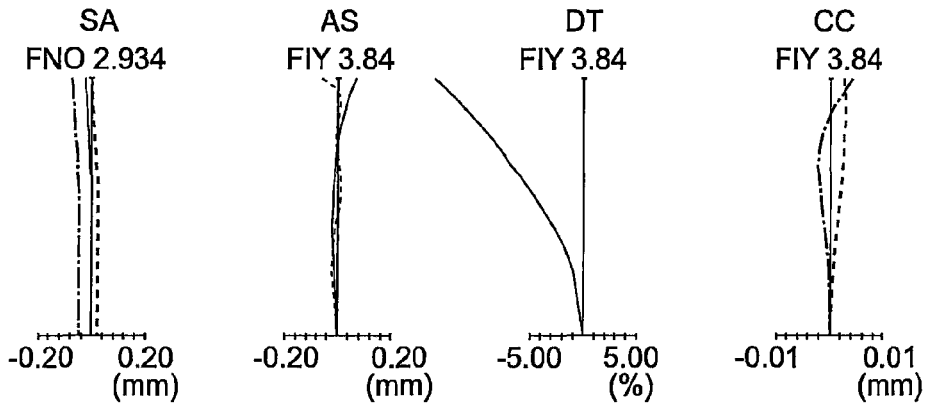
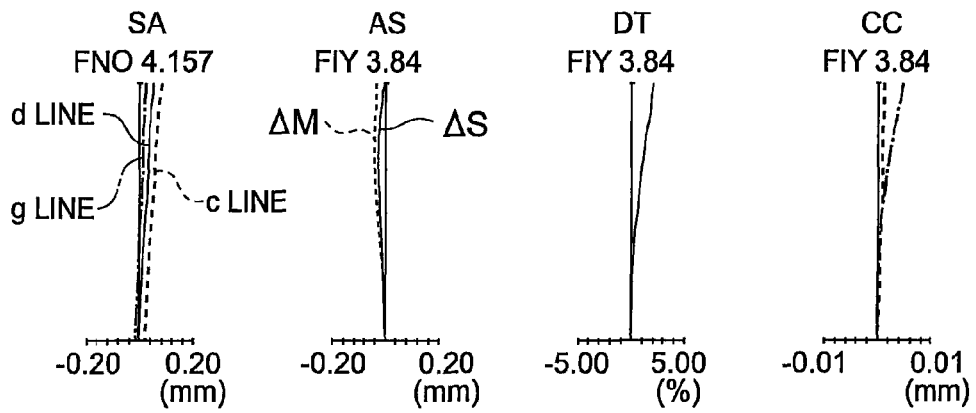
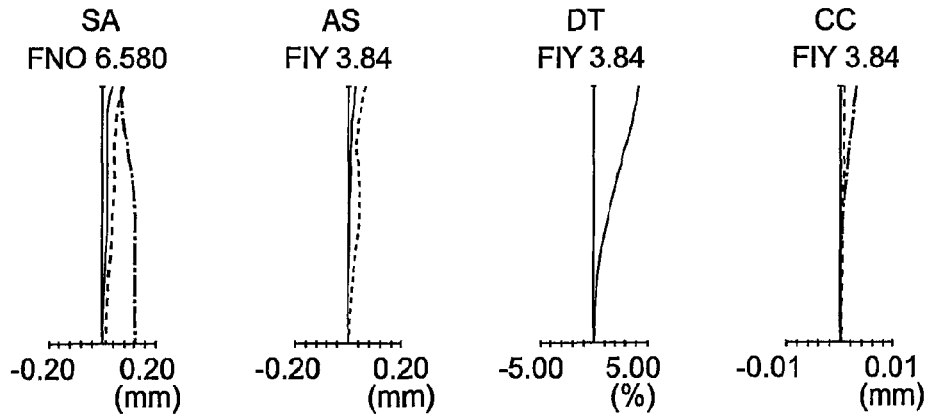

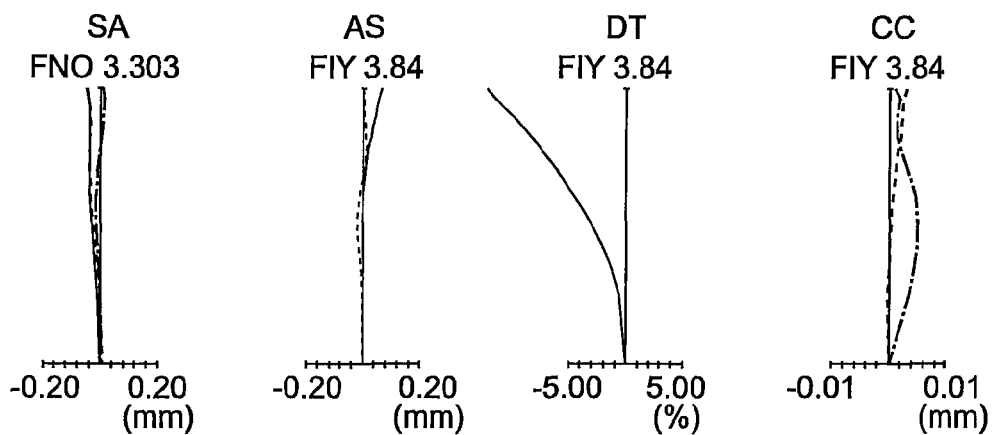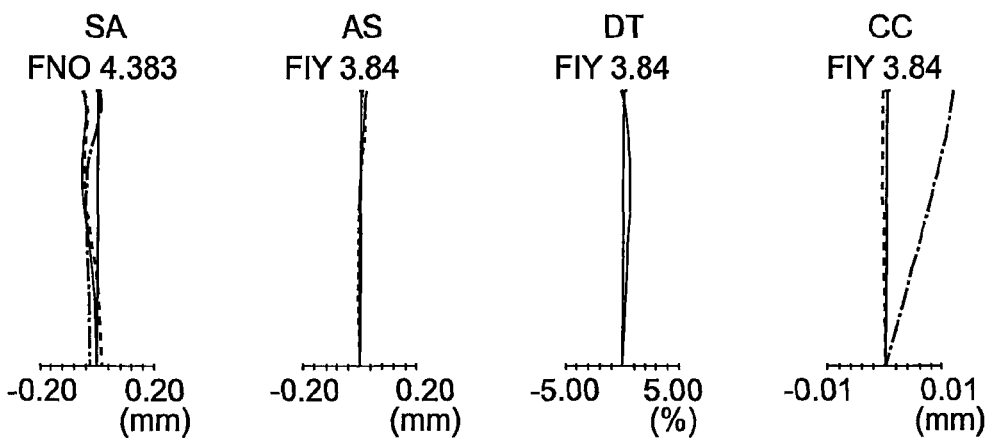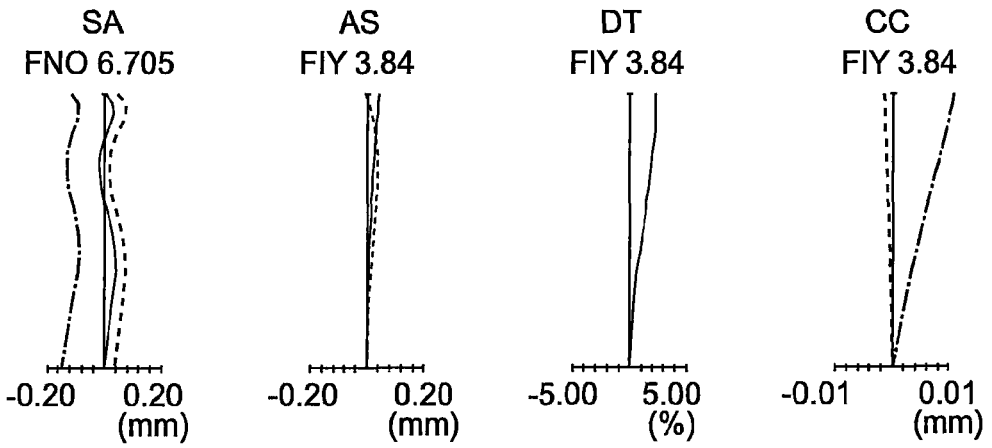

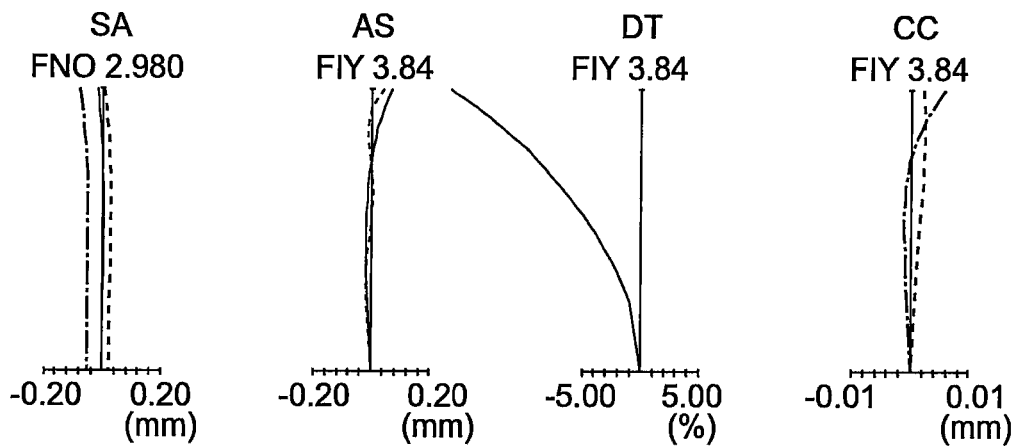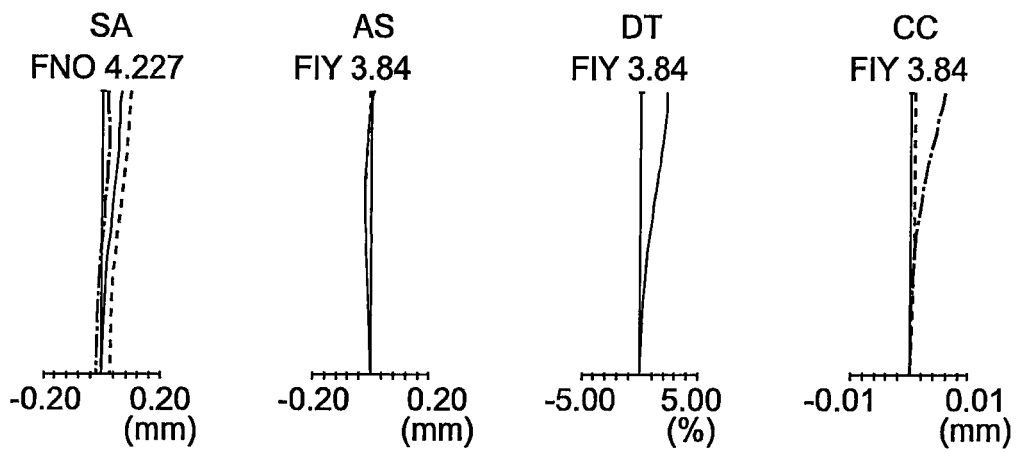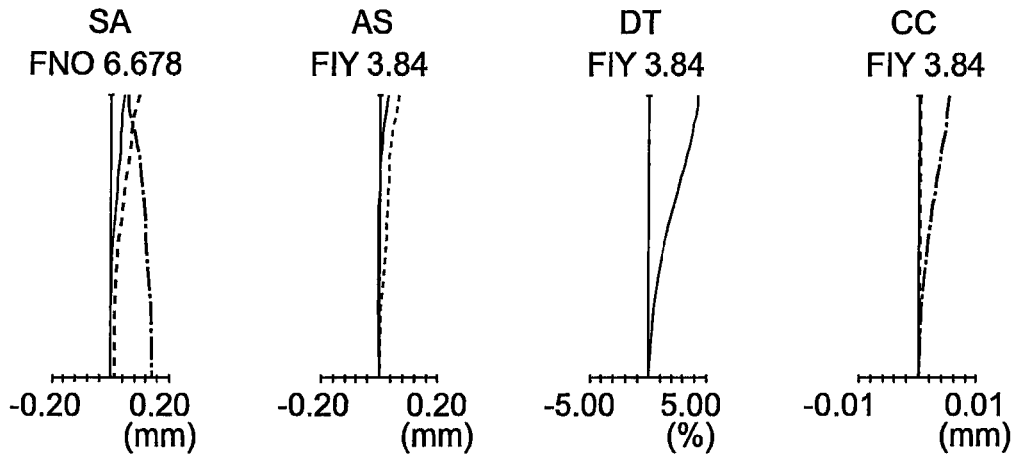

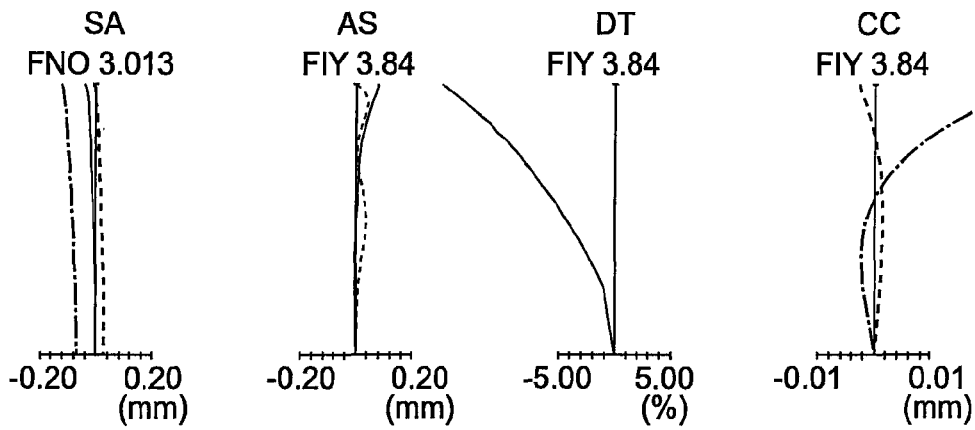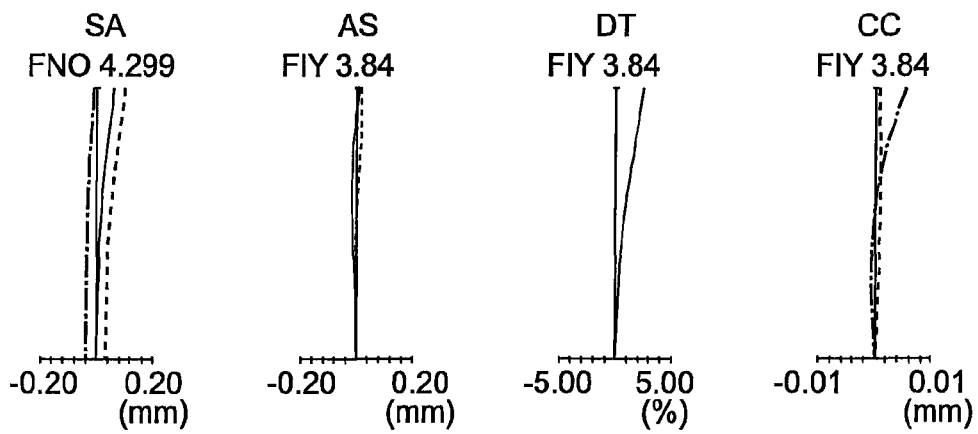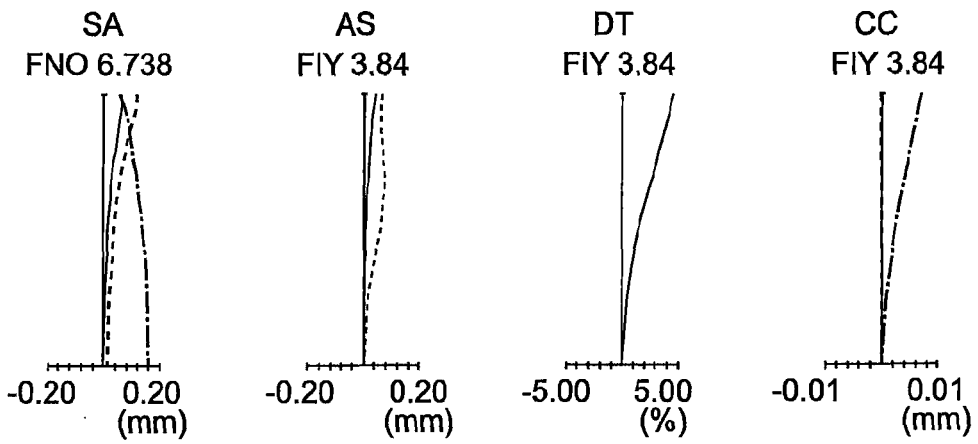

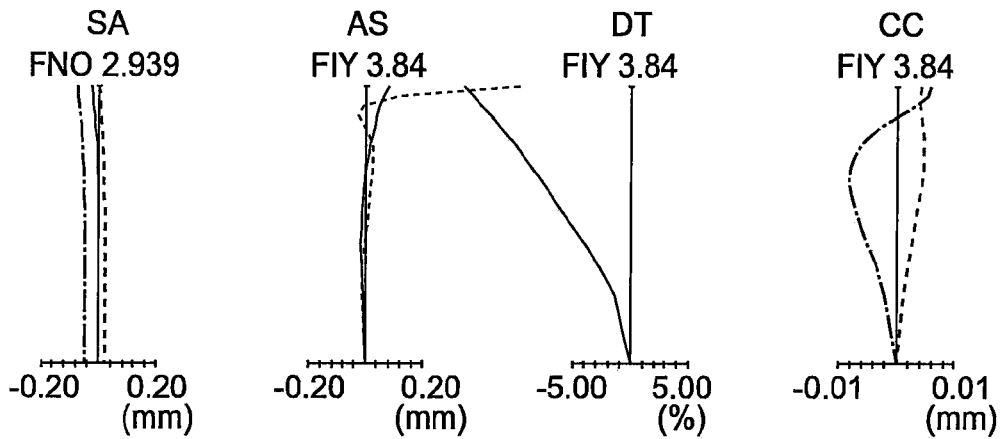
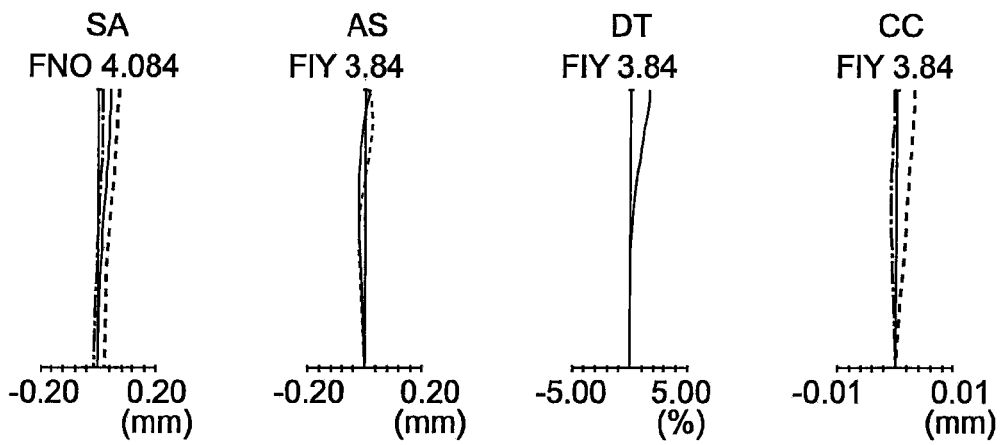
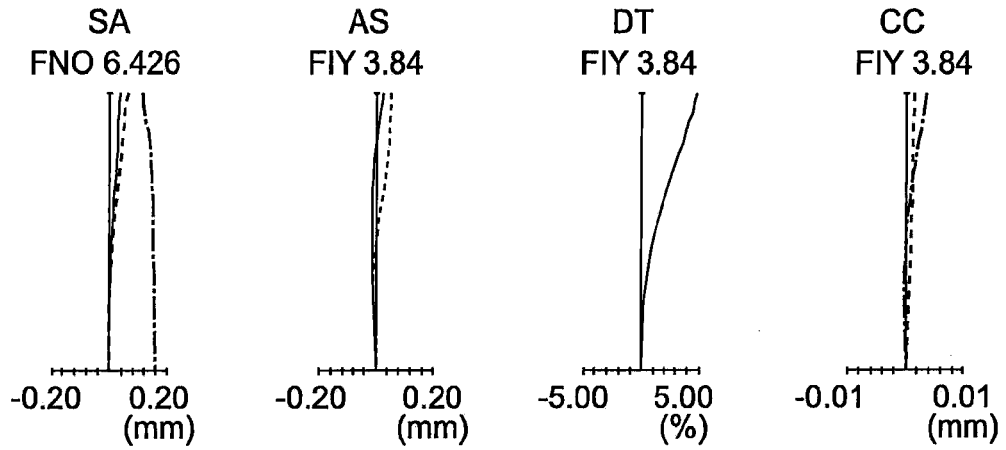

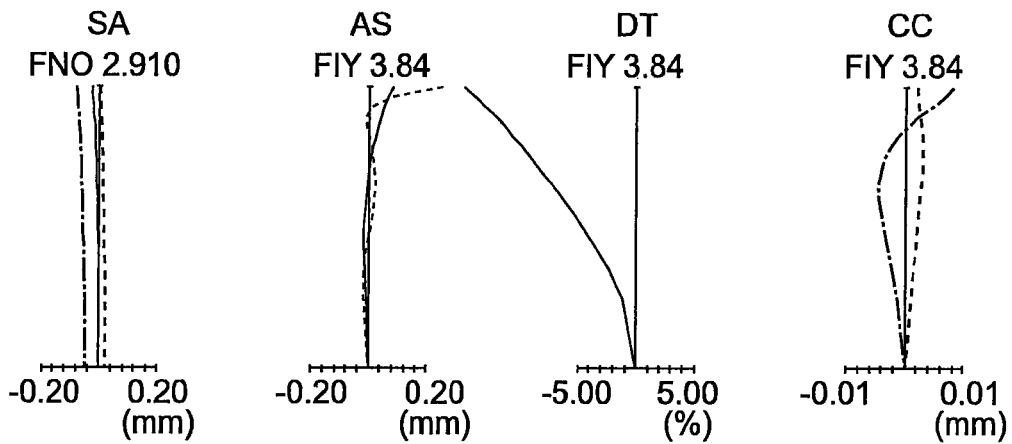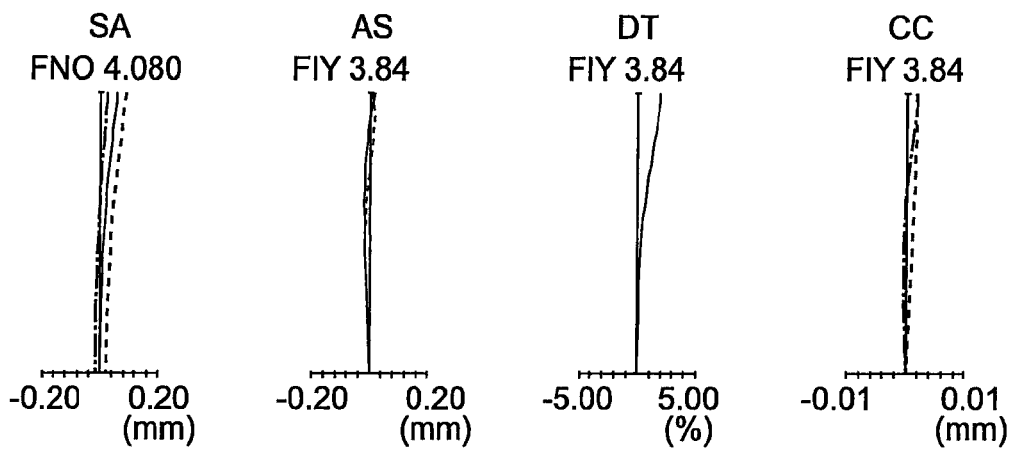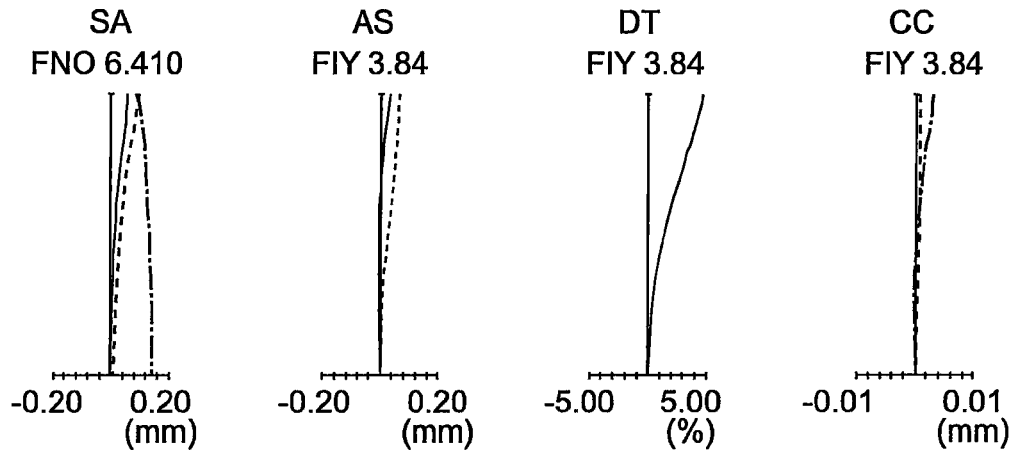

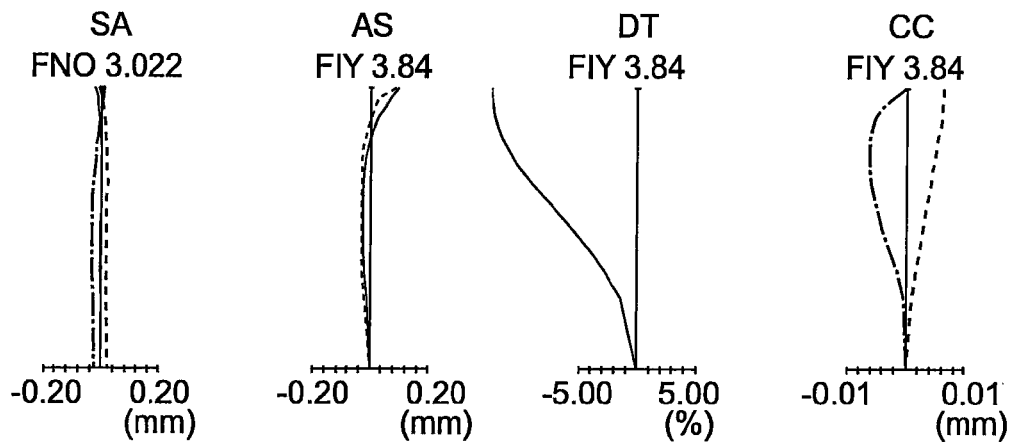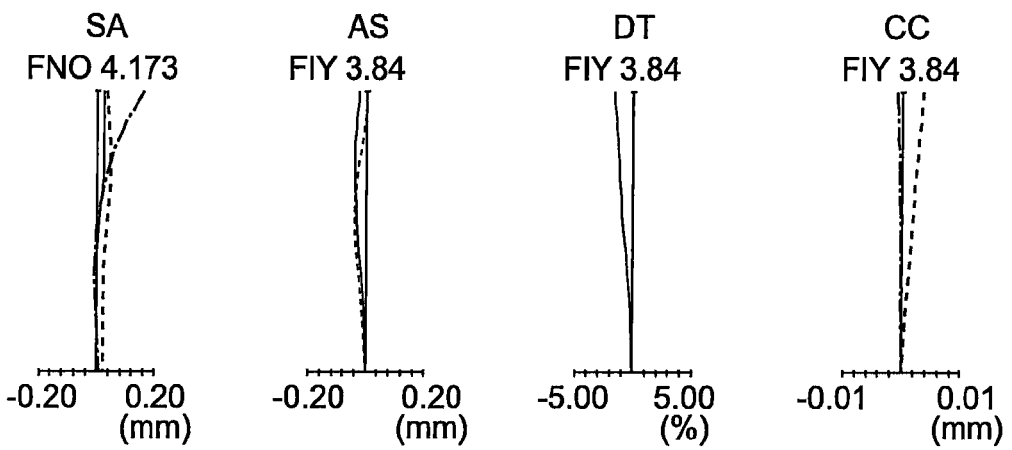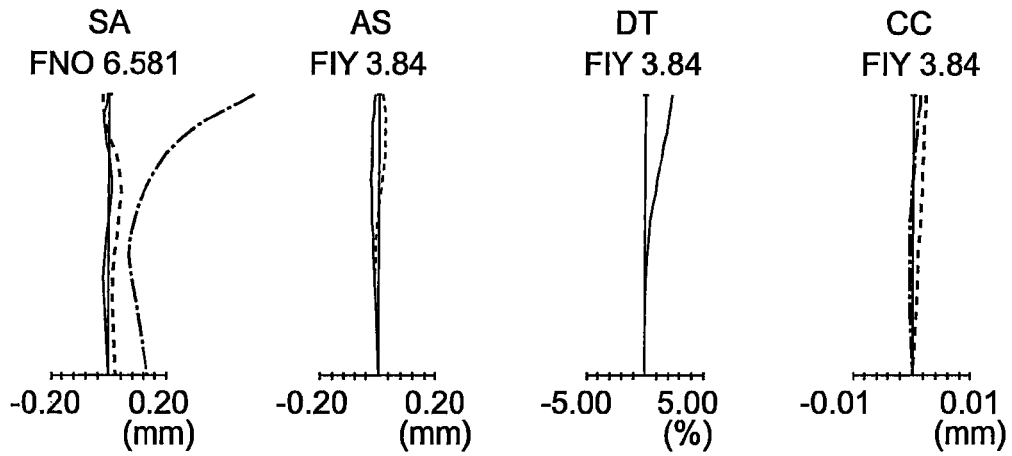

ZOOM LENS AND IMAGE PICKUP APPARATUS EQUIPPED WITH SAME

CROSS-REFERENCE TO RELATED APPLICATION

The present application is based upon and claims the benefit of priority from the prior Japanese Patent Application Nos. 2010-250912 filed on Nov. 9, 2010 and 2011-091466 filed on Apr. 15, 2011; the entire contents of which are incorporated herein by reference.

BACKGROUND OF THE INVENTION

1. Field of the Invention

The present invention relates to a zoom lens and an image pickup apparatus equipped with the same, in particular to a zoom lens suitable for use in a compact digital camera.

2. Description of the Related Art

In recent years, digital cameras that pick up an image of an object using a solid state image pickup element such as a CCD or CMOS have replaced film cameras and become the mainstream. Furthermore, various categories of digital cameras ranging from popular-priced compact type cameras to function-rich cameras for professionals have been developed. In the present invention, compact, popular-priced cameras are particularly focused on.

Users of such popular-priced compact digital cameras generally wish to enjoy easy and simple shooting in various shooting situations anywhere at any time. For this reason, such users favor small size digital cameras, especially cameras that are small with respect to the thickness direction and can be conveniently carried in a pocket of clothes or a bag. Therefore, a further reduction in the size of the taking lens system is demanded.

As to the angle of view, a wider angle of view is desired. Therefore, low-price, bright (or fast) zoom lenses with high optical performance having a high zoom ratio exceeding 3 and a zoom range reaching to a wide diagonal angle of view larger than 70 degrees are demanded.

As a prior art zoom lens that is bright and has a relatively wide angle of view, a zoom lens including in order from the object side a first lens unit having a negative refractive power, a second lens unit having a positive refractive power, a third lens unit having a positive refractive power, and a fourth lens unit has been known as disclosed in Japanese Patent Application Laid-Open No. 2009-163222.

The optical system disclosed in Japanese Patent Application Laid-Open No. 2009-163222 has a compact overall size while having a wide angle of view and a high zoom ratio of approximately 4. To achieve these specifications, lenses having high refractive powers are used in the zoom lens. In particular, the negative first lens in the first lens unit having a negative refractive power has a high refractive power. To achieve this, a grass material having a high refractive index is used in the optical system.

SUMMARY OF THE INVENTION

A zoom lens according to a first aspect of the present invention comprises, in order from its object side:
a first lens unit having a negative refractive power; and
a second lens unit having a positive refractive power, wherein
the first lens unit comprises a first lens having a negative refractive power and a second lens having a positive refractive power, and
the zoom lens satisfies the following conditional expressions (1), (2), and (3):

$$n_{1n} \leq 1.70 \tag{1},$$

$$n_{1p} \leq 1.70 \tag{2, and}$$

$$|v_{1n} - v_{1p}| \geq 31 \tag{3},$$

where $n_{1n}$ is the refractive index of the first lens having a negative refractive power in the first lens unit for the d-line, $v_{1n}$ is the Abbe constant of the first lens having a negative refractive power in the first lens unit, $n_{1p}$ is the refractive index of the second lens having a positive refractive power in the first lens unit for the d-line, and $v_{1p}$ is the Abbe constant of the second lens having a positive refractive power in the first lens unit.

A zoom lens according to a second aspect of the present invention comprises, in order from the object side:
a first lens unit having a negative refractive power;
a second lens unit having a positive refractive power; and
a third lens unit having a positive refractive power, wherein
the first lens unit comprises a first lens having a negative refractive power and a second lens having a positive refractive power, and
the zoom lens satisfies the following conditional expressions (1), (2), and (3):

$$n_{1n} \leq 1.70 \tag{1},$$

$$n_{1p} \leq 1.70 \tag{2, and}$$

$$|v_{1n} - v_{1p}| \geq 31 \tag{3},$$

where $n_{1n}$ is the refractive index of the first lens having a negative refractive power in the first lens unit for the d-line, $v_{1n}$ is the Abbe constant of the first lens having a negative refractive power in the first lens unit, $n_{1p}$ is the refractive index of the second lens having a positive refractive power in the first lens unit for the d-line, and $v_{1p}$ is the Abbe constant of the second lens having a positive refractive power in the first lens unit.

A zoom lens according to a third aspect of the present invention comprises, in order from the object side:
a first lens unit having a negative refractive power;
a second lens unit having a positive refractive power; and
a field lens having no refractive power disposed closest to the image side, wherein
the first lens unit comprises a first lens having a negative refractive power and a second lens having a positive refractive power, and
the zoom lens satisfies the following conditional expressions (1), (2), and (3):

$$n_{1n} \leq 1.70 \tag{1},$$

$$n_{1p} \leq 1.70 \tag{2, and}$$

$$|v_{1n} - v_{1p}| \geq 31 \tag{3},$$

where $n_{1n}$ is the refractive index of the first lens having a negative refractive power in the first lens unit for the d-line, $v_{1n}$ is the Abbe constant of the first lens having a negative refractive power in the first lens unit, $n_{1p}$ is the refractive index of the second lens having a positive refractive power in the first lens unit for the d-line, and $v_{1p}$ is the Abbe constant of the second lens having a positive refractive power in the first lens unit.

An image pickup apparatus according to a fourth aspect of the present invention comprises:
one of the above-described zoom lenses; and
an image pickup element that is disposed on the image side of the zoom lens and converts an optical image formed by the zoom lens into an electrical signal.

An image pickup apparatus according to a fifth aspect of the present invention comprises:
one of the above-described zoom lenses; and
an image pickup element that is disposed on the image side of the zoom lens and converts an optical image formed by the zoom lens into an electrical signal.

BRIEF DESCRIPTION OF THE DRAWINGS

FIGS. 19A, 19B, 19C, 19D, 19E, 19F, 19G, 19H, 19I, 19J, 19K, and 19L show aberrations of the zoom lens according to the first example in the state in which the zoom lens is focused on an object point at infinity;

FIGS. 20A, 20B, 20C, 20D, 20E, 20F, 20G, 20H, 20I, 20J, 20K, and 20L show aberrations of the zoom lens according to the second example in the state in which the zoom lens is focused on an object point at infinity;

FIGS. 21A, 21B, 21C, 21D, 21E, 21F, 21G, 21H, 21I, 21J, 21K, and 21L show aberrations of the zoom lens according to the third example in the state in which the zoom lens is focused on an object point at infinity;

FIGS. 22A, 22B, 22C, 22D, 22E, 22F, 22G, 22H, 22I, 22J, 22K, and 22L show aberrations of the zoom lens according to the fourth example in the state in which the zoom lens is focused on an object point at infinity;

FIGS. 23A, 23B, 23C, 23D, 23E, 23F, 23G, 23H, 23I, 23J, 23K, and 23L show aberrations of the zoom lens according to the fifth example in the state in which the zoom lens is focused on an object point at infinity;

FIGS. 24A, 24B, 24C, 24D, 24E, 24F, 24G, 24H, 24I, 24J, 24K, and 24L show aberrations of the zoom lens according to the sixth example in the state in which the zoom lens is focused on an object point at infinity;

FIGS. 25A, 25B, 25C, 25D, 25E, 25F, 25G, 25H, 25I, 25J, 25K, and 25L show aberrations of the zoom lens according to the seventh example in the state in which the zoom lens is focused on an object point at infinity;

FIGS. 26A, 26B, 26C, 26D, 26E, 26F, 26G, 26H, 26I, 26J, 26K, and 26L show aberrations of the zoom lens according to the eighth example in the state in which the zoom lens is focused on an object point at infinity;

FIGS. 27A, 27B, 27C, 27D, 27E, 27F, 27G, 27H, 27I, 27J, 27K, and 27L show aberrations of the zoom lens according to the ninth example in the state in which the zoom lens is focused on an object point at infinity;

FIGS. 28A, 28B, 28C, 28D, 28E, 28F, 28G, 28H, 28I, 28J, 28K, and 28L show aberrations of the zoom lens according to the tenth example in the state in which the zoom lens is focused on an object point at infinity;

FIGS. 29A, 29B, 29C, 29D, 29E, 29F, 29G, 29H, 29I, 29J, 29K, and 29L show aberrations of the zoom lens according to the eleventh example in the state in which the zoom lens is focused on an object point at infinity;

FIGS. 30A, 30B, 30C, 30D, 30E, 30F, 30G, 30H, 30I, 30J, 30K, and 30L show aberrations of the zoom lens according to the twelfth example in the state in which the zoom lens is focused on an object point at infinity;

FIGS. 31A, 31B, 31C, 31D, 31E, 31F, 31G, 31H, 31I, 31J, 31K, and 31L show aberrations of the zoom lens according to the thirteenth example in the state in which the zoom lens is focused on an object point at infinity;

FIGS. 32A, 32B, 32C, 32D, 32E, 32F, 32G, 32H, 32I, 32J, 32K, and 32L show aberrations of the zoom lens according to the fourteenth example in the state in which the zoom lens is focused on an object point at infinity;

FIGS. 33A, 33B, 33C, 33D, 33E, 33F, 33G, 33H, 33I, 33J, 33K, and 33L show aberrations of the zoom lens according to the fifteenth example in the state in which the zoom lens is focused on an object point at infinity;

FIGS. 34A, 34B, 34C, 34D, 34E, 34F, 34G, 34H, 34I, 34J, 34K, and 34L show aberrations of the zoom lens according to the sixteenth example in the state in which the zoom lens is focused on an object point at infinity;

FIGS. 35A, 35B, 35C, 35D, 35E, 35F, 35G, 35H, 35I, 35J, 35K, and 35L show aberrations of the zoom lens according to the seventeenth example in the state in which the zoom lens is focused on an object point at infinity;

FIGS. 36A, 36B, 36C, 36D, 36E, 36F, 36G, 36H, 36I, 36J, 36K, and 36L show aberrations of the zoom lens according to the eighteenth example in the state in which the zoom lens is focused on an object point at infinity;

DETAILED DESCRIPTION OF THE INVENTION

Figure 1A:
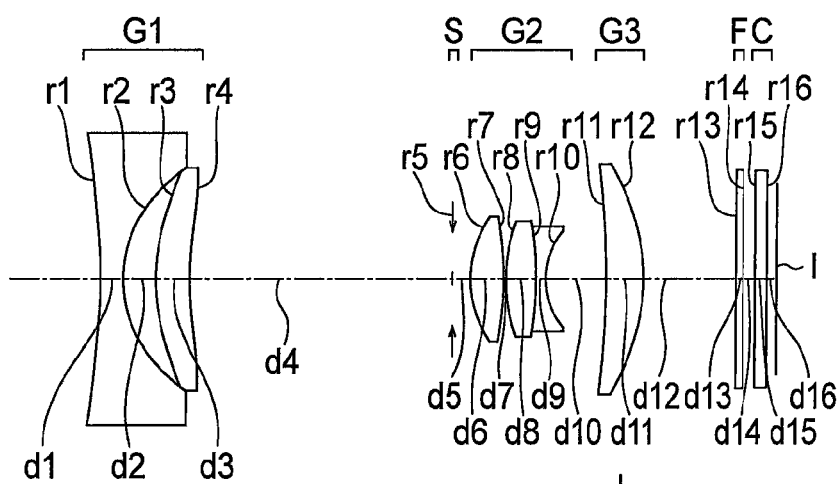
FIGS. 1A, 1B, and 1C are cross sectional views of a zoom lens according to a first example of the present invention in the state in which the zoom lens is focused on an object point at infinity respectively at the wide angle end (FIG. 1A), in an intermediate state (FIG. 1B), and at the telephoto end (FIG. 1C)

A zoom lens according to a first mode of the present invention includes, in order from the object side, a first lens unit having a negative refractive power, a second lens unit having a positive refractive power, wherein the first lens unit includes a first lens having a negative refractive power and a second lens having a positive refractive power, and the zoom lens satisfies the following conditional expressions (1), (2), and (3):

$$n_{1n} \leq 1.70 \quad (1),$$

$$n_{1p} \leq 1.70 \quad (2), \text{ and}$$

$$|v_{1n} - v_{1p}| \geq 31 \quad (3),$$

where $n_{1n}$ is the refractive index of the first lens having a negative refractive power in the first lens unit for the d-line, $v_{1n}$ is the Abbe constant of the first lens having a negative refractive power in the first lens unit, $n_{1p}$ is the refractive index of the second lens having a positive refractive power in the first lens unit for the d-line, and $v_{1p}$ is the Abbe constant of the second lens having a positive refractive power in the first lens unit.

In the following, advantages of the zoom lens and by what reasoning we adopted the above-described lens design will be described.

In this invention, the zoom lens has a retro-focus lens configuration including, in order from the object side, a first lens unit having a negative refractive power and a second lens unit having a positive refractive power. With this optical system design, the zoom optical system can have a relatively long back focus while having a wide angle of view.

If conditional expressions (1) and (2) are satisfied, the refractive indices of the negative first lens and the positive second lens can be made small. This leads to a reduction in the adverse effects of decentering between the first lens and the second lens. In consequence, assembly of the zoom lens will be easy, and the zoom lens can be made compact.

Moreover, the reduction in the adverse effects of decentering allows an optical system design in which the negative first lens and the positive second lens are arranged close to each other. This leads to an increase in the degree of freedom in the compact optical system design.

Satisfying the conditional expression (3) enables excellent correction of color dispersion occurring in the first lens unit. Consequently, aberration correction by the rear lens unit can be made small or eliminated. Therefore, the optical system can be made compact.

It is preferred that the zoom lens according to the first mode of the present invention satisfy the following conditional expression (4):

$$\Sigma d_{1G}/(y \tan(2\omega)) \leq 0.3 \quad (4),$$

where $\Sigma d_{1G}$ is the overall length of the first lens unit, y is the largest image height on the image plane of the zoom lens, and $\omega$ is the half angle of view of the zoom lens at the wide angle end.

Conditional expression (4) is a condition concerning the overall length of the first lens unit. In conditional expression (4), the overall length of the first lens unit is normalized by the largest image height on the image plane of the zoom lens and divided by the tangent of the angle of view of the zoom lens.

If the upper limit of conditional expression (4) is exceeded, the overall length of the first lens unit will become large, or the angle of view at the wide angle end of the zoom range will become small, making it impossible to achieve an optical system having a wide angle of view while being compact as intended in the invention.

It is preferred that the zoom lens according to the first mode of the present invention satisfy the following conditional expression (5) and (6):

$$d_{1nw}/d_{1nc} \geq 3.0 \quad (5), \text{ and}$$

$$f_w/y \leq 1.4 \quad (6),$$

where $d_{1nw}$ is the thickness of the first lens having a negative refractive power in the first lens unit at the position at which an outermost principal ray passes through it at the wide angle end, $d_{1nc}$ is the thickness of the first lens having a negative refractive power in the first lens unit on the optical axis, $f_w$ is the focal length of the zoom lens at the wide angle end, and y is the largest image height on the image plane of the zoom lens.

Conditional expression (5) defines an appropriate range of the ratio of the largest thickness to the smallest thickness of the first lens having a negative refractive power in the first lens unit.

If the lower limit of conditional expression (5) is not reached, the negative first lens cannot have a sufficient refractive power, and it will be difficult to achieve a zoom lens having a high zoom ratio.

In conditional expression (6), the focal length of the zoom lens at the wide angle end is normalized by the largest image height on the image plane of the zoom lens. If the upper limit of conditional expression (6) is exceeded, the focal length at the wide angle end will become large, and the overall length of the optical system will become large. This is detrimental to compactness.

In the zoom lens according to the first mode of present invention, it is also preferred that at least one of the first lens having a negative refractive power and the second lens having a positive refractive power in the first lens unit be a lens made of a resin.

The first lens having a negative refractive power and the second lens having a positive refractive power in the negative first lens unit in the retro-focus type zoom lens are conventionally glass lenses. By replacing at least one of these lenses with a resin lens, the zoom lens can be manufactured at lower cost.

In the zoom lens according to the first mode of the present invention, it is preferred that at least one of the surfaces of the first lens having a negative refractive power and the second lens having a positive refractive power in the first lens unit be an aspheric surface that is shaped in such a way that the deviation of the aspheric surface from the paraxial spherical surface along the direction of the optical axis monotonically increases or monotonically decreases from the center of the lens toward the position at which the outermost principal ray passes.

An aspheric surface in at least one of the lens surfaces of the first lens having a negative refractive power and the second lens having a positive refractive power in the first lens unit can provide excellent correction of astigmatism.

Moreover, if the aspheric surface is shaped in such a way that the deviation of the aspheric surface from the paraxial spherical surface along the direction of the optical axis monotonically increases or monotonically decreases from the center of the lens toward the position at which the outermost principal ray passes, adverse effects of decentering of the first lens having a negative refractive power and the second lens having a positive refractive power can be made small. This consequently allows a compact design in which the distance between these lenses are small.

It is also preferred that the zoom lens according to the first mode of the present invention satisfy the following conditional expressions (7) and (8):

$$d_{12}/|r_{1nf}| \leq 0.2 \quad (7), \text{ and}$$

$$d_{12}/|r_{1pr}| \leq 0.2 \quad (8),$$

where $d_{12}$ is the air distance between the negative first lens and the positive second lens in the first lens unit, $r_{1nf}$ is the radius of curvature of the object side surface of the negative first lens in the first lens unit, and $r_{1pr}$ is the radius of curvature of the image side surface of the positive second lens in the first lens unit.

In conditional expression (7), the air distance between the negative first lens and the positive second lens in the first lens unit is normalized by the radius of curvature of the object side surface of the negative first lens in the first lens unit.

In conditional expression (8), the air distance between the negative first lens and the positive second lens in the first lens unit is normalized by the radius of curvature of the image side surface of the positive second lens in the first lens unit.

Conditional expressions (7) and (8) are conditions primarily limiting the air distance between the negative first lens and the positive second lens.

If the upper limits of conditional expressions (7) and (8) are exceeded, the air distance $d_{12}$ between the negative first lens and the positive second lens will become large. This will make it difficult to make the optical system compact.

If the upper limits of conditional expressions (7) and (8) are exceeded, otherwise, the radius of curvature of the object side surface of the negative first lens and the radius of curvature of the image side surface of the positive second lens will become small. When this is the case, the negative first lens and the positive second lens will generate large astigmatism and chromatic aberration of magnification, making aberration correction difficult.

It is also preferred that the zoom lens according to the present invention satisfy the following conditional expressions (9) and (10):

$$d_t/y \leq 8.5 \quad (9), \text{ and}$$

$$f_t/f_w \geq 3.0 \quad (10),$$

where $d_t$ is the overall length of the zoom lens at the telephoto end, y is the largest image height on the image plane of the zoom lens, $f_t$ is the focal length of the zoom lens at the telephoto end, and $f_w$ is the focal length of the zoom lens at the wide angle end.

In conditional expression (9), the overall length of the zoom lens at the telephoto end is normalized by the largest image height on the image plane of the zoom lens. Conditional expression (9) is a condition primarily limiting the overall length of the zoom lens at the telephoto end.

If the upper limit of conditional expression (9) is exceeded, the overall length of the zoom lens at the telephoto end will become large, making it impossible to achieve a compact zoom lens design.

Conditional expression (10) relates to the zoom ratio. Conditional expression (9) provides a condition for achieving a high zoom ratio with a compact zoom lens design when conditional expression (9) is satisfied.

It is also preferred that the zoom lens according to the first mode of the present invention satisfy the following conditional expressions (11) and (10):

$$d_w/y \leq 8.1 \quad (11), \text{ and}$$

$$f_t/f_w \geq 3.0 \quad (10),$$

where $d_w$ is the overall length of the zoom lens at the wide angle end, y is the largest image height on the image plane of the zoom lens, $f_t$ is the focal length of the zoom lens at the telephoto end, and $f_w$ is the focal length of the zoom lens at the wide angle end.

In conditional expression (11), the overall length of the zoom lens at the wide angle end is normalized by the largest image height on the image plane of the zoom lens. Conditional expression (11) is a condition primarily limiting the overall length of the zoom lens at the wide angle end.

If the upper limit of conditional expression (11) is exceeded, the overall length of the zoom lens at the wide angle end will become large, making it impossible to achieve a compact zoom lens design.

It is preferred that all the lenses constituting the zoom lens according to the first mode of the present invention each have a refractive index not larger than 1.7.

If a lens having a refractive index larger than 1.7 is used in the zoom lens according to the first mode of the present invention, the variety of glass materials that can be used in this lens are limited. This leads to high cost of the lens, making it difficult to provide a low-price zoom lens.

Furthermore, machining of the lens and aberration correction will become difficult. Moreover, anomalous dispersion will further make aberration correction difficult.

It is also preferred that the zoom lens according to the first mode of the present invention satisfy the following conditional expression (12):

$$\Sigma d_{2G}/(y \tan(2\omega)) \leq 0.35 \quad (12),$$

where $\Sigma d_{2G}$ is the overall length of the second lens unit, and y is the largest image height on the image plane of the zoom lens, and $\omega$ is the half angle of view of the zoom lens at the wide angle end.

Conditional expression (12) is a condition concerning the overall length of the second lens unit. In conditional expression (12), the overall length of the second lens unit is normalized by the largest image height on the image plane of the zoom lens and divided by the tangent of the angle of view of the zoom lens.

If the upper limit of conditional expression (12) is exceeded, the overall length of the second lens unit will become large, or the angle of view at the wide angle end of the zoom range will become small, making it impossible to achieve an optical system having a wide angle of view while being compact as intended in the invention.

It is also preferred that the zoom lens according to the first mode of the present invention satisfy the following conditional expression (13):

$$|f_{air}|/|f_{1G}| \geq 15 \tag{13},$$

where $f_{air}$ is the focal length of the air lens formed between the first lens and the second lens, and $f_{1G}$ is the focal length of the first lens unit.

In conditional expression (13), the focal length of the air lens is normalized by the focal length of the first lens unit. If the lower limit of conditional expression (13) is not reached, the focal length of the air lens will become small (or short), and the radius of curvature of the lens surfaces that define the air lens will become small accordingly. Then, decentering of the negative first lens and the positive second lens will cause a large deterioration in the performance. The air lens provides correction of chromatic aberration generated in the first lens unit. The amount of correction is small to make the overall optical system compact.

It is also preferred that the zoom lens according to the first mode of the present invention satisfy the following conditional expression (14):

$$d_t/(y \tan(2\omega)) \leq 1.7 \tag{14},$$

where $d_t$ is the overall length of the zoom lens at the telephoto end, y is the largest image height on the image plane of the zoom lens, and $\omega$ is the half angle of view of the zoom lens at the wide angle end.

In conditional expression (14), the overall length of the zoom lens at the telephoto end is normalized by the largest image height on the image plane of the zoom lens and divided by the tangent of the angle of view of the zoom lens.

If the upper limit of conditional expression (14) is exceeded, the overall length of the zoom lens will become large relative to the angle of view, making it difficult to achieve a compact design.

It is also preferred that the zoom lens according to the first mode of the present invention satisfy the following conditional expression (15):

$$d_w/(y \tan(2\omega)) \leq 1.7 \tag{15},$$

where $d_w$ is the overall length of the zoom lens at the wide angle end, y is the largest image height on the image plane of the zoom lens, and $\omega$ is the half angle of view of the zoom lens at the wide angle end.

In conditional expression (15), the overall length of the zoom lens at the wide angle end is normalized by the largest image height on the image plane of the zoom lens and divided by the tangent of the angle of view of the zoom lens.

If the upper limit of conditional expression (15) is exceeded, the overall length of the zoom lens will become large relative to the angle of view, making it difficult to achieve a compact design.

It is also preferred that the zoom lens according to the first mode of the present invention include, in order from the object side, a first lens unit having a negative refractive power, a second lens unit having a positive refractive power, and a third lens unit having a positive refractive power, wherein the first lens unit includes a first lens having a negative refractive power and a second lens having a positive refractive power, and the zoom lens satisfies the following conditional expressions (1), (2), and (3):

$$n_{1n} \leq 1.70 \tag{1},$$

$$n_{1p} \leq 1.70 \tag{2), and}$$

$$|v_{1n} - v_{1p}| \geq 31 \tag{3},$$

where $n_{1n}$ is the refractive index of the first lens having a negative refractive power in the first lens unit for the d-line, $v_{1n}$ is the Abbe constant of the first lens having a negative refractive power in the first lens unit, $n_{1p}$ is the refractive index of the second lens having a positive refractive power in the first lens unit for the d-line, and $v_{1p}$ is the Abbe constant of the second lens having a positive refractive power in the first lens unit.

In this invention, the zoom lens has a retro-focus lens configuration including, in order from the object side, a first lens unit having a negative refractive power, a second lens unit having a positive refractive power, and a third lens unit having a positive refractive power. With this optical system design, the zoom optical system can have a relatively long back focus while having a wide angle of view.

In the zoom lens additionally including the third lens unit, the refractive power of the first lens unit can be made smaller than that in the zoom lens including only two lens units. In consequence, deterioration of curvature of field and astigmatism caused by decentering of the first lens unit can be made smaller.

It is also preferred that the zoom lens according to the first mode of the present invention satisfy the following conditional expression (16):

$$d_{w3i} \tan(2\omega)/y \geq 5 \tag{16},$$

where $d_{w3i}$ is the air distance between the image side surface of the third lens unit and the image plane at the wide angle end, $\omega$ is the half angle of view of the zoom lens at the wide angle end, and y is the largest image height on the image plane of the zoom lens.

Conditional expression (16) specifies a limitation on the air distance between the image side surface of the third lens unit and the image plane. In conditional expression (16), the air distance between the image side surface of the third lens unit and the image plane is normalized by the largest image height on the image plane of the zoom lens and multiplied by the tangent of the angle of view of the zoom lens.

If the lower limit of conditional expression (16) is not reached, it will be impossible to provide an appropriately large air gap between the image side surface of the third lens unit and the image plane, and it will be difficult to provide an optical component such as a filter in this gap.

Moreover, if the lower limit of conditional expression (16) is not reached, the angle of oblique incidence on the image pickup surface of peripheral rays passing through the lens will become large with a decrease in the air distance between the third lens unit and the image plane. This might impair the light quantity sensing.

An image pickup apparatus according to the present invention includes the above-described zoom lens and an image pickup element that is disposed on the image side of the zoom lens and converts an optical image formed by the zoom lens into an electrical signal.

Thus, a compact, low-price image pickup apparatus having wide angle of view, high zoom ratio, and good image quality can be provided.

A zoom lens according to a second mode of the present invention includes, in order from the object side, a first lens unit having a negative refractive power, a second lens unit having a positive refractive power, and a field lens disposed closest to the image side, wherein the first lens unit includes a first lens having a negative refractive power and a second lens having a positive refractive power, and the zoom lens satisfies the following conditional expressions (1), (2), and (3):

$$n_{1n} \leq 1.70 \tag{1},$$

$$n_{1p} \leq 1.70 \tag{2), and}$$

$$|v_{1n} - v_{1p}| \geq 31 \tag{3},$$

where $n_{1n}$ is the refractive index of the first lens in the first lens unit for the d-line, $v_{1n}$ is the Abbe constant of the first lens in the first lens unit, $n_{1p}$ is the refractive index of the second lens in the first lens unit for the d-line, and $v_{1p}$ is the Abbe constant of the second lens in the first lens unit.

The zoom lens according to the second mode of the present invention includes, in order from the object side, the first lens unit having a negative refractive power and the second lens unit having a positive refractive power. With this configuration, the zoom lens according to the second mode of the present invention constitutes a retro-focus optical system. In consequence, the zoom lens according to the second mode of the present invention can have a relatively long back focus while having a wide angle of view.

The zoom lens according to the second mode of the present invention satisfies conditional expressions (1), (2), and (3). If conditional expressions (1) and (2) are satisfied, the refractive indices of the negative first lens and the positive second lens can be made small. This leads to a reduction in the adverse effects of decentering of the first lens and the second lens. Therefore, it is possible to prevent deterioration of aberrations that may caused by decentering in the first lens unit. Moreover, a reduction in the adverse effects of decentering allows to arrange the first lens and the second lens close to each other. Therefore, the zoom lens can be made compact, and manufacturing of each lens will be made easy.

If conditional expression (3) is satisfied, color dispersion generated in the first lens unit can be corrected satisfactorily. In consequence, correction of chromatic aberration by the second lens unit can be made small. Therefore, the second lens unit may be constituted by a small number of lenses. This allows a compact zoom lens design.

It is preferred that the zoom lens according to the second mode of the present invention satisfy the following conditional expression (4A):

$$\Sigma d_{1G}/(y\tan(\omega)) \leq 1.5 \qquad (4A),$$

where $\Sigma d_{1G}$ is the overall length of the first lens unit, y is the largest image height on the image plane of the zoom lens, and $\omega$ is the half angle of view of the zoom lens at the wide angle end.

Conditional expression (4A) is a condition concerning the overall length of the first lens unit. In conditional expression (4A), the overall length of the first lens unit is normalized by the largest image height on the image plane of the zoom lens and divided by the tangent of the half angle of view of the zoom lens. If conditional expression (4A) is satisfied, a compact zoom lens having wide angle of view can be realized. Here, the "overall length of the first lens unit" refers to the distance from the lens surface closest to the object side to the lens surface closest to the image side in the first lens unit on the optical axis. This distance is not a distance expressed as an equivalent air distance but an actual distance (or length).

If the upper limit of conditional expression (4A) is exceeded, the overall length of the first lens unit will become large, or the angle of view at the wide angle end of the zoom range will become small.

It is preferred that the zoom lens according to the second mode of the present invention satisfy the following conditional expressions 5 and (6A):

$$d_{1nw}/d_{1nc} \geq 3.0 \qquad (5), \text{ and}$$

$$f_w/y \leq 1.5 \qquad (6A),$$

where $d_{1nw}$ is the thickness of the first lens in the first lens unit along the direction of the optical axis at the position at which an outermost principal ray passes through it at the wide angle end, $d_{1nc}$ is the thickness of the first lens in the first lens unit on the optical axis, $f_w$ is the focal length of the zoom lens at the wide angle end, and y is the largest image height on the image plane of the zoom lens.

Conditional expression (5) defines an appropriate range of the ratio of the largest thickness to the smallest thickness of the first lens in the first lens unit. If the conditional expression (5) is satisfied, the zoom ratio can be made high.

If the lower limit of conditional expression (5) is not reached, the first lens cannot have a sufficient refractive power, and it will be difficult to achieve a zoom lens having a high zoom ratio.

Conditional expression (6A) relates to the focal length of the zoom lens at the wide angle end. In conditional expression (6A), the focal length of the zoom lens at the wide angle end is normalized by the largest image height on the image plane of the zoom lens. If conditional expression (6A) is satisfied, a compact zoom lens can be realized.

If the upper limit of conditional expression (6) is exceeded, the focal length of the zoom lens at the wide angle end will become large. Then, the overall length of the optical system will become large. This makes it difficult to make the zoom lens compact.

In the zoom lens according to the second mode of the present invention, it is preferred that at least one of the first lens and the second lens in the first lens unit be a lens made of a resin.

The use of the resin lens is cost-effective as compared to the glass lens.

In the zoom lens according to the second mode of the present invention, it is preferred that at least one of the lens surfaces of the first lens and the second lens in the first lens unit be an aspheric surface that is shaped in such a way that the deviation of the aspheric surface from the paraxial spherical surface in the direction of the optical axis monotonically increases or monotonically decreases from the center of the lens toward the position at which the outermost principal ray passes.

The use of the aspheric surface makes it possible to correct aberrations such as chromatic aberration of magnification and curvature of field satisfactorily in the first lens unit. By shaping the aspheric surface in the above-described way, adverse effects such as deterioration of aberrations caused by decentering of the first lens and/or the second lens can be made small. This consequently allows a compact design in which the distance between these lenses are small. Therefore, the zoom lens can be made compact.

It is also preferred that the zoom lens according to the second mode of the present invention satisfy the following conditional expressions (7) and (8):

$$d_{12}/|r_{1nf}| \leq 0.2 \qquad (7), \text{ and}$$

$$d_{12}/|r_{1pr}| \leq 0.2 \qquad (8),$$

where $d_{12}$ is the air distance between the first lens and the second lens in the first lens unit, $r_{1nf}$ is the paraxial radius of curvature of the object side surface of the first lens in the first lens unit, and $r_{1pr}$ is the paraxial radius of curvature of the image side surface of the second lens in the first lens unit.

Conditional expression (7) relates to the air distance between the first lens and the second lens. In conditional expression (7), the air distance between the first lens and the second lens is normalized by the paraxial radius of curvature of the object side surface of the first lens.

If the upper limit of conditional expression (7) is exceeded, the air distance between the first lens and the second lens will become large. This will make it difficult to make the optical system compact. Moreover, the paraxial radius of curvature of the object side surface of the first lens will become small. When this is the case, the first lens will generate large astigmatism and chromatic aberration of magnification, making aberration correction difficult.

Conditional expression (8) relates to the air distance between the first lens and the second lens. In conditional expression (8), the air distance between the first lens and the second lens is normalized by the paraxial radius of curvature of the image side surface of the second lens.

If the upper limit of conditional expression (8) is exceeded, the air distance between the first lens and the second lens will become large. This will make it difficult to make the optical system compact. Moreover, the paraxial radius of curvature of the image side surface of the second lens will become small. When this is the case, the second lens will generate large astigmatism and chromatic aberration of magnification, making aberration correction difficult.

It is also preferred that the zoom lens according to the second mode of the present invention satisfy the following conditional expressions (9A) and (10):

$$d_t/y \leq 8.6 \quad (9A),\text{ and}$$

$$f_t/f_w \geq 3.0 \quad (10),$$

where $d_t$ is the overall length of the zoom lens at the telephoto end, y is the largest image height on the image plane of the zoom lens, $f_t$ is the focal length of the zoom lens at the telephoto end, and $f_w$ is the focal length of the zoom lens at the wide angle end.

Conditional expression (9A) relates to the overall length of the zoom lens at the telephoto end. In conditional expression (9A), the overall length of the zoom lens at the telephoto end is normalized by the largest image height on the image plane of the zoom lens. If conditional expression (9A) is satisfied, the zoom lens can be made compact.

If the upper limit of conditional expression (9) is exceeded, the overall length of the zoom lens at the telephoto end will become large, making it impossible to achieve a compact zoom lens design.

Conditional expression (10) relates to the zoom ratio. If conditional expression (10) is satisfied in addition to conditional expression (9), the zoom lens can have high zoom ratio while being compact.

It is also preferred that the zoom lens according to the second mode of the present invention satisfy the following conditional expressions (10) and (11A):

$$f_t/f_w \geq 3.0 \quad (10),\text{ and}$$

$$d_w/y \leq 8.2 \quad (11A),$$

where $f_t$ is the focal length of the zoom lens at the telephoto end, $f_w$ is the focal length of the zoom lens at the wide angle end, $d_w$ is the overall length of the zoom lens at the wide angle end, and y is the largest image height on the image plane of the zoom lens.

Conditional expression (10) has already been described before.

Conditional expression (11A) relates to the overall length of the zoom lens at the wide angle end. In conditional expression (11A), the overall length of the zoom lens at the wide angle end is normalized by the largest image height on the image plane of the zoom lens. If conditional expression (11A) is satisfied, the zoom lens can be made compact.

If the upper limit of conditional expression (11A) is exceeded, the overall length of the zoom lens at the wide angle end will become large, making it impossible to achieve a compact zoom lens design.

It is preferred that all the lenses constituting the zoom lens according to the second mode of the present invention each have a refractive index not larger than 1.7.

Glass materials having a refractive index larger than 1.7 are expensive. By using materials having a refractive index not larger than 1.7 in all the lenses that constitute the zoom lens, the price of the zoom lens can be made low. Thus, it is possible to provide an inexpensive zoom lens.

If a lens having a refractive index larger than 1.7 is used, there will arise various problems such as that the variety of glass materials that can be used in this lens are limited, that it is difficult to manufacture the optical system at low cost, that machining of the lens is difficult, and that it is difficult to correct aberrations. Moreover, high anomalous dispersion will result. This makes aberration correction difficult.

It is also preferred that the zoom lens according to the second mode of the present invention satisfy the following conditional expression (12A):

$$\Sigma d_{2G}/(y \tan(\omega)) \leq 1.5 \quad (12A),$$

where $\Sigma d_{2G}$ is the overall length of the second lens unit, y is the largest image height on the image plane of the zoom lens, and $\omega$ is the half angle of view of the zoom lens at the wide angle end.

Conditional expression (12A) is a condition concerning the overall length of the second lens unit. In conditional expression (12A), the overall length of the second lens unit is normalized by the largest image height on the image plane of the zoom lens and divided by the tangent of the half angle of view of the zoom lens. If conditional expression (12A) is satisfied, a compact zoom lens having wide angle of view can be realized. Here, the "overall length of the second lens unit" refers to the distance from the lens surface closest to the object side to the lens surface closest to the image side in the second lens unit on the optical axis. This distance is not a distance expressed as an equivalent air distance but an actual distance (or length).

If the upper limit of conditional expression (12A) is exceeded, the overall length of the second lens unit will become large, or the angle of view at the wide angle end of the zoom range will become small.

It is also preferred that the zoom lens according to the second mode of the present invention satisfy the following conditional expression (13A):

$$|f_{air}|/|f_{1G}| \geq 3 \quad (13A),$$

where $f_{air}$ is the focal length of the air lens formed between the first lens and the second lens, and $f_{1G}$ is the focal length of the first lens unit.

In the zoom lens according to the second mode of the present invention, the air lens formed between the first lens and the second lens is used to correct chromatic aberration generated in the first lens unit. By making chromatic aberration small by the air lens, a compact zoom lens can be realized.

Conditional expression (13A) is a condition concerning the focal length of the air lens. In conditional expression (13A), the focal length of the air lens is normalized by the focal length of the first lens unit. If conditional expression (13A) is satisfied, correction of chromatic aberration is facilitated and deterioration of aberrations caused by decentering can be prevented.

If the lower limit of conditional expression (13A) is not reached, the focal length of the air lens will become small (or short). Then, the paraxial radius of curvature of the lens surface of the first lens and the lens surface of the second lens that define the air lens will become small accordingly. In consequence, the degree of deterioration in aberrations caused by decentering of the first lens and the second lens will become large.

It is also preferred that the zoom lens according to the second mode of the present invention satisfy the following conditional expression (14A):

$$d_t/(y\tan(\omega)) \leq 12 \quad (14A),$$

where $d_t$ is the overall length of the zoom lens at the telephoto end, y is the largest image height on the image plane of the zoom lens, and $\omega$ is the half angle of view of the zoom lens at the wide angle end.

Conditional expression (14A) is a condition concerning the overall length of the zoom lens at the telephoto end. In conditional expression (14A), the overall length of the zoom lens at the telephoto end is normalized by the largest image height on the image plane of the zoom lens and divided by the tangent of the half angle of view of the zoom lens. If conditional expression (14A) is satisfied, the zoom lens can be made compact.

If the upper limit of conditional expression (14A) is exceeded, the overall length of the zoom lens will become large relative to the angle of view, making it difficult to achieve a compact design.

It is also preferred that the zoom lens according to the second mode of the present invention satisfy the following conditional expression (15A):

$$d_w/(y\tan(\omega)) \leq 12 \quad (15A),$$

where $d_w$ is the overall length of the zoom lens at the wide angle end, y is the largest image height on the image plane of the zoom lens, and $\omega$ is the half angle of view of the zoom lens at the wide angle end.

Conditional expression (15A) is a condition concerning the overall length of the zoom lens at the wide angle end. In conditional expression (15A), the overall length of the zoom lens at the wide angle end is normalized by the largest image height on the image plane of the zoom lens and divided by the tangent of the half angle of view of the zoom lens. If conditional expression (15A) is satisfied, the zoom lens can be made compact.

If the upper limit of conditional expression (15A) is exceeded, the overall length of the zoom lens will become large relative to the angle of view, making it difficult to achieve a compact design.

A zoom lens according to a third mode of the present invention includes, in order from the object side, a first lens unit having a negative refractive power, a second lens unit having a positive refractive power, a third lens unit having a positive refractive power, and a field lens disposed closest to the image side, wherein the first lens unit includes a first lens having a negative refractive power and a second lens having a positive refractive power, and the zoom lens satisfies the following conditional expressions (1), (2), and (3):

$$n_{1n} \leq 1.70 \quad (1),$$

$$n_{1p} \leq 1.70 \quad (2), \text{ and}$$

$$|v_{1n} - v_{1p}| \geq 31 \quad (3),$$

where $n_{1n}$ is the refractive index of the first lens in the first lens unit for the d-line, $v_{1v}$ is the Abbe constant of the first lens in the first lens unit, $n_{1p}$ is the refractive index of the second lens in the first lens unit for the d-line, and $v_{1p}$ is the Abbe constant of the second lens in the first lens unit.

In the zoom lens according to the third mode of the present invention, the third lens unit having a positive refractive power is added to the zoom lens according to the second mode. In the zoom lens according to the third mode of the present invention also, the refractive power arrangement is a negative (the first lens unit)-positive (the second and third lens units) type arrangement. Thus, the zoom lens according to the third mode of the present invention is a retro-focus optical system as with the zoom lens according to the second mode. The zoom lens according to the third mode of the present invention satisfies conditional expressions (1), (2), and (3) as with the zoom lens according to the second mode. Therefore, the zoom lens according to the third mode of the present invention has the advantages same as the zoom lens according to the second mode.

The zoom lens according to the third mode of the present invention has the third lens unit. This is advantageous for wide angle lens design. In addition, the refractive power of the second lens unit can be made smaller than that in the case where the zoom lens is composed of two lens units. Moreover, since two lens units (i.e. the second and third lens units) can contribute to zooming or magnification change, high zoom ratio can be achieved advantageously even if the refractive power of the second lens unit is low.

In the zoom lens according to the third mode of the present invention, correction of curvature of field and astigmatism can be provided not only by the first lens unit but also by the third lens unit. In consequence, deterioration in curvature of field and astigmatism with decentering of the first lens unit can be made smaller.

It is preferred that the zoom lens according to the third mode of the present invention satisfy the following conditional expression (16A):

$$d_{w3i}\tan(\omega)/y \geq 0.9 \quad (16A),$$

where $d_{w3i}$ is the air distance between the image side lens surface of the third lens unit and the image plane at the wide angle end, y is the largest image height on the image plane of the zoom lens, and $\omega$ is the half angle of view of the zoom lens at the wide angle end.

Conditional expression (16A) specifies a limitation on the air distance between the image side lens surface of the third lens unit and the image plane. In conditional expression (16A), the air distance between the image side surface of the third lens unit and the image plane is normalized by the largest image height on the image plane of the zoom lens and multiplied by the tangent of the half angle of view of the zoom lens. If conditional expression (16A) is satisfied, it is possible to provide an appropriate space on the image side of the third lens unit while suppressing shading.

If the lower limit of conditional expression (16A) is not reached, it will be impossible to provide an appropriately large gap between the image side surface of the third lens unit and the image plane, and it will be difficult to provide an optical component such as a filter on the image side of the third lens unit. Furthermore, if the lower limit of conditional expression (16) is not reached, the angle of oblique incidence on the image pickup surface of off-axis principal rays will become large (namely, off-axis principal rays incident on the image plane will not be parallel to the optical axis) with a decrease in the distance between the third lens unit and the image plane. In consequence, shading will occur.

It is preferred that the zoom lenses according to the second and third modes of the present invention (which will be hereinafter referred to as the "aforementioned zoom lenses") satisfy the following conditional expression (17):

$$0.2 \leq R_{3r}/R_{4f} \leq 1.2 \quad (17),$$

where $R_{3r}$ is the paraxial radius of curvature of the lens surface closest to the image side in the third lens unit, and $R_{4f}$ is the paraxial radius of curvature of the lens surface closest to the object side of the field lens.

Conditional expression (17) specifies an appropriate range of the shape factor of the lens. Conditional expression (17) concerns the ratio of the paraxial radius of curvature of the lens surface closest to the image side in the third lens unit and the paraxial radius of curvature of the lens surface closest to the object side of the field lens.

If the upper limit of conditional expression (17) is exceeded, the paraxial radius of curvature of the lens surface closest to the object side of the field lens is smaller than the paraxial radius of curvature of the lens surface closest to the image side in the third lens unit. Since the upper limit of conditional expression (17) is 1.2, the paraxial radius of curvature of the lens surface closest to the object side of the field lens has become smaller than the paraxial radius of curvature of the lens surface closest to the image side in the third lens unit before the upper limit is exceeded.

In this case, it is necessary that the distance between these surfaces be so large that the third lens unit and the field lens do not interfere with each other in the peripheral region of the lens. Then, it is difficult to make the zoom lens compact. In addition, the distance between the third lens unit and the field lens will be large in the collapsed state also. Consequently, it is difficult to make the collapsed thickness small. If the lower limit of conditional expression (17) is not reached, the paraxial radius of curvature of the object side lens surface of the field lens will be large. Then, it will be difficult to correct aberrations such as curvature of field satisfactorily.

In the aforementioned zoom lenses, it is preferred that the following conditional expression (19) be satisfied, at least one of the lens surfaces of the field lens be an aspheric surface, the aspheric surface be shaped in such a way that the value of f(h) monotonically increases or monotonically decreases from the center of the lens surface toward its periphery, and the following conditional expression (18) be satisfied at any position within the effective diameter of the aspheric surface:

$$|d(f(h))/dh| \leq 0.2 \quad (18),$$

$$|f_{fl}/f_w| \geq 100 \quad (19),$$

where $f_{fl}$ is the focal length of the field lens, $f_w$ is the focal length of the zoom lens at the wide angle end, f(h) is the amount of deviation at a position in the range from the central optical axis (h=0) to the position at which the outermost principal ray passes at the telephoto end, and f(h) is expressed by equation (B) presented below in the coordinate system with a z-axis taken along the optical axis and an h-axis taken along a direction perpendicular to the optical axis when the shape of the aspheric surface is expressed by equation (A) presented below:

$$z=h^2/R[1+\{1-(1+k)h^2/R^2\}^{1/2}]+A_4h^4+A_6h^6+A_8h^8+A_{10}h^{10}+\ldots \quad (A),$$

$$f(h)=z-h^2/R[1+\{1-h^2/R^2\}^{1/2}] \quad (B)$$

where R is the radius of curvature of the spherical component on the optical axis, k is a conic constant, $A_4, A_6, A_8, A_{10}, \ldots$ are aspheric coefficients, d(f(h))/dh is the first derivative of f(h), f(h) is positive when the deviation is toward the image side, and f(h)=0 on the central optical axis.

When focusing operation from infinity to short distance is performed, the position of peripheral rays incident on the field lens varies. Curvature of field also varies with this variation in the position of incidence of peripheral rays. If at least one of the surfaces of the field lens is an aspheric surface, the variation in the curvature of field can be made small. Then, if the aspheric surface of the field lens is shaped in such a way that the value of f(h) monotonically increases or monotonically decreases from the center of the lens toward the periphery, aberrations or deterioration of aberrations caused by decentering can be made small. Here, f(h) is the amount of deviation, which is, in other words, the difference between the aspheric surface and the paraxial spherical surface.

Conditional expression (19) is a condition concerning the refractive power of the field lens. If conditional expression (19) is satisfied, aberrations or deterioration of aberrations caused by decentering of the field lens can be made small.

If the lower limit of conditional expression (19) is not reached, the power of the field lens will be high. Then, large aberrations or deterioration of aberrations will be caused when decentering of the field lens occurs.

If conditional expression (18) is also satisfied, aberrations or deterioration of aberrations caused by decentering errors can further be made small. Moreover, if conditional expression (18) is satisfied, the variation in the angle of incidence of rays with the variation in the position of incidence of peripheral rays can be made small. Therefore, the variation in curvature of field upon focusing operation from infinity to short distance can be made small. Then, the contribution of the other lens units to correction of curvature of field can be decreased.

If the upper limit of conditional expression (18) is exceeded, aberrations or deterioration of aberrations caused by decentering will become large. This leads to a significant deterioration of resolving power. Moreover, the variation in the angle of incidence of rays upon focusing will become large, leading to a large variation in curvature of field.

In the aforementioned zoom lenses, it is preferred that the following conditional expression (19) be satisfied, at least one of the lens surfaces of the field lens be an aspheric surface, the aspheric surface be shaped in such a way that the value of f(h) monotonically increases or monotonically decreases from the center of the lens surface toward its periphery, and the following conditional expression (20) be satisfied at any position within the effective diameter of the aspheric surface:

$$|f_{fl}/f_w| \geq 100 \quad (19),$$

$$0 \leq d(f(h))/dh \leq 0.2 \quad (20),$$

where $f_{fl}$ is the focal length of the field lens, $f_w$ is the focal length of the zoom lens at the wide angle end, f(h) is the amount of deviation at a position in the range from the central optical axis (h=0) to the position at which the outermost principal ray passes at the telephoto end, and f(h) is expressed by equation (B) presented below in the coordinate system with a z-axis taken along the optical axis and an h-axis taken along a direction perpendicular to the optical axis when the shape of the aspheric surface is expressed by equation (A) presented below:

$$z=h^2/R[1+\{1-(1+k)h^2/R^2\}^{1/2}]+A_4h^4+A_6h^6+A_8h^8+A_{10}h^{10}+\ldots \quad (A),$$

$$f(h)=z-h^2/R[1+\{1-h^2/R^2\}^{1/2}] \quad (B)$$

where R is the radius of curvature of the spherical component on the optical axis, k is a conic constant, $A_4, A_6, A_8, A_{10}, \ldots$ are aspheric coefficients, d(f(h))/dh is the first derivative of f(h), f(h) is positive when the deviation is toward the image side, and f(h)=0 on the central optical axis.

The technical discussion of conditional expression (19) has already been made in the above. In addition, the technical discussion about conditional expression (18) also applies to conditional expression (20). If conditional expressions (19) and (20) are satisfied, the variation in curvature of field upon focusing operation can be made small, and deterioration in performance caused by decentering can also be made small.

In the aforementioned zoom lenses, it is preferred that the following conditional expression (19) be satisfied, at least one of the lens surfaces of the field lens be an aspheric surface, the aspheric surface be shaped in such a way that the value of f(h) monotonically increases or monotonically decreases from the center of the lens surface toward its periphery, and the following conditional expression (21) be satisfied at any position within the effective diameter of the aspheric surface:

$$|f_{fl}/f_w| \geq 100 \qquad (19),$$

$$-0.2 \leq d(f(h))/dh \leq 0 \qquad (21),$$

where $f_{fl}$ is the focal length of the field lens, $f_w$ is the focal length of the zoom lens at the wide angle end, f(h) is the amount of deviation at a position in the range from the central optical axis (h=0) to the position at which the outermost principal ray passes at the telephoto end, and f(h) is expressed by equation (B) presented below in the coordinate system with a z-axis taken along the optical axis and an h-axis taken along a direction perpendicular to the optical axis when the shape of the aspheric surface is expressed by equation (A) presented below:

$$z = h^2/R/[1+\{1-(1+k)h^2/R^2\}^{1/2}]+A_4h^4+A_6h^6+A_8h^8+A_{10}h^{10}+\ldots \qquad (A),$$

$$f(h) = z - h^2/R/[1+\{1-h^2/R^2\}^{1/2}] \qquad (B)$$

where R is the radius of curvature of the spherical component on the optical axis, k is a conic constant, $A_4, A_6, A_8, A_{10}, \ldots$ are aspheric coefficients, d(f(h))/dh is the first derivative of f(h), f(h) is positive when the deviation is toward the image side, and f(h)=0 on the central optical axis.

The technical discussion of conditional expression (19) has already been made in the above. In addition, the technical discussion about conditional expression (18) also applies to conditional expression (21). If conditional expressions (19) and (21) are satisfied, the variation in curvature of field upon focusing operation can be made small, and deterioration in performance caused by decentering can also be made small.

In the aforementioned zoom lenses, it is preferred that the following conditional expression (19) be satisfied, at least one of the lens surfaces of the field lens be an aspheric surface, the aspheric surface be shaped in such a way that the value of f(h) monotonically increases or monotonically decreases from the center of the lens surface toward its periphery, and the following conditional expression (22) be satisfied at any position within the effective diameter of the aspheric surface:

$$|f_{fl}/f_w| \geq 100 \qquad (19),$$

$$|f(h)/y| \leq 0.1 \qquad (22),$$

where $f_{fl}$ is the focal length of the field lens, $f_w$ is the focal length of the zoom lens at the wide angle end, f(h) is the amount of deviation at a position in the range from the central optical axis (h=0) to the position at which the outermost principal ray passes at the telephoto end, and f(h) is expressed by equation (B) presented below in the coordinate system with a z-axis taken along the optical axis and an h-axis taken along a direction perpendicular to the optical axis when the shape of the aspheric surface is expressed by equation (A) presented below:

$$z = h^2/R/[1+\{1-(1+k)h^2/R^2\}^{1/2}]+A_4h^4+A_6h^6+A_8h^8+A_{10}h^{10}+\ldots \qquad (A),$$

$$f(h) = z - h^2/R/[1+\{1-h^2/R^2\}^{1/2}] \qquad (B)$$

where R is the radius of curvature of the spherical component on the optical axis, k is a conic constant, $A_4, A_6, A_8, A_{10}, \ldots$ are aspheric coefficients, f(h) is positive when the deviation is toward the image side, y is the largest image height on the image plane of the zoom lens, and f(h)=0 on the central optical axis.

The technical discussion of conditional expression (19) has already been made in the above. In addition, the technical discussion about conditional expression (18) also applies to conditional expression (22). If conditional expressions (19) and (22) are satisfied, the variation in curvature of field upon focusing operation can be made small, and deterioration in performance caused by decentering can also be made small.

It is preferred that an image pickup apparatus according to the present invention include the above-described zoom lens and an image pickup element that is disposed on the image side of the zoom lens and converts an optical image formed by the zoom lens into an electrical signal. Thus, a slim image pickup apparatus with well corrected aberrations while having a wide angle of view and a high zoom ratio can be provided.

In the image pickup apparatus according to the present invention, it is preferred that the field lens is adapted to move integrally with the image pickup element disposed on the image plane. This eliminates the need of a cover glass for the image pickup element, allowing a reduction in the back focus of the zoom lens. In consequence, a compact image pickup apparatus having good dust resistance even without cover glass can be provided.

It is more preferred that the conditional expressions described in the foregoing be modified in terms of the upper or/and lower limits as follows. Only one of the upper and lower limits of each conditional expression may be replaced by that of the modified conditional expressions. With the modification, the advantageous effects that will be realized when each conditional expression is satisfied can be enjoyed more effectively.

| | | |
|---|---|---|
| $n_{1n}$ | 1.55 | (1)' |
| $n_{1n}$ | 1.54 | (1)" |
| $n_{1p}$ | 1.65 | (2)' |
| $n_{1p}$ | 1.64 | (2)" |
| $|v_{1n} - v_{1p}|$ | 31.79 | (3)' |
| $\Sigma d_{1G}/(y\tan(2\omega))$ | 0.13 | (4)' |
| $\Sigma d_{1G}/(y\tan(2\omega))$ | 0.08 | (4)" |
| $d_{1nw}/d_{1nc}$ | 3.2 | (5)' |
| $d_{1nw}/d_{1nc}$ | 3.3 | (5)" |
| $f_w/y$ | 1.35 | (6)' |
| $f_w/y$ | 1.28 | (6)" |
| $d_{12}/|r_{1nf}|$ | 0.12 | (7)' |
| $d_{12}/|r_{1nf}|$ | 0.09 | (7)" |
| $d_{12}/|r_{1pr}|$ | 0.12 | (8)' |
| $d_{12}/|r_{1pr}|$ | 0.11 | (8)" |
| $d_t/y$ | 8.45 | (9)' |
| $d_t/y$ | 8.44 | (9)" |
| $f_t/f_w$ | 3.8 | (10)' |
| $d_w/y$ | 8.01 | (11)' |
| $d_w/y$ | 7.19 | (11)" |
| $\Sigma d_{2G}/(y\tan(2\omega))$ | 0.32 | (12)' |
| $\Sigma d_{2G}/(y\tan(2\omega))$ | 0.12 | (12)" |
| $\Sigma d_{2G}/(y\tan(2\omega))$ | 0.07 | (12)''' |
| $|f_{air}|/|f_{1G}|$ | 17 | (13)' |
| $|f_{air}|/|f_{1G}|$ | 40 | (13)" |
| $d_t/(y\tan(2\omega))$ | 1.13 | (14)' |
| $d_t/(y\tan(2\omega))$ | 0.65 | (14)" |
| $d_w/(y\tan(2\omega))$ | 0.95 | (15)' |
| $d_w/(y\tan(2\omega))$ | 0.56 | (15)" |
| $d_{w3t}\tan(2\omega)/y$ | 10 | (16)' |
| $d_{w3t}\tan(2\omega)/y$ | 17 | (16)" |

Further, it may let new upper limit value or new lower limit value be only the upper limit value or the lower limit value of each of the conditional expressions.

In doing this way, advantageous effect of each of the conditional expression could be more available.

| | | |
|---|---|---|
| $n1n$ | 1.69 | (1)' |
| $n1n$ | 1.68 | (1)" |
| $n1p$ | 1.66 | (2)' |
| $n1p$ | 1.63 | (2)" |
| $|v1n - v1p|$ | 31.2 | (3)' |
| $|v1n - v1p|$ | 31.4 | (3)" |
| $\Sigma d_{1G}/(y\tan(\omega))$ | 1.4 | (4A)' |
| $\Sigma d_{1G}/(y\tan(\omega))$ | 1.25 | (4A)" |
| $d_{1nv}/d_{1nc}$ | 3.15 | (5)' |
| $d_{1nv}/d_{1nc}$ | 3.29 | (5)" |
| $f_w/y$ | 1.4 | (6A)' |
| $f_w/y$ | 1.34 | (6A)" |
| $d_{12}/|r_{1nf}|$ | 0.15 | (7)' |
| $d_{12}/|r_{1nf}|$ | 0.08 | (7)" |
| $d_{12}/|r_{1pr}|$ | 0.18 | (8)' |
| $d_{12}/|r_{1pr}|$ | 0.17 | (8)" |
| $d_t/y$ | 8.57 | (9A)' |
| $d_t/y$ | 8.54 | (9A)" |
| $f_t/f_w$ | 3.5 | (10)' |
| $f_t/f_w$ | 3.8 | (10)" |
| $d_w/y$ | 8.1 | (11A)' |
| $d_w/y$ | 8.07 | (11A)" |
| $\Sigma d_{2G}/(y\tan(\omega))$ | 1.3 | (12A)' |
| $\Sigma d_{2G}/(y\tan(\omega))$ | 1.1 | (12A)" |
| $|f_{air}|/|f_{1G}|$ | 3.15 | (13A)' |
| $|f_{air}|/|f_{1G}|$ | 3.3 | (13A)" |
| $d_t/(y\tan(\omega))$ | 11 | (14A)' |
| $d_t/(y\tan(\omega))$ | 9.6 | (14A)" |
| $d_w/(y\tan(\omega))$ | 11 | (15A)' |
| $d_w/(y\tan(\omega))$ | 9.5 | (15A)" |
| $d_{w3i}\tan(\omega)/y$ | 1 | (16A)' |
| $d_{w3i}\tan(\omega)/y$ | 1.1 | (16A)" |
| $d_{w3i}\tan(\omega)/y$ | 1.18 | (16A)''' |
| $0.25\ R_{3r}/R_{4f}$ | 1 | (17)' |
| $0.29\ R_{3r}/R_{4f}$ | 0.56 | (17)" |
| $|d(f(h))/dh|$ | 0.15 | (18)' |
| $|d(f(h))/dh|$ | 0.12 | (18)" |
| $|f_{ft}/f_w|$ | 300 | (19)' |
| $|f_{ft}/f_w|$ | 500 | (19)" |
| $|f_{ft}/f_w|$ | 700 | (19)''' |
| $0\ d(f(h))/dh$ | 0.15 | (20)' |
| $0\ d(f(h))/dh$ | 0.12 | (20)" |
| $-0.15\ d(f(h))/dh$ | 0 | (21)' |
| $-0.12\ d(f(h))/dh$ | 0 | (21)" |
| $|f(h)/y|$ | 0.07 | (22)' |
| $|f(h)/y|$ | 0.04 | (22)" |

As will be apparent from the above description, the present invention can provide a zoom lens that has a wide angle of view and a high zoom ratio of approximately 4, can easily produce high quality images, and is advantageous for reduction in the size of the camera and cost reduction. The present invention can also provide an image pickup apparatus equipped with such a zoom lens.

The present invention can provide a slim zoom lens with well corrected aberrations while having a wide angle of view and a high zoom ratio and an image pickup apparatus equipped with such a zoom lens.

The operations and effects of zoom lenses and image pickup apparatuses according to some embodiments will be described. It should be understood that the present invention is by no means limited by the embodiments. Although a lot of specific details will be described in the following description of the embodiments for the purposes of illustration, various modifications and changes can be made to the details without departing from the scope of the invention. The illustrative embodiments of the invention will be described in the following without any intension of invalidating the generality of or imposing any limitations on the claimed invention.

In the following, first to eighteenth examples of the zoom lens according to the present invention will be described. FIGS. 1A to 18A, 1B to 18B, and 1C to 18C are cross sectional views of the zoom lens according to the first to eighteenth examples in the state in which the zoom lens is focused on an object point at infinity respectively at the wide angle end, in an intermediate state, and at the telephoto end.

FIGS. 1A, 2A, 3A, 4A, 5A, 6A, 7A, 8A, 9A, 10A, 11A, 12A, 13A, 14A, 15A, 16A, 17A, and 18A are cross sectional views of the zoom lens according to the respective examples in the state in which the zoom lens is focused on an object point at infinity at the wide angle end.

FIGS. 1B, 2B, 3B, 4B, 5B, 6B, 7B, 8B, 9B, 10B, 11B, 12B, 13B, 14B, 15B, 16B, 17B, and 18B are cross sectional views of the zoom lens according to the respective examples in the state in which the zoom lens is focused on an object point at infinity in the intermediate state.

FIGS. 1C, 2C, 3C, 4C, 5C, 6C, 7C, 8C, 9C, 10C, 11C, 12C, 13C, 14C, 15C, 16C, 17C, and 18C are cross sectional views of the zoom lens according to the respective examples in the state in which the zoom lens is focused on an object point at infinity at the telephoto end.

In FIGS. 1A to 18C, a first lens unit is denoted by G1, a second lens unit is denoted by G2, an aperture stop is denoted by S, a third lens unit is denoted by G3, a filter is denoted by F, a plane parallel plate constituting a cover glass of an electronic image pickup element (CCD or CMOS sensor) is denoted by C, and the image plane is denoted by I. The cover glass C may have a multi-layer film for wavelength range restriction applied on its surface. The cover glass C may have a wavelength restriction coating for restricting infrared light applied thereon to thereby have the function of a low pass filter.

The plane parallel plate F may be designed not to have the low pass filter function.

All the numerical data presented below are for the state in which the zoom lens is focused on an object at infinity. In the numerical data, dimensions are in millimeters and angles are in degrees. In all the examples, the focusing operation from an object at long distance to an object at short distance is performed by moving the first lens unit, third lens unit, or all the lens units along the optical axis.

Zoom data will be presented for the wide angle end (W) of the zoom range, an intermediate focal length state (S), and the telephoto end (T) of the zoom range.

Figure 1B:
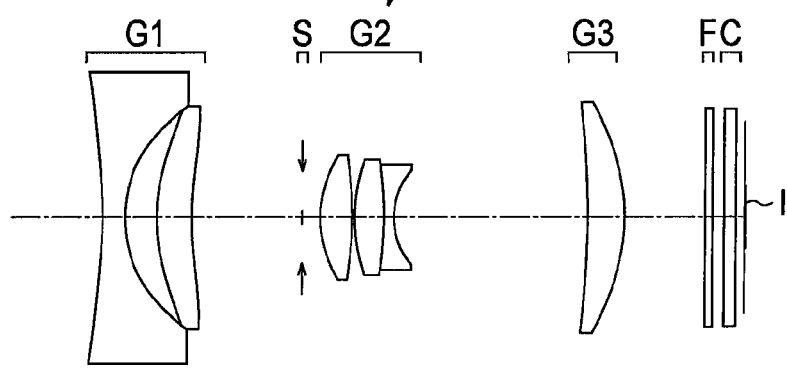
Figure 1C:
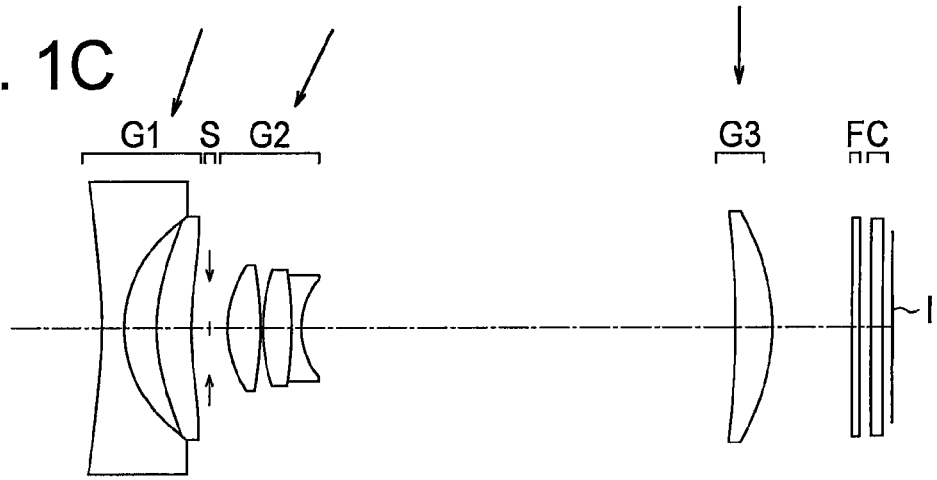

As shown in FIGS. 1A to 1C, the zoom lens according to the first example includes, in order from the object side, a first lens unit G1 having a negative refractive power, an aperture stop S, a second lens unit G2 having a positive refractive power, and a third lens unit G3 having a positive refractive power.

During zooming from the wide angle end to the telephoto end, the first lens unit G1 moves first toward the image side and thereafter reverses its moving direction to move toward the object side, the second lens unit G2 moves toward the object side, and the third lens unit G3 moves toward the image side.

The first lens unit G1 is composed of a biconcave negative lens and a positive meniscus lens having a convex surface directed toward the object side, which are arranged in order from the object side.

The second lens unit G2 is composed of a biconvex positive lens, and a cemented lens made up of a biconvex positive lens and a biconcave negative lens, which are arranged in order from the object side.

The third lens unit G3 is composed of a positive meniscus lens having a convex surface directed toward the image side.

There are seven aspheric surfaces, which include both surfaces of the biconcave negative lens in the first lens unit G1, both surfaces of the positive meniscus lens having a convex surface directed toward the object side in the first lens unit G1, both surfaces of the biconvex positive lens in the second lens unit G2, and the image side surface of the positive meniscus lens having a convex surface directed toward the image side in the third lens unit G3.

Figure 2A:
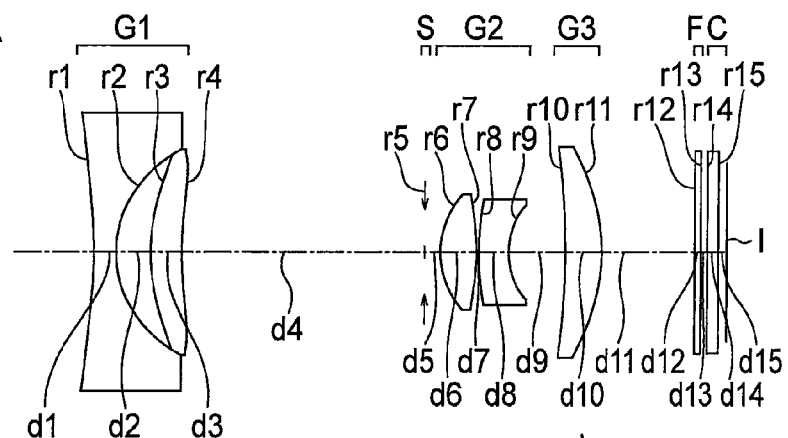
FIGS. 2A, 2B, and 2C are cross sectional views of a zoom lens according to a second example of the present invention, similar to FIGS. 1A, 1B, and 1C.
Figure 2B:
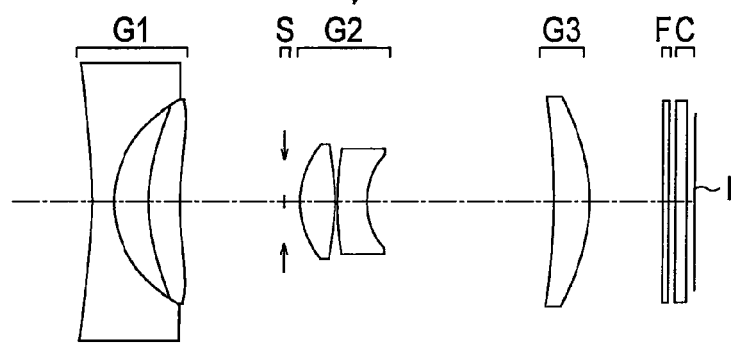
Figure 2C:
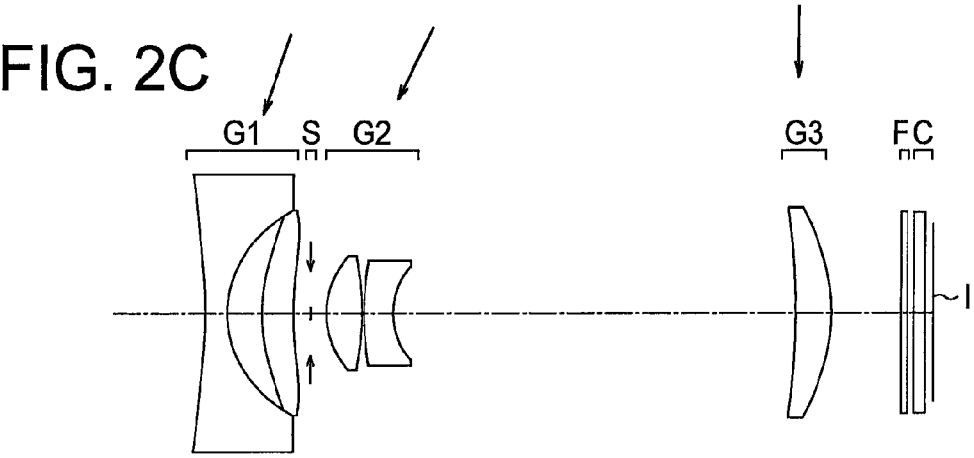

As shown in FIGS. 2A to 2C, the zoom lens according to the second example includes, in order from the object side, a first lens unit G1 having a negative refractive power, an aperture stop S, a second lens unit G2 having a positive refractive power, and a third lens unit G3 having a positive refractive power.

During zooming from the wide angle end to the telephoto end, the first lens unit G1 moves first toward the image side and thereafter reverses its moving direction to move toward the object side, the second lens unit G2 moves toward the object side, and the third lens unit G3 moves toward the image side.

The first lens unit G1 is composed of a biconcave negative lens and a positive meniscus lens having a convex surface directed toward the object side, which are arranged in order from the object side.

The second lens unit G2 is composed of a biconvex positive lens and a negative meniscus lens having a convex surface directed toward the object side, which are arranged in order from the object side.

The third lens unit G3 is composed of a positive meniscus lens having a convex surface directed toward the image side.

There are eight aspheric surfaces, which include both surfaces of the biconcave negative lens in the first lens unit G1, both surfaces of the positive meniscus lens having a convex surface directed toward the object side in the first lens unit G1, both surfaces of the biconvex positive lens in the second lens unit G2, the image side surface of the negative meniscus lens having a convex surface directed toward the object side in the second lens unit G2, and the image side surface of the positive meniscus lens having a convex surface directed toward the image side in the third lens unit G3.

Figure 3A:
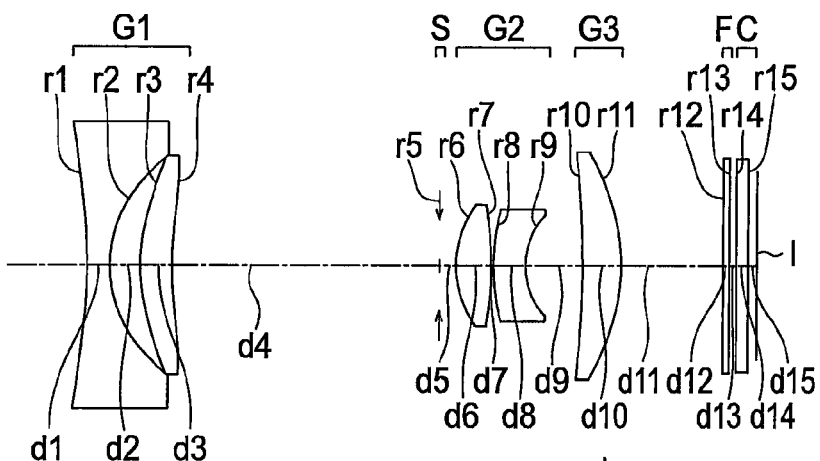
FIGS. 3A, 3B, and 3C are cross sectional views of a zoom lens according to a third example of the present invention, similar to FIGS. 1A, 1B, and 1C.
Figure 3B:
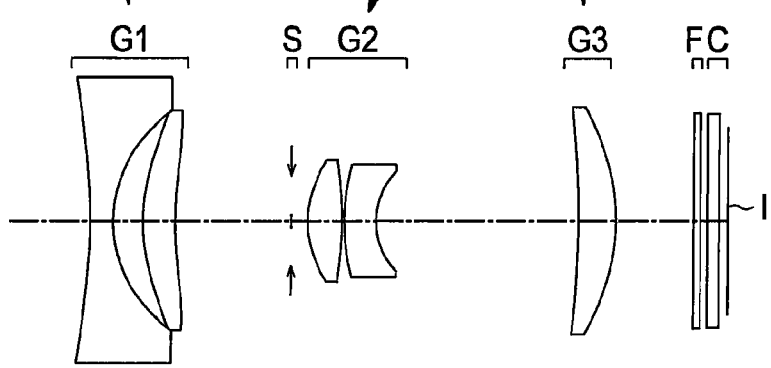
Figure 3C:
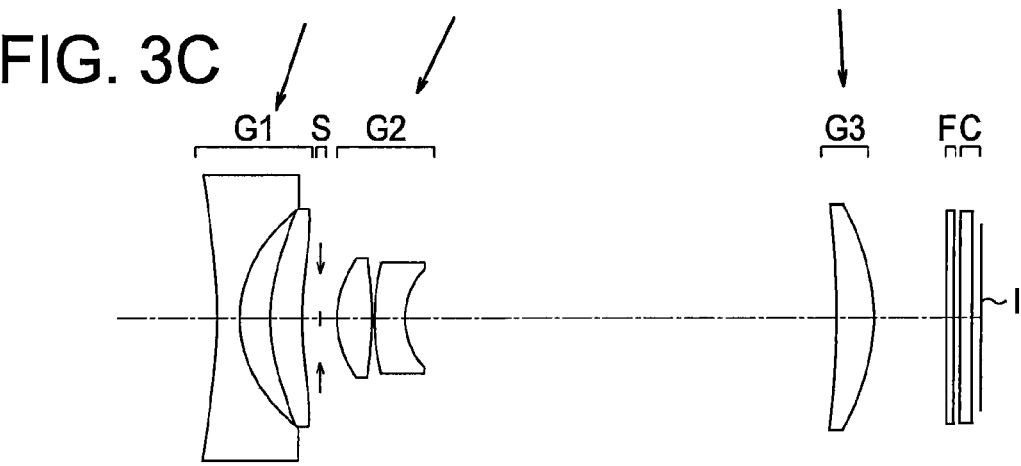

As shown in FIGS. 3A to 3C, the zoom lens according to the third example includes, in order from the object side, a first lens unit G1 having a negative refractive power, an aperture stop S, a second lens unit G2 having a positive refractive power, and a third lens unit G3 having a positive refractive power.

During zooming from the wide angle end to the telephoto end, the first lens unit G1 moves first toward the image side and thereafter reverses its moving direction to move toward the object side, the second lens unit G2 moves toward the object side, and the third lens unit G3 moves toward the image side.

The first lens unit G1 is composed of a biconcave negative lens and a positive meniscus lens having a convex surface directed toward the object side, which are arranged in order from the object side.

The second lens unit G2 is composed of a biconvex positive lens and a negative meniscus lens having a convex surface directed toward the object side, which are arranged in order from the object side.

The third lens unit G3 is composed of a positive meniscus lens having a convex surface directed toward the image side.

There are eight aspheric surfaces, which include both surfaces of the biconcave negative lens in the first lens unit G1, both surfaces of the positive meniscus lens having a convex surface directed toward the object side in the first lens unit G1, both surfaces of the biconvex positive lens in the second lens unit G2, the image side surface of the negative meniscus lens having a convex surface directed toward the object side in the second lens unit G2, and the image side surface of the positive meniscus lens having a convex surface directed toward the image side in the third lens unit G3.

Figure 4A:
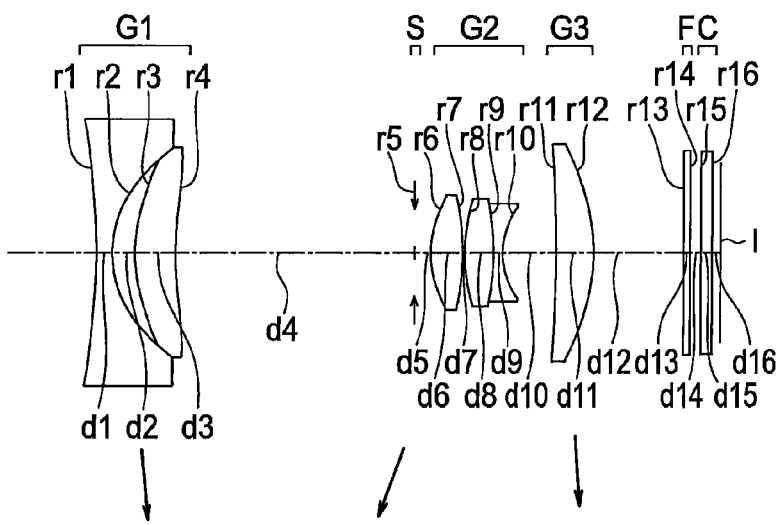
FIGS. 4A, 4B, and 4C are cross sectional views of a zoom lens according to a fourth example of the present invention, similar to FIGS. 1A, 1B, and 1C.
Figure 4B:
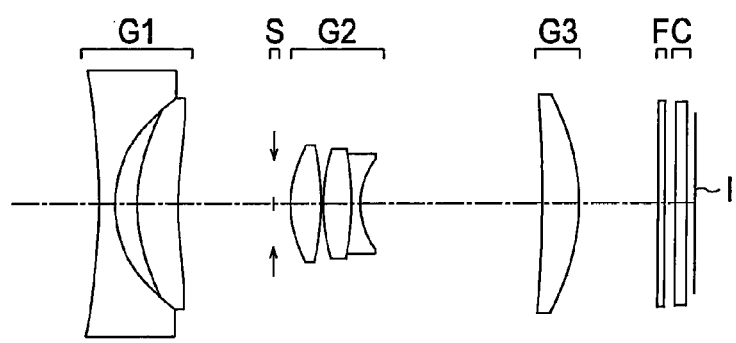
Figure 4C:
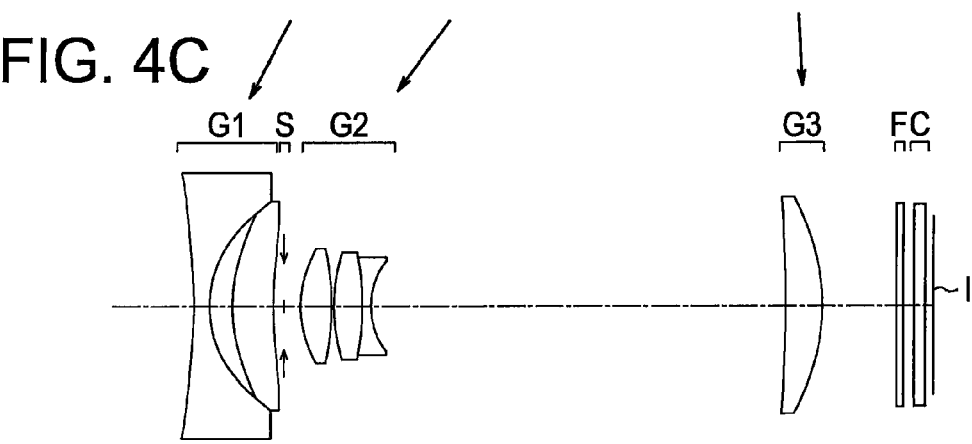

As shown in FIGS. 4A to 4C, the zoom lens according to the fourth example includes, in order from the object side, a first lens unit G1 having a negative refractive power, an aperture stop S, a second lens unit G2 having a positive refractive power, and a third lens unit G3 having a positive refractive power.

During zooming from the wide angle end to the telephoto end, the first lens unit G1 moves first toward the image side and thereafter reverses its moving direction to move toward the object side, the second lens unit G2 moves toward the object side, and the third lens unit G3 moves toward the image side.

The first lens unit G1 is composed of a biconcave negative lens and a positive meniscus lens having a convex surface directed toward the object side, which are arranged in order from the object side.

The second lens unit G2 is composed of a biconvex positive lens, and a cemented lens made up of a biconvex positive lens and a biconcave negative lens, which are arranged in order from the object side.

The third lens unit G3 is composed of a positive meniscus lens having a convex surface directed toward the image side.

There are seven aspheric surfaces, which include both surfaces of the biconcave negative lens in the first lens unit G1, both surfaces of the positive meniscus lens having a convex surface directed toward the object side in the first lens unit G1, both surfaces of the biconvex positive lens in the second lens unit G2, and the image side surface of the positive meniscus lens having a convex surface directed toward the image side in the third lens unit G3.

Figure 5A:
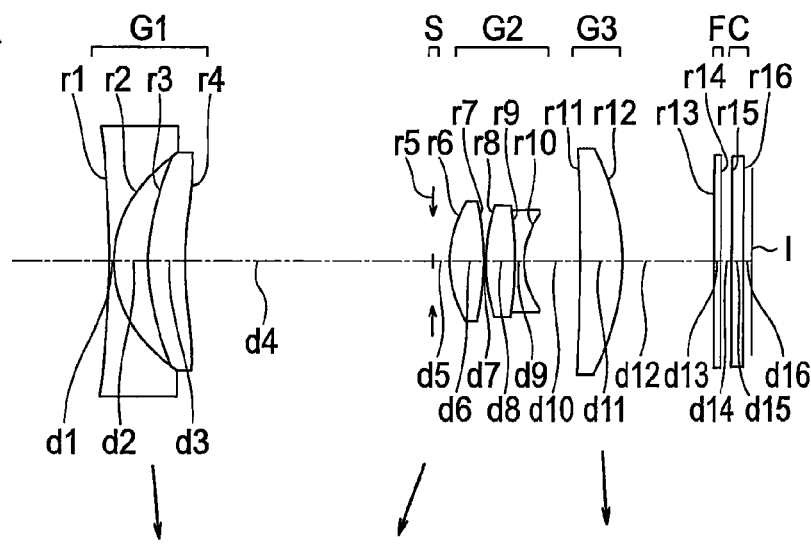
FIGS. 5A, 5B, and 5C are cross sectional views of a zoom lens according to a fifth example of the present invention, similar to FIGS. 1A, 1B, and 1C.
Figure 5B:
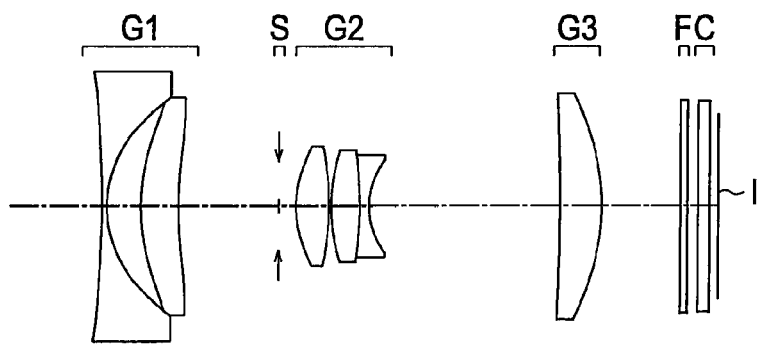
Figure 5C:
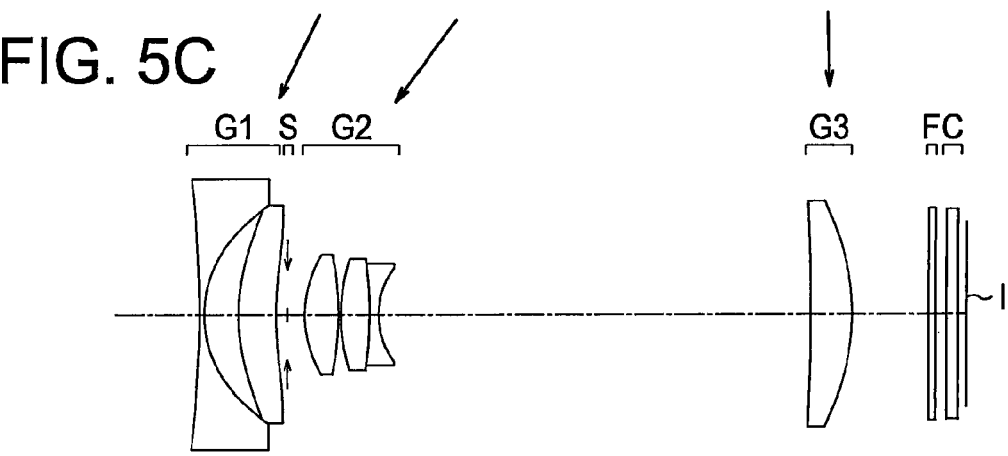

As shown in FIGS. 5A to 5C, the zoom lens according to the fifth example includes, in order from the object side, a first lens unit G1 having a negative refractive power, an aperture stop S, a second lens unit G2 having a positive refractive power, and a third lens unit G3 having a positive refractive power.

During zooming from the wide angle end to the telephoto end, the first lens unit G1 moves first toward the image side and thereafter reverses its moving direction to move toward the object side, the second lens unit G2 moves toward the object side, and the third lens unit G3 moves toward the image side.

The first lens unit G1 is composed of a biconcave negative lens and a positive meniscus lens having a convex surface directed toward the object side, which are arranged in order from the object side.

The second lens unit G2 is composed of a biconvex positive lens, and a cemented lens made up of a biconvex positive lens and a biconcave negative lens, which are arranged in order from the object side.

The third lens unit G3 is composed of a positive meniscus lens having a convex surface directed toward the image side.

There are seven aspheric surfaces, which include both surfaces of the biconcave negative lens in the first lens unit G1, both surfaces of the positive meniscus lens having a convex surface directed toward the object side in the first lens unit G1, both surfaces of the biconvex positive lens in the second lens unit G2, and the image side surface of the positive meniscus lens having a convex surface directed toward the image side in the third lens unit G3.

Figure 6A:
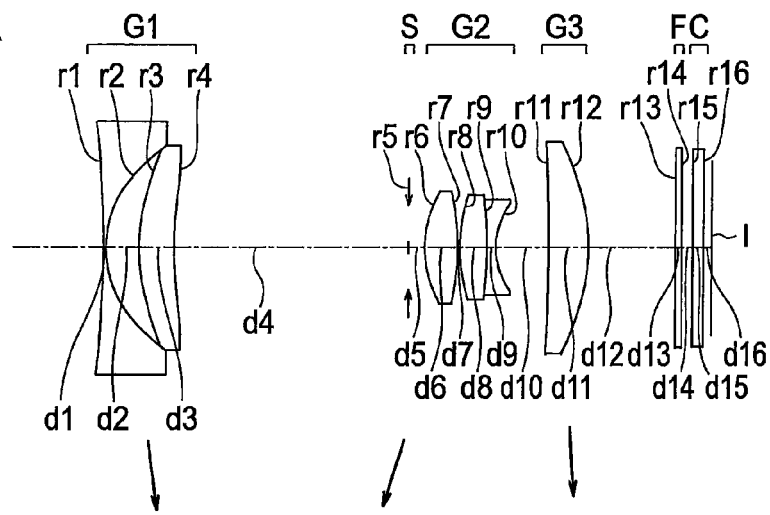
FIGS. 6A, 6B, and 6C are cross sectional views of a zoom lens according to a sixth example of the present invention, similar to FIGS. 1A, 1B, and 1C.
Figure 6B:
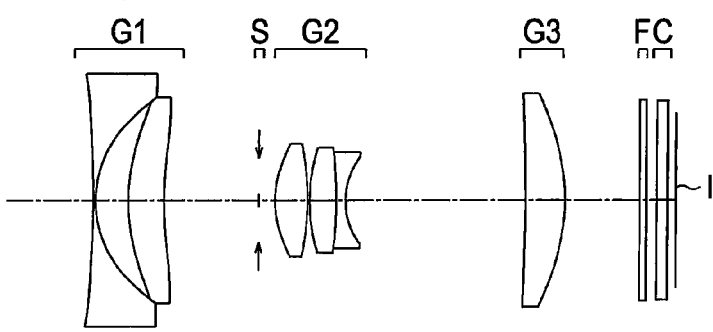
Figure 6C:
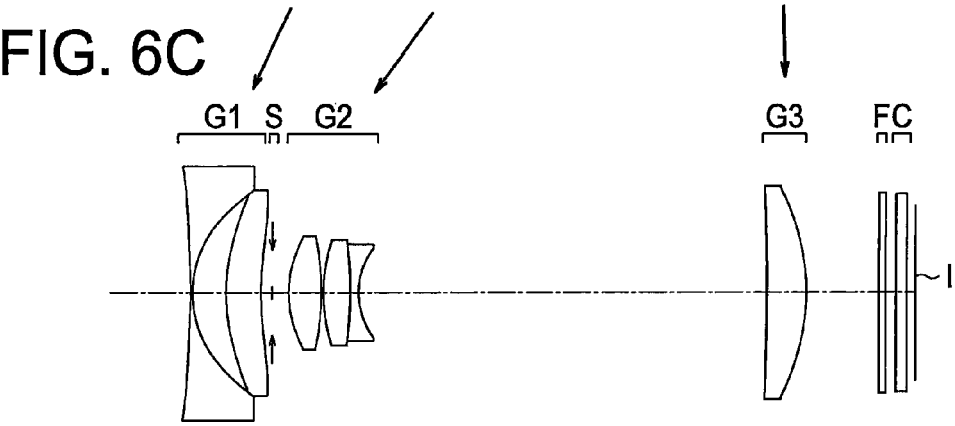

As shown in FIGS. 6A to 6C, the zoom lens according to the sixth example includes, in order from the object side, a first lens unit G1 having a negative refractive power, an aperture stop S, a second lens unit G2 having a positive refractive power, and a third lens unit G3 having a positive refractive power.

During zooming from the wide angle end to the telephoto end, the first lens unit G1 moves first toward the image side and thereafter reverses its moving direction to move toward the object side, the second lens unit G2 moves toward the object side, and the third lens unit G3 moves toward the image side.

The first lens unit G1 is composed of a biconcave negative lens and a positive meniscus lens having a convex surface directed toward the object side, which are arranged in order from the object side.

The second lens unit G2 is composed of a biconvex positive lens, and a cemented lens made up of a biconvex positive lens and a biconcave negative lens, which are arranged in order from the object side.

The third lens unit G3 is composed of a positive meniscus lens having a convex surface directed toward the image side.

There are seven aspheric surfaces, which include both surfaces of the biconcave negative lens in the first lens unit G1, both surfaces of the positive meniscus lens having a convex surface directed toward the object side in the first lens unit G1, both surfaces of the biconvex positive lens in the second lens unit G2, and the image side surface of the positive meniscus lens having a convex surface directed toward the image side in the third lens unit G3.

Figure 7A:
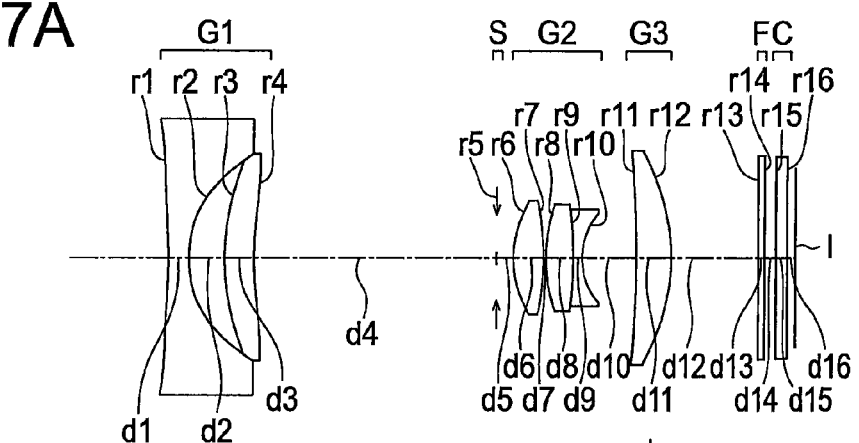
FIGS. 7A, 7B, and 7C are cross sectional views of a zoom lens according to a seventh example of the present invention, similar to FIGS. 1A, 1B, and 1C.
Figure 7B:
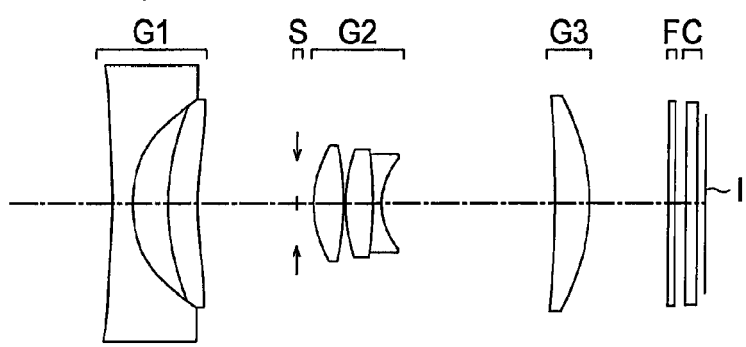
Figure 7C:
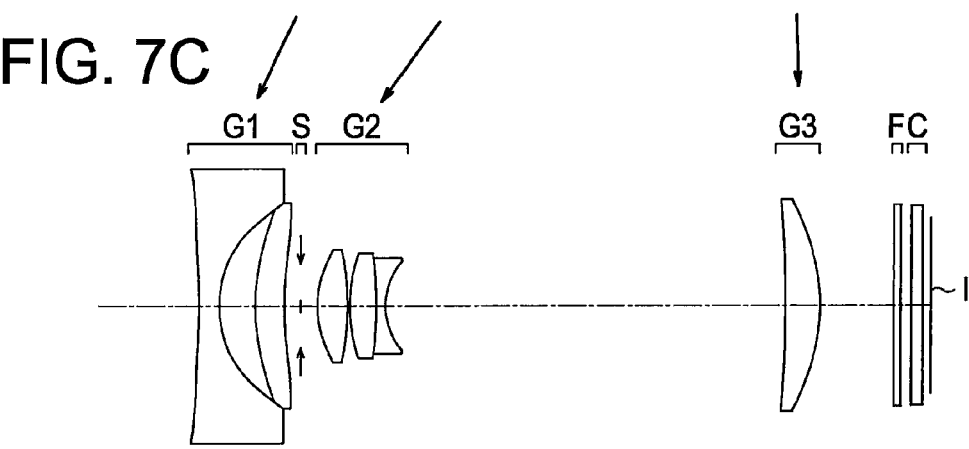

As shown in FIGS. 7A to 7C, the zoom lens according to the seventh example includes, in order from the object side, a first lens unit G1 having a negative refractive power, an aperture stop S, a second lens unit G2 having a positive refractive power, and a third lens unit G3 having a positive refractive power.

During zooming from the wide angle end to the telephoto end, the first lens unit G1 moves first toward the image side and thereafter reverses its moving direction to move toward the object side, the second lens unit G2 moves toward the object side, and the third lens unit G3 moves toward the image side.

The first lens unit G1 is composed of a biconcave negative lens and a positive meniscus lens having a convex surface directed toward the object side, which are arranged in order from the object side.

The second lens unit G2 is composed of a biconvex positive lens, and a cemented lens made up of a biconvex positive lens and a biconcave negative lens, which are arranged in order from the object side.

The third lens unit G3 is composed of a positive meniscus lens having a convex surface directed toward the image side.

There are seven aspheric surfaces, which include both surfaces of the biconcave negative lens in the first lens unit G1, both surfaces of the positive meniscus lens having a convex surface directed toward the object side in the first lens unit G1, both surfaces of the biconvex positive lens in the second lens unit G2, and the image side surface of the positive meniscus lens having a convex surface directed toward the image side in the third lens unit G3.

Figure 8A:
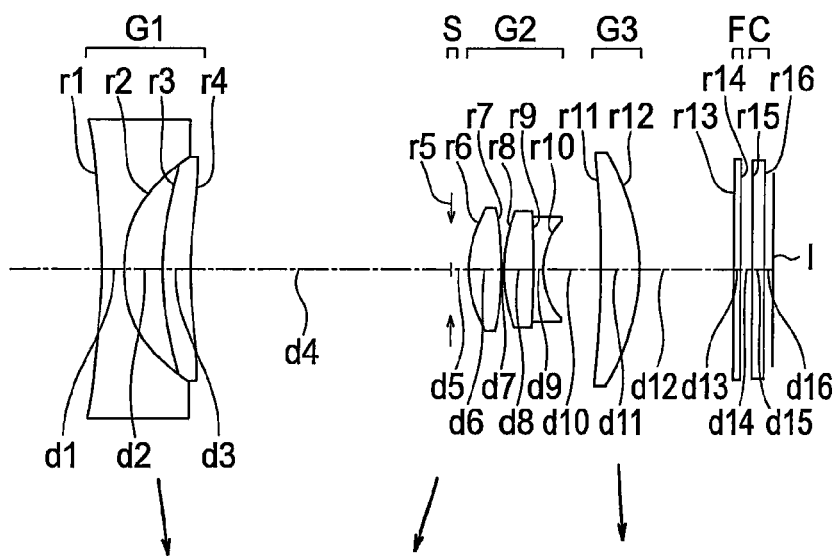
FIGS. 8A, 8B, and 8C are cross sectional views of a zoom lens according to an eighth example of the present invention, similar to FIGS. 1A, 1B, and 1C.
Figure 8B:
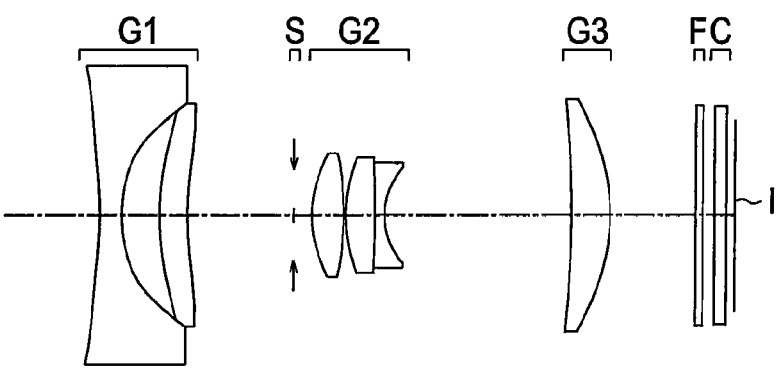
Figure 8C:
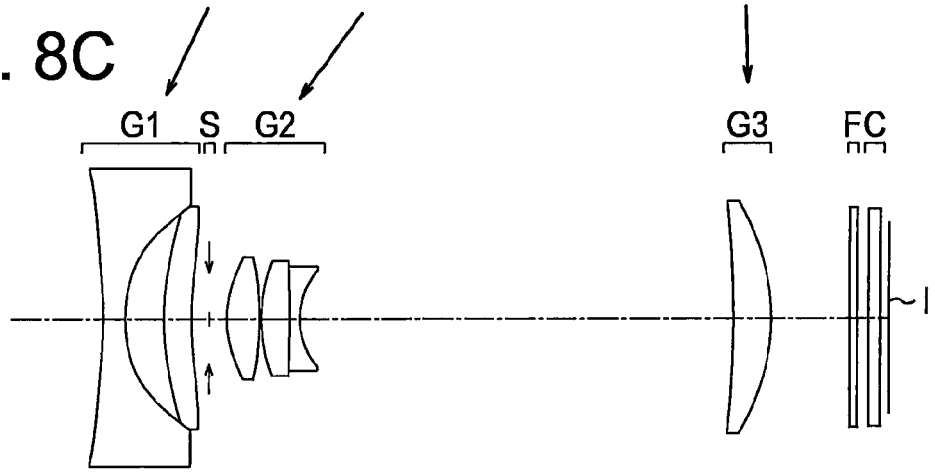

As shown in FIGS. 8A to 8C, the zoom lens according to the eighth example includes, in order from the object side, a first lens unit G1 having a negative refractive power, an aperture stop S, a second lens unit G2 having a positive refractive power, and a third lens unit G3 having a positive refractive power.

During zooming from the wide angle end to the telephoto end, the first lens unit G1 moves first toward the image side and thereafter reverses its moving direction to move toward the object side, the second lens unit G2 moves toward the object side, and the third lens unit G3 moves toward the image side.

The first lens unit G1 is composed of a biconcave negative lens and a positive meniscus lens having a convex surface directed toward the object side, which are arranged in order from the object side.

The second lens unit G2 is composed of a biconvex positive lens, and a cemented lens made up of a biconvex positive lens and a biconcave negative lens, which are arranged in order from the object side.

The third lens unit G3 is composed of a positive meniscus lens having a convex surface directed toward the image side.

There are seven aspheric surfaces, which include both surfaces of the biconcave negative lens in the first lens unit G1, both surfaces of the positive meniscus lens having a convex surface directed toward the object side in the first lens unit G1, both surfaces of the biconvex positive lens in the second lens unit G2, and the image side surface of the positive meniscus lens having a convex surface directed toward the image side in the third lens unit G3.

Figure 9A:
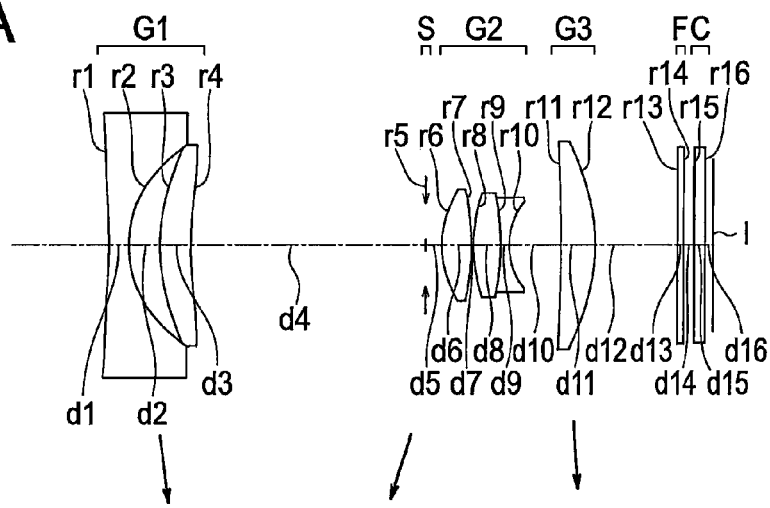
FIGS. 9A, 9B, and 9C are cross sectional views of a zoom lens according to a ninth example of the present invention, similar to FIGS. 1A, 1B, and 1C.
Figure 9B:
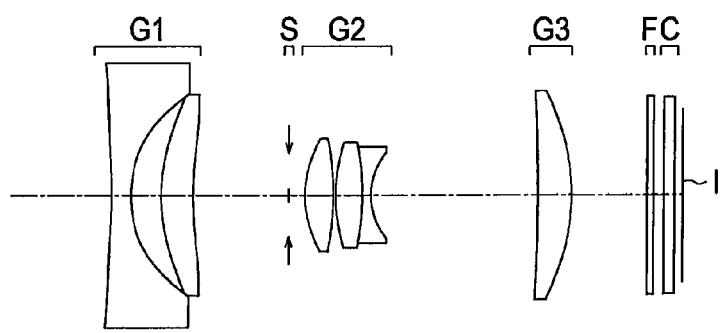
Figure 9C:
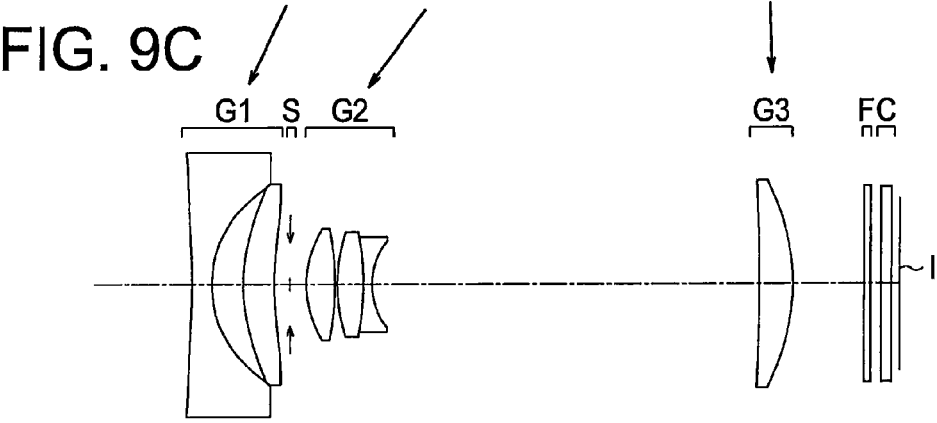

As shown in FIGS. 9A to 9C, the zoom lens according to the ninth example includes, in order from the object side, a first lens unit G1 having a negative refractive power, an aperture stop S, a second lens unit G2 having a positive refractive power, and a third lens unit G3 having a positive refractive power.

During zooming from the wide angle end to the telephoto end, the first lens unit G1 moves first toward the image side and thereafter reverses its moving direction to move toward the object side, the second lens unit G2 moves toward the object side, and the third lens unit G3 moves toward the image side.

The first lens unit G1 is composed of a biconcave negative lens and a positive meniscus lens having a convex surface directed toward the object side, which are arranged in order from the object side.

The second lens unit G2 is composed of a biconvex positive lens, and a cemented lens made up of a biconvex positive lens and a biconcave negative lens, which are arranged in order from the object side.

The third lens unit G3 is composed of a positive meniscus lens having a convex surface directed toward the image side.

There are seven aspheric surfaces, which include both surfaces of the biconcave negative lens in the first lens unit G1, both surfaces of the positive meniscus lens having a convex surface directed toward the object side in the first lens unit G1, both surfaces of the biconvex positive lens in the second lens unit G2, and the image side surface of the positive meniscus lens having a convex surface directed toward the image side in the third lens unit G3.

Figure 10A:
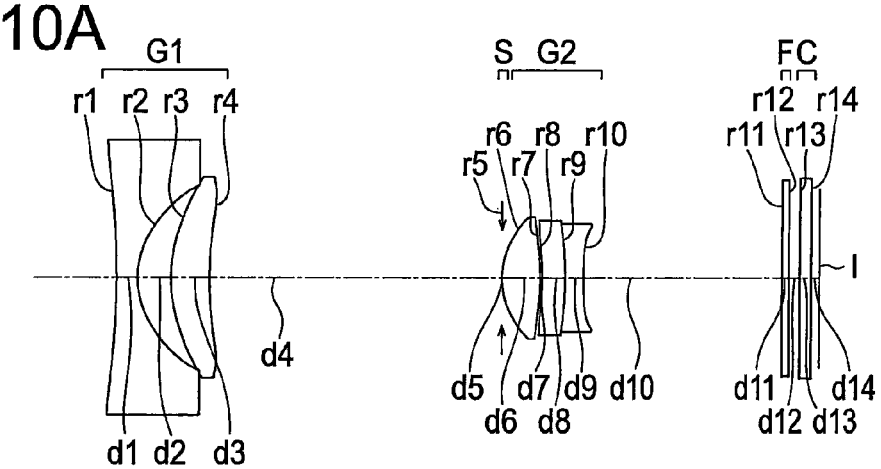
FIGS. 10A, 10B, and 10C are cross sectional views of a zoom lens according to a tenth example of the present invention, similar to FIGS. 1A, 1B, and 1C.
Figure 10B:
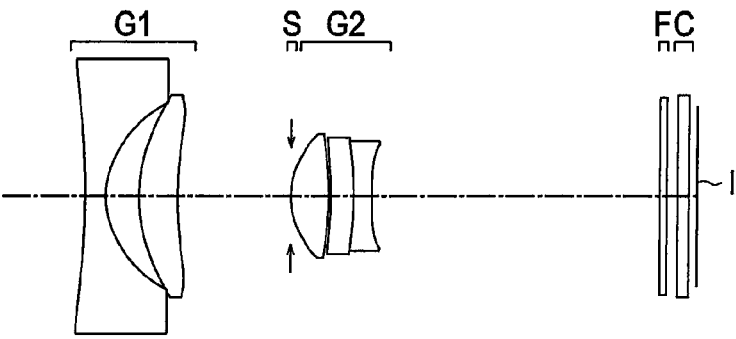
Figure 10C:
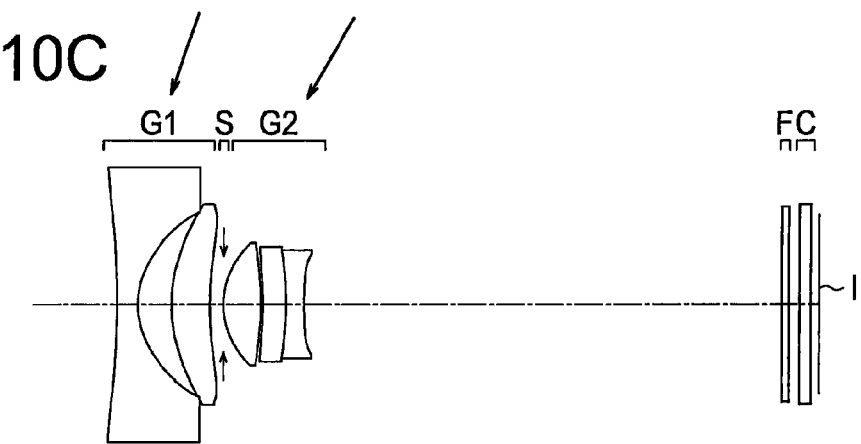

As shown in FIGS. 10A to 10C, the zoom lens according to the tenth example includes, in order from the object side, a first lens unit G1 having a negative refractive power, an aperture stop S, and a second lens unit G2 having a positive refractive power.

During zooming from the wide angle end to the telephoto end, the first lens unit G1 moves first toward the image side and thereafter reverses its moving direction to move toward the object side, and the second lens unit G2 moves toward the object side.

The first lens unit G1 is composed of a biconcave negative lens and a positive meniscus lens having a convex surface directed toward the object side, which are arranged in order from the object side.

The second lens unit G2 is composed of a biconvex positive lens, and a cemented lens made up of a negative meniscus lens having a convex surface directed toward the image side and a biconcave negative lens, which are arranged in order from the object side.

There are eight aspheric surfaces, which include both surfaces of the biconcave negative lens in the first lens unit G1, both surfaces of the positive meniscus lens having a convex surface directed toward the object side in the first lens unit G1, both surfaces of the biconvex positive lens in the second lens unit G2, the object side surface of the negative meniscus lens having a convex surface directed toward the image side in the second lens unit G2, and the image side surface of the biconcave negative lens in the second lens unit G2.

Figure 11A:
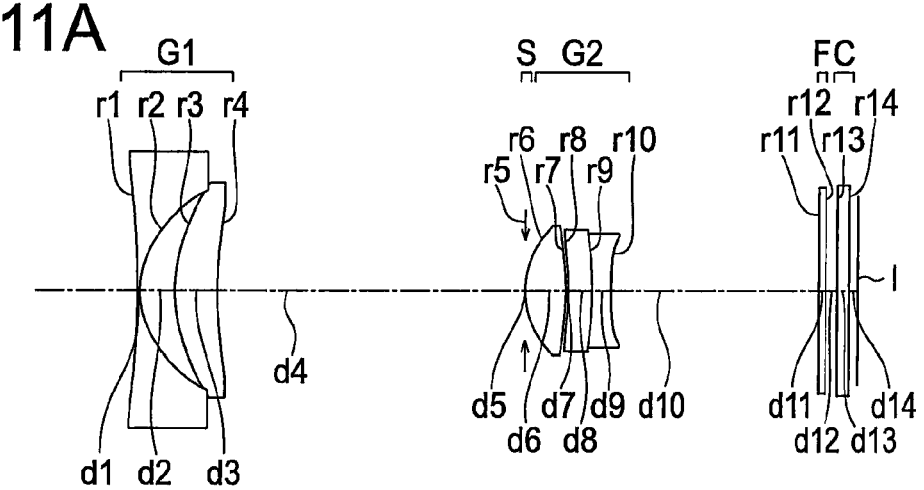
FIGS. 11A, 11B, and 11C are cross sectional views of a zoom lens according to an eleventh example of the present invention, similar to FIGS. 1A, 1B, and 1C.
Figure 11B:
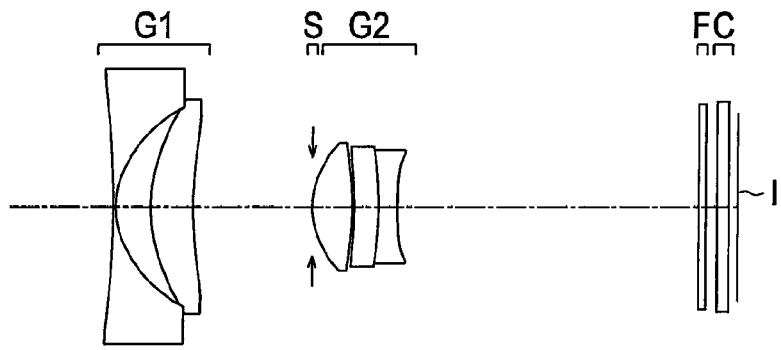
Figure 11C:
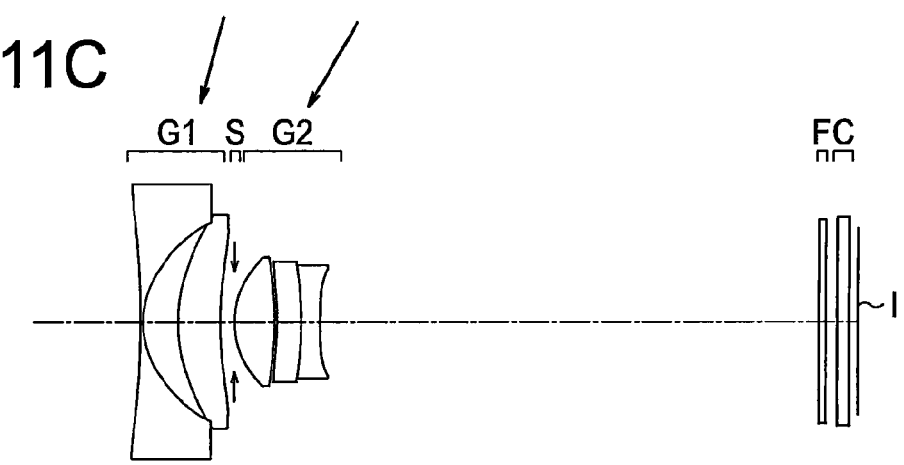

As shown in FIGS. 11A to 11C, the zoom lens according to the eleventh example includes, in order from the object side, a first lens unit G1 having a negative refractive power, an aperture stop S, and a second lens unit G2 having a positive refractive power.

During zooming from the wide angle end to the telephoto end, the first lens unit G1 moves first toward the image side and thereafter reverses its moving direction to move toward the object side, and the second lens unit G2 moves toward the object side.

The first lens unit G1 is composed of a biconcave negative lens and a positive meniscus lens having a convex surface directed toward the object side, which are arranged in order from the object side.

The second lens unit G2 is composed of a biconvex positive lens, and a cemented lens made up of a negative meniscus lens having a convex surface directed toward the image side and a biconcave negative lens, which are arranged in order from the object side.

There are eight aspheric surfaces, which include both surfaces of the biconcave negative lens in the first lens unit G1, both surfaces of the positive meniscus lens having a convex surface directed toward the object side in the first lens unit G1, both surfaces of the biconvex positive lens in the second lens unit G2, the object side surface of the negative meniscus lens having a convex surface directed toward the image side in the second lens unit G2, and the image side surface of the biconcave negative lens in the second lens unit G2.

In each example, the aperture stop moves integrally with the second lens unit G2. All the numerical data presented below are for the state in which the zoom lens is focused on an object at infinity. In the numerical data, dimensions are in millimeters and angles are in degrees. In all the examples, the focusing operation is performed by moving the lens unit closest to the image side. Zoom data will be presented for the wide angle end (WE) of the zoom range, an intermediate focal length state (ST), and the telephoto end (TE) of the zoom range. The positive/negative sign of the refractive power is determined based on the paraxial radius of curvature.

A flare stop may be provided in addition to the aperture stop in order to eliminate unwanted light that may cause ghost images, lens flare or the like. The flare stop may be disposed on the object side of the first lens unit, between the first lens unit and the second lens unit, or between the second lens unit and the third lens unit. In the case of three unit zoom lenses, the flare stop may be disposed between the third lens unit and the image plane. In the case of four-unit zoom lenses, the flare stop may be disposed between the third lens unit and the fourth lens unit or between the fourth lens unit and the image plane. A frame member or other member may be adapted to cut rays that may cause lens flare. Alternatively, a flare stop may be provided on an optical component of the optical system by direct printing or by attaching a sticker. The aperture of the flare stop may have various shapes such as circular, elliptical, rectangular, or polygonal shape, or the shape of the aperture may be defined by a curve specified by a mathematical function. The flare stop may be adapted to cut not only detrimental beams but also beams that may cause coma flare etc. in the peripheral region of the picture area.

Antireflection coating may be applied on each lens to reduce ghost images and lens flare. Multi-layer coating will reduce ghost images and lens flare effectively. Anti-reflection coating on the surfaces of lenses exposed to air is generally adopted to prevent ghost images and lens flare. Coating for cutting infrared light may be applied on a lens surface(s) and/or a surface of the cover glass etc.

The refractive index of adhesives used on the cemented surface of cemented lenses is significantly higher than the refractive index of air. Consequently, the reflectivity of the cemented surface is as low as or lower than surfaces having single-layer coating in many cases. Therefore, antireflection coating is seldom applied to the cemented surface of cemented lenses. However, antireflection coating may be applied on the cemented surface. This will further reduce ghost images and lens flare, and better images can be obtained consequently.

It is preferred that the focusing operation be performed by moving the third lens unit in the case of the three-unit zoom lens or by moving the third or fourth lens unit in the case of the four-unit zoom lens. Since these lens units are light in weight, performing focusing by these lens units makes the load on the motor small. The focusing operation may be performed by moving other lens unit. A plurality of lens units may be moved for focusing. The focusing operation may be performed by advancing the entire optical system or by advancing or retracting one or some lenses.

Figure 12A:
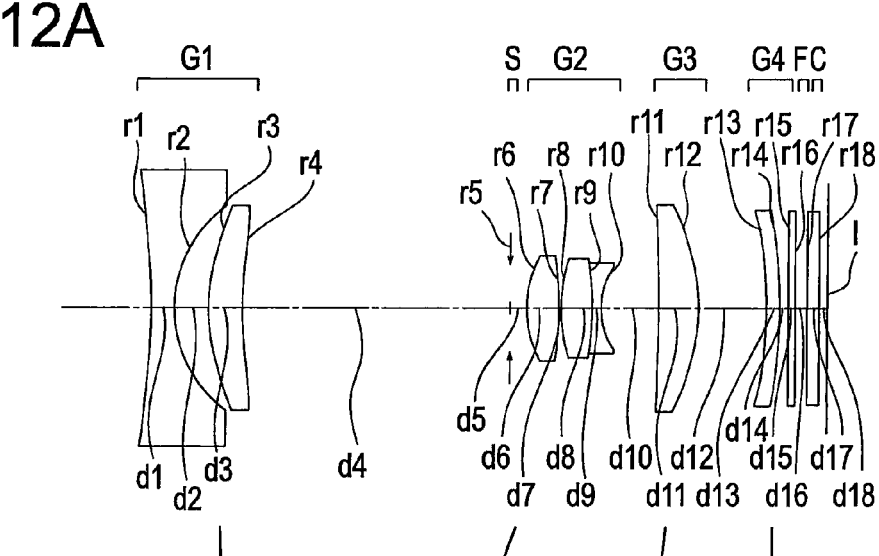
FIGS. 12A, 12B, and 12C are cross sectional views of a zoom lens according to a twelfth example of the present invention, similar to FIGS. 1A, 1B, and 1C.
Figure 12B:
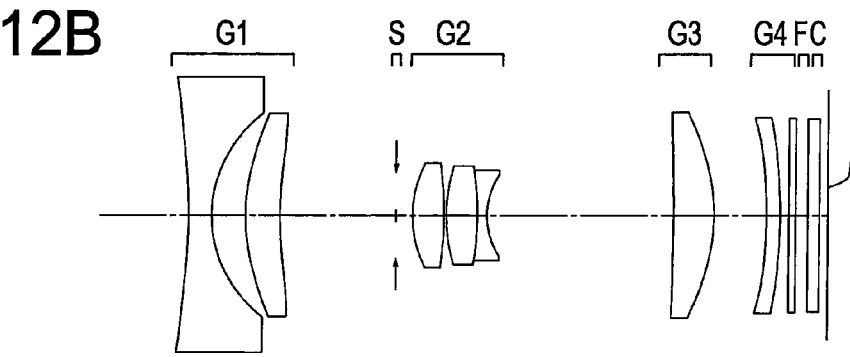
Figure 12C:
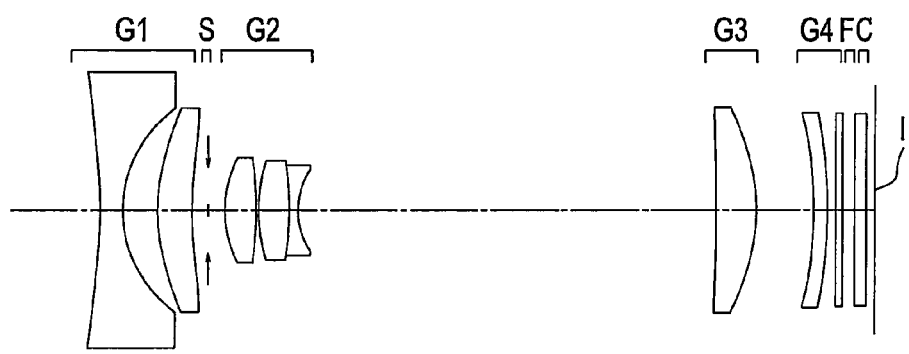

As shown in FIGS. 12A to 12C, the zoom lens according to the twelfth example includes, in order from the object side, a first lens unit G1 having a negative refractive power, an aperture stop S, a second lens unit G2 having a positive refractive power, a third lens unit G3 having a positive refractive power, and a fourth lens unit G4 having a positive refractive power.

During zooming from the wide angle end to the telephoto end, the first lens unit G1 moves first toward the image side and thereafter reverses its moving direction to move toward the object side, the second lens unit G2 moves toward the object side, the third lens unit G3 moves first toward the image side and thereafter reverses its moving direction to move toward the object side, and the fourth lens unit is stationary.

The first lens unit G1 is composed of a biconcave negative lens and a positive meniscus lens having a convex surface directed toward the object side, which are arranged in order from the object side. The second lens unit G2 is composed of a biconvex positive lens, and a cemented lens made up of a biconvex positive lens and a biconcave negative lens, which are arranged in order from the object side. The third lens unit G3 is composed of a positive meniscus lens having a convex surface directed toward the image side. The fourth lens unit G4 is composed of a positive meniscus lens having a convex surface directed toward the image side. The fourth lens unit G4 constitutes a field lens, which is separated from an image pickup element.

There are eight aspheric surfaces, which include both surfaces of the biconcave negative lens in the first lens unit G1, both surfaces of the positive meniscus lens having a convex surface directed toward the object side in the first lens unit G1, both surfaces of the object side biconvex positive lens in the second lens unit G2, the image side surface of the positive meniscus lens having a convex surface directed toward the image side in the third lens unit G3, and the object side surface of the positive meniscus lens having a convex surface directed toward the image side in the fourth lens unit G4.

Figure 13A:
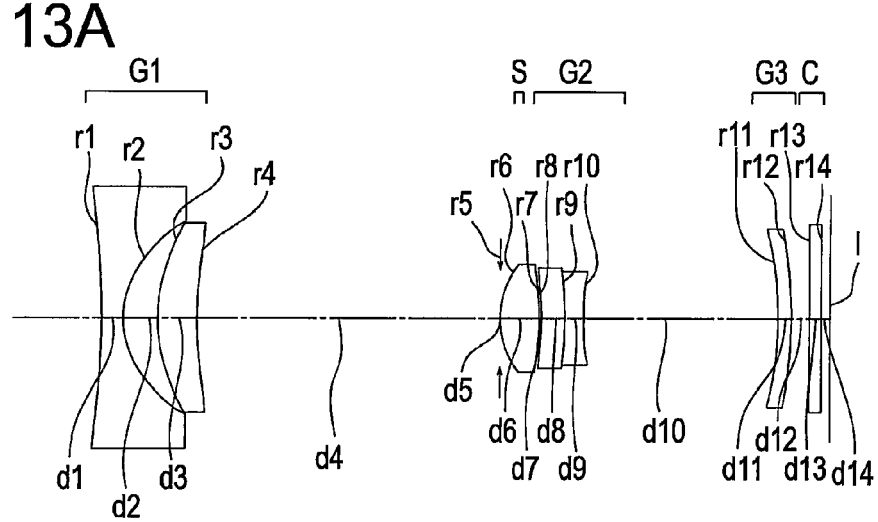
FIGS. 13A, 13B, and 13C are cross sectional views of a zoom lens according to a thirteenth example of the present invention, similar to FIGS. 1A, 1B, and 1C.
Figure 13B:
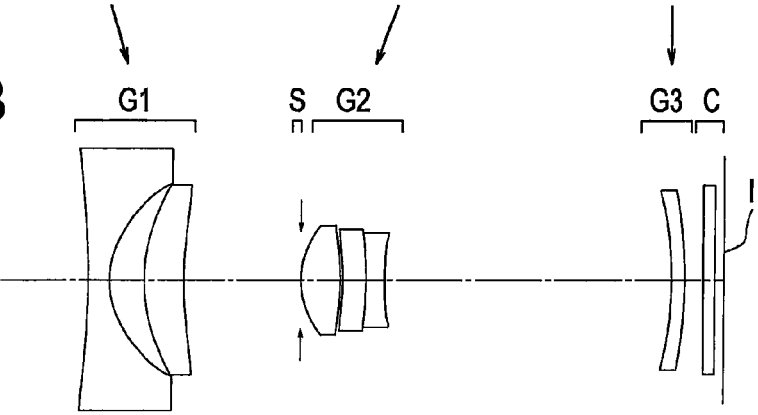
Figure 13C:
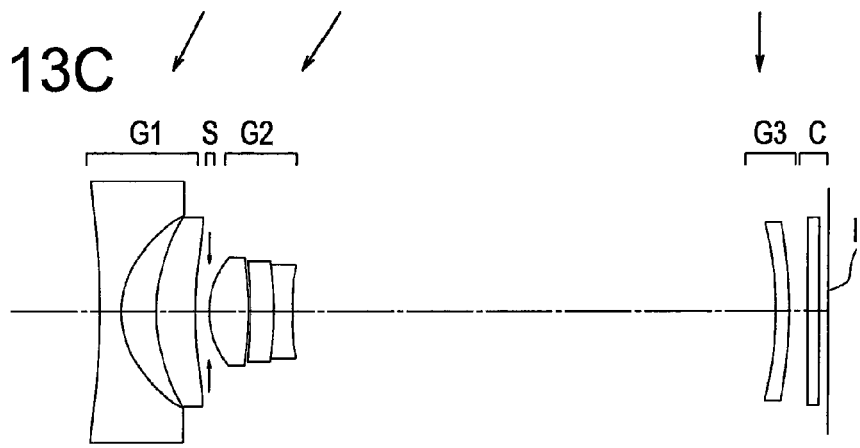

As shown in FIGS. 13A to 13C, the zoom lens according to the thirteenth example includes, in order from the object side, a first lens unit G1 having a negative refractive power, an aperture stop S, a second lens unit G2 having a positive refractive power, and a third lens unit G3 having a positive refractive power.

During zooming from the wide angle end to the telephoto end, the first lens unit G1 moves first toward the image side and thereafter reverses its moving direction to move toward the object side, the second lens unit G2 moves toward the object side, and the third lens unit G3 is stationary.

The first lens unit G1 is composed of a biconcave negative lens and a positive meniscus lens having a convex surface directed toward the object side, which are arranged in order from the object side. The second lens unit G2 is composed of a biconvex positive lens, and a cemented lens made up of a negative meniscus lens having a convex surface directed toward the image side and a biconcave negative lens, which are arranged in order from the object side. The third lens unit G3 is composed of a positive meniscus lens having a convex surface directed toward the image side. The third lens unit G3 constitutes a field lens, which is integrated with an image pickup element.

There are nine aspheric surfaces, which include both surfaces of the biconcave negative lens in the first lens unit G1, both surfaces of the positive meniscus lens having a convex surface directed toward the object side in the first lens unit G1, both surfaces of the biconvex positive lens in the second lens unit G2, the object side surface of the negative meniscus lens having a convex surface directed toward the image side in the second lens unit G2, the image side surface of the biconcave negative lens in the second lens unit G2, the object side surface of the positive meniscus lens having a convex surface directed toward the image side in the third lens unit G3.

Figure 14A:
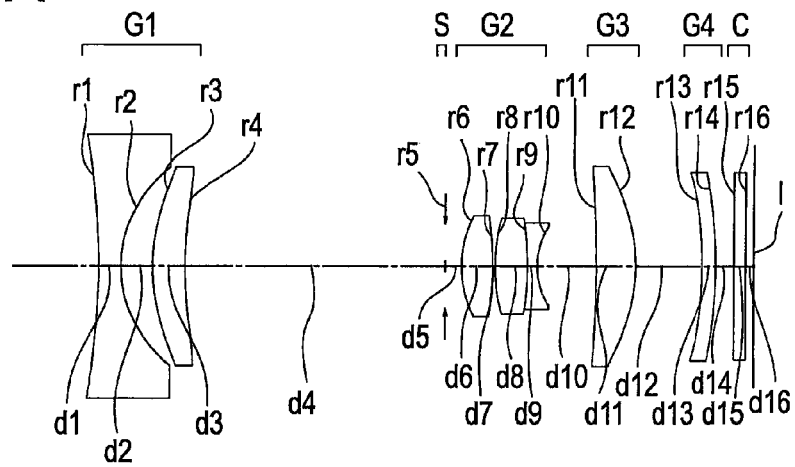
FIGS. 14A, 14B, and 14C are cross sectional views of a zoom lens according to a fourteenth example of the present invention, similar to FIGS. 1A, 1B, and 1C.
Figure 14B:
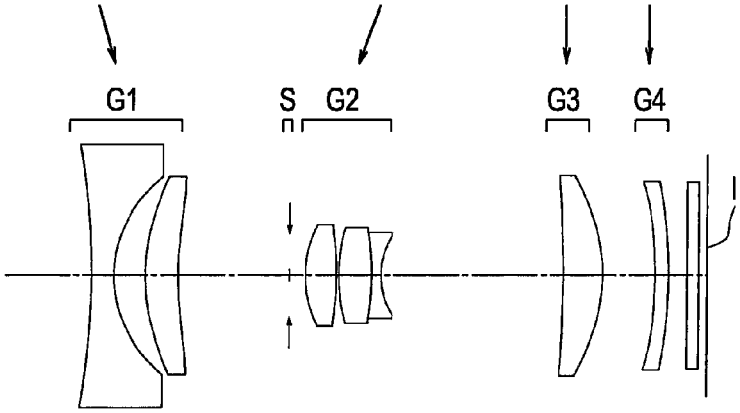
Figure 14C:
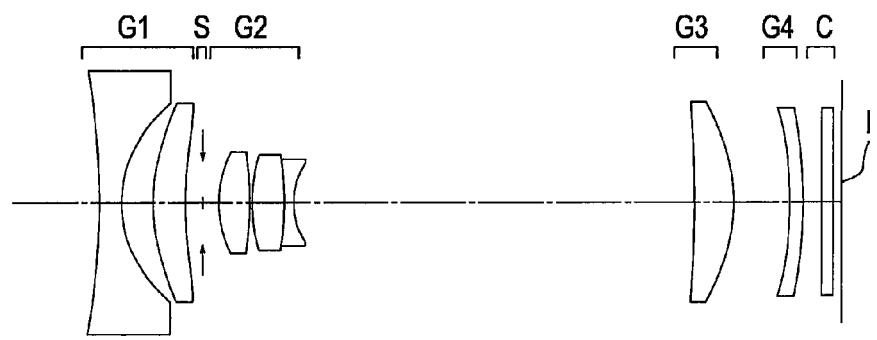

As shown in FIGS. 14A to 14C, the zoom lens according to the fourteenth example includes, in order from the object side, a first lens unit G1 having a negative refractive power, an aperture stop S, a second lens unit G2 having a positive refractive power, a third lens unit G3 having a positive refractive power, and a fourth lens unit G4 having a positive refractive power.

During zooming from the wide angle end to the telephoto end, the first lens unit G1 moves first toward the image side and thereafter reverses its moving direction to move toward the object side, the second lens unit G2 moves toward the object side, the third lens unit G3 moves first toward the image side and thereafter reverses its moving direction to move toward the object side, and the fourth lens unit G4 is stationary.

The first lens unit G1 is composed of a biconcave negative lens and a positive meniscus lens having a convex surface directed toward the object side, which are arranged in order from the object side. The second lens unit G2 is composed of a biconvex positive lens, and a cemented lens made up of a biconvex positive lens and a biconcave negative lens, which are arranged in order from the object side. The third lens unit G3 is composed of a positive meniscus lens having a convex surface directed toward the image side. The fourth lens unit G4 is composed of a positive meniscus lens having a convex surface directed toward the image side. The fourth lens unit G4 constitutes a field lens, which is integrated with an image pickup element.

There are eight aspheric surfaces, which include both surfaces of the biconcave negative lens in the first lens unit G1, both surfaces of the positive meniscus lens having a convex surface directed toward the object side in the first lens unit G1, both surfaces of the object side biconvex positive lens in the second lens unit G2, the image side surface of the positive meniscus lens having a convex surface directed toward the image side in the third lens unit G3, and the object side surface of the positive meniscus lens having a convex surface directed toward the image side in the fourth lens unit G4.

Figure 15A:
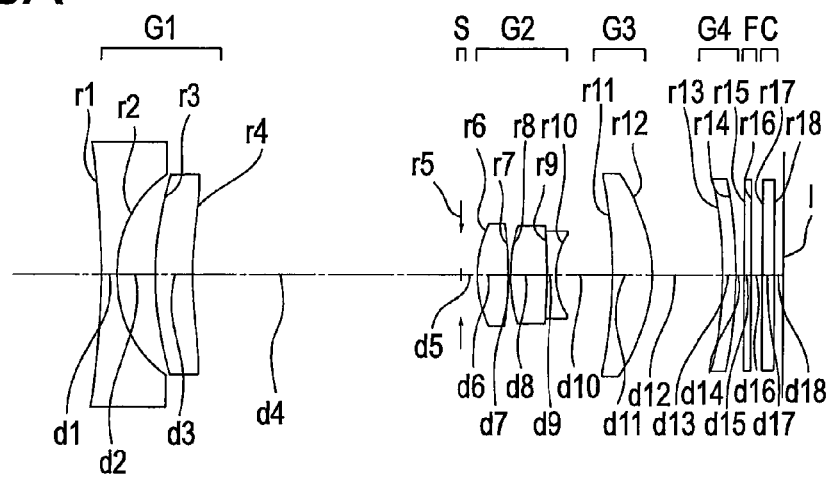
FIGS. 15A, 15B, and 15C are cross sectional views of a zoom lens according to a fifteenth example of the present invention, similar to FIGS. 1A, 1B, and 1C.
Figure 15B:
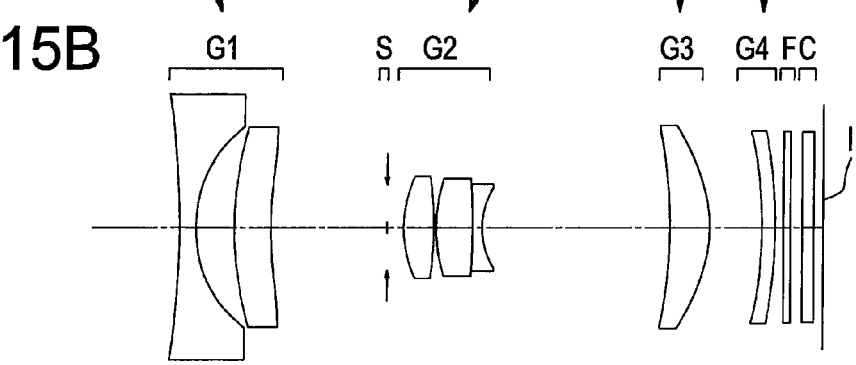
Figure 15C:
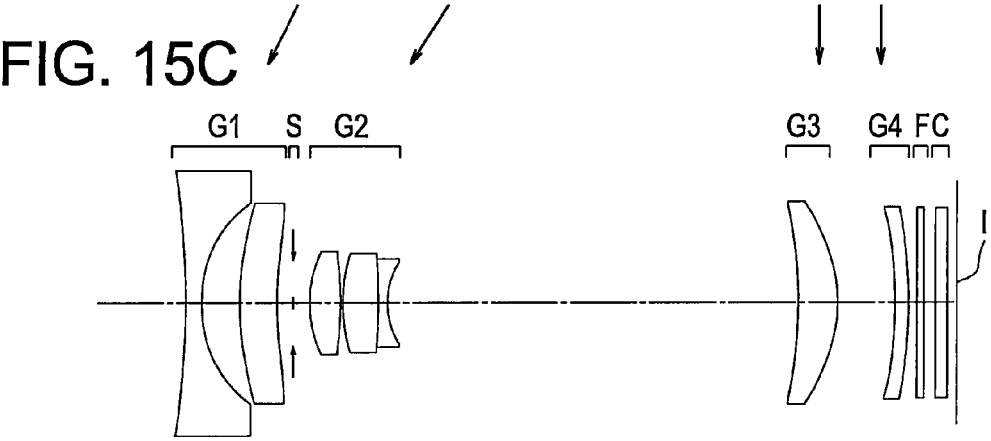

As shown in FIGS. 15A to 15C, the zoom lens according to the fifteenth example includes, in order from the object side, a first lens unit G1 having a negative refractive power, an aperture stop S, a second lens unit G2 having a positive refractive power, a third lens unit G3 having a positive refractive power, and a fourth lens unit G4 having a positive refractive power.

During zooming from the wide angle end to the telephoto end, the first lens unit G1 moves first toward the image side and thereafter reverses its moving direction to move toward the object side, the second lens unit G2 moves toward the object side, the third lens unit G3 moves first toward the image side and thereafter reverses its moving direction to move toward the object side, and the fourth lens unit G4 is stationary.

The first lens unit G1 is composed of a biconcave negative lens and a positive meniscus lens having a convex surface directed toward the object side, which are arranged in order from the object side. The second lens unit G2 is composed of a biconvex positive lens, and a cemented lens made up of a biconvex positive lens and a biconcave negative lens, which are arranged in order from the object side. The third lens unit G3 is composed of a positive meniscus lens having a convex surface directed toward the image side. The fourth lens unit G4 is composed of a positive meniscus lens having a convex surface directed toward the image side. The fourth lens unit G4 constitutes a field lens, which is separated from an image pickup element.

There are eight aspheric surfaces, which include both surfaces of the biconcave negative lens in the first lens unit G1, both surfaces of the positive meniscus lens having a convex surface directed toward the object side in the first lens unit G1, both surfaces of the object side biconvex positive lens in the second lens unit G2, the image side surface of the positive meniscus lens having a convex surface directed toward the image side in the third lens unit G3, and the object side surface of the positive meniscus lens having a convex surface directed toward the image side in the fourth lens unit G4.

Figure 16A:
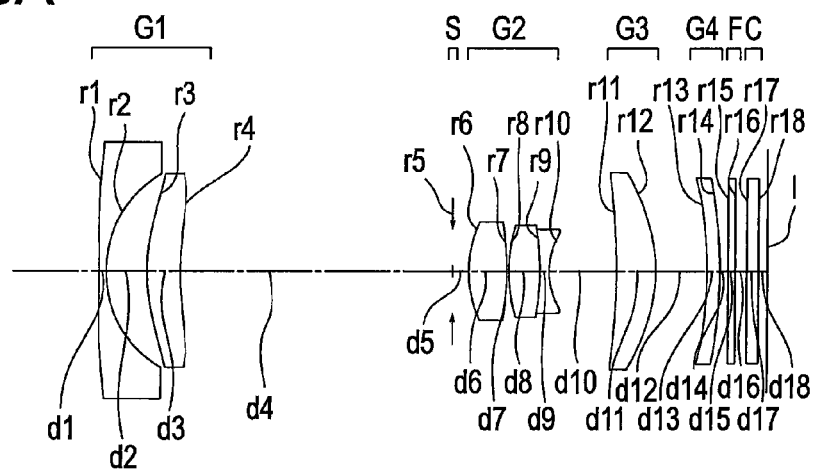
FIGS. 16A, 16B, and 16C are cross sectional views of a zoom lens according to a sixteenth example of the present invention, similar to FIGS. 1A, 1B, and 1C.
Figure 16B:
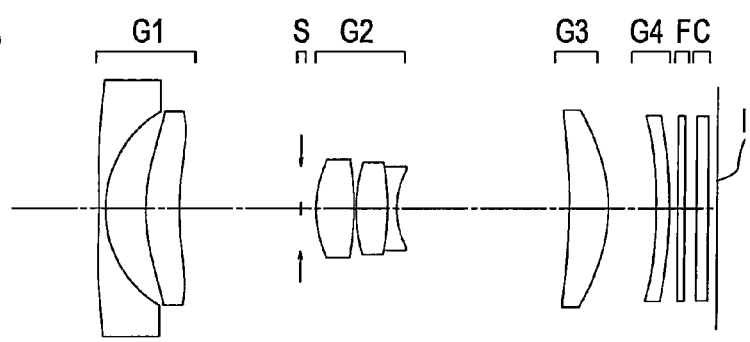
Figure 16C:
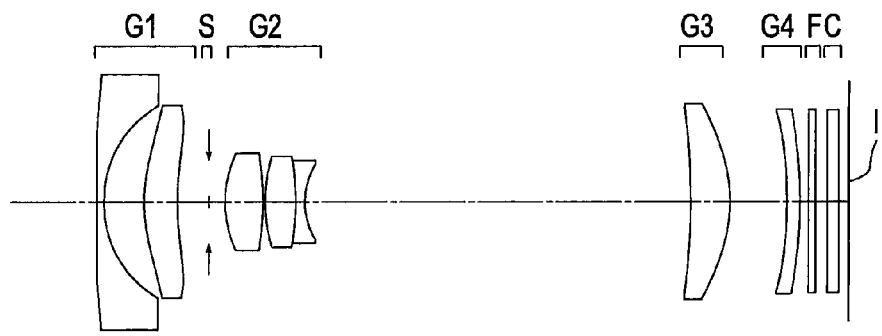

As shown in FIGS. 16A to 16C, the zoom lens according to the sixteenth example includes, in order from the object side, a first lens unit G1 having a negative refractive power, an aperture stop S, a second lens unit G2 having a positive refractive power, a third lens unit G3 having a positive refractive power, and a fourth lens unit G4 having a positive refractive power.

During zooming from the wide angle end to the telephoto end, the first lens unit G1 moves first toward the image side and thereafter reverses its moving direction to move toward the object side, the second lens unit G2 moves toward the object side, the third lens unit G3 moves first toward the image side and thereafter reverses its moving direction to move toward the object side, and the fourth lens unit G4 is stationary.

The first lens unit G1 is composed of a biconcave negative lens and a positive meniscus lens having a convex surface directed toward the object side, which are arranged in order from the object side. The second lens unit G2 is composed of a biconvex positive lens, and a cemented lens made up of a biconvex positive lens and a biconcave negative lens, which are arranged in order from the object side. The third lens unit G3 is composed of a positive meniscus lens having a convex surface directed toward the image side. The fourth lens unit G4 is composed of a positive meniscus lens having a convex surface directed toward the image side. The fourth lens unit G4 constitutes a field lens, which is separated from an image pickup element.

There are eight aspheric surfaces, which include both surfaces of the biconcave negative lens in the first lens unit G1, both surfaces of the positive meniscus lens having a convex surface directed toward the object side in the first lens unit G1, both surfaces of the object side biconvex positive lens in the second lens unit G2, the image side surface of the positive meniscus lens having a convex surface directed toward the image side in the third lens unit G3, and the object side surface of the positive meniscus lens having a convex surface directed toward the image side in the fourth lens unit G4.

Figure 17A:
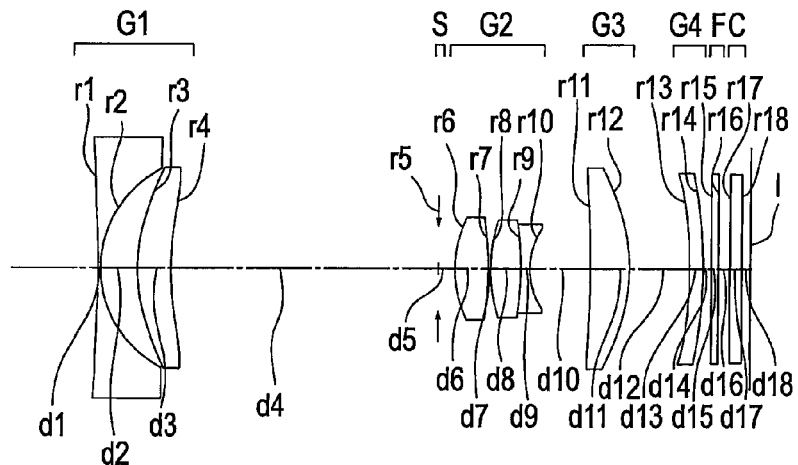
FIGS. 17A, 17B, and 17C are cross sectional views of a zoom lens according to a seventeenth example of the present invention, similar to FIGS. 1A, 1B, and 1C.
Figure 17B:
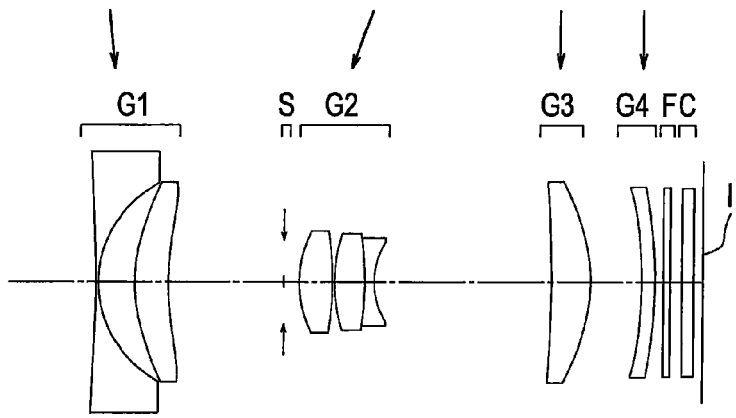
Figure 17C:
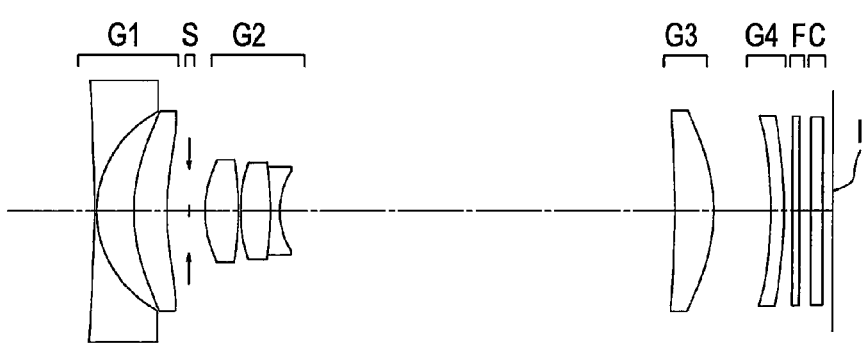

As shown in FIGS. 17A to 17C, the zoom lens according to the seventeenth example includes, in order from the object side, a first lens unit G1 having a negative refractive power, an aperture stop S, a second lens unit G2 having a positive refractive power, a third lens unit G3 having a positive refractive power, and a fourth lens unit G4 having a positive refractive power.

During zooming from the wide angle end to the telephoto end, the first lens unit G1 moves first toward the image side and thereafter reverses its moving direction to move toward the object side, the second lens unit G2 moves toward the object side, the third lens unit G3 moves first toward the image side and thereafter reverses its moving direction to move toward the object side, and the fourth lens unit G4 is stationary.

The first lens unit G1 is composed of a biconcave negative lens and a positive meniscus lens having a convex surface directed toward the object side, which are arranged in order from the object side. The second lens unit G2 is composed of a biconvex positive lens, and a cemented lens made up of a biconvex positive lens and a biconcave negative lens, which are arranged in order from the object side. The third lens unit G3 is composed of a positive meniscus lens having a convex surface directed toward the image side. The fourth lens unit G4 is composed of a positive meniscus lens having a convex surface directed toward the image side. The fourth lens unit G4 constitutes a field lens, which is separated from an image pickup element.

There are eight aspheric surfaces, which include both surfaces of the biconcave negative lens in the first lens unit G1, both surfaces of the positive meniscus lens having a convex surface directed toward the object side in the first lens unit G1, both surfaces of the object side biconvex positive lens in the second lens unit G2, the image side surface of the positive meniscus lens having a convex surface directed toward the image side in the third lens unit G3, and the object side surface of the positive meniscus lens having a convex surface directed toward the image side in the fourth lens unit G4.

Figure 18A:
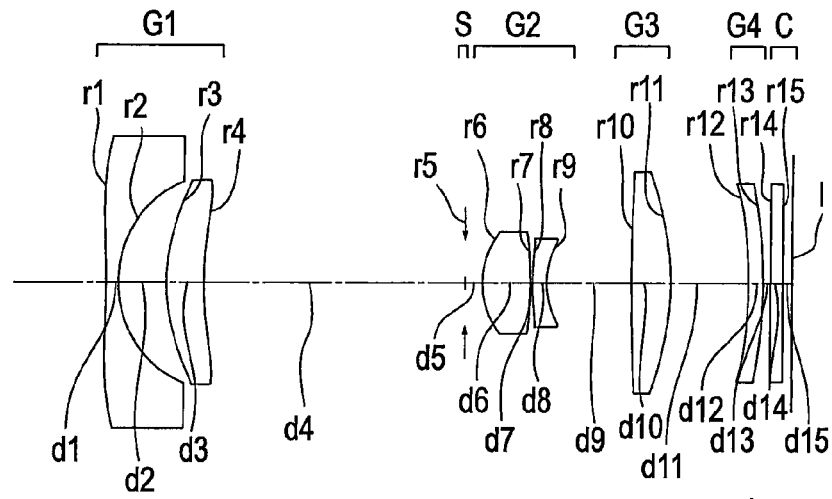
FIGS. 18A, 18B, and 18C are cross sectional views of a zoom lens according to an eighteenth example of the present invention, similar to FIGS. 1A, 1B, and 1C.
Figure 18B:
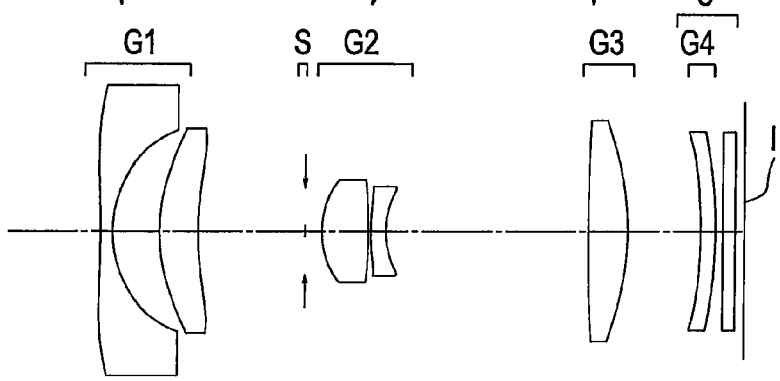
Figure 18C:
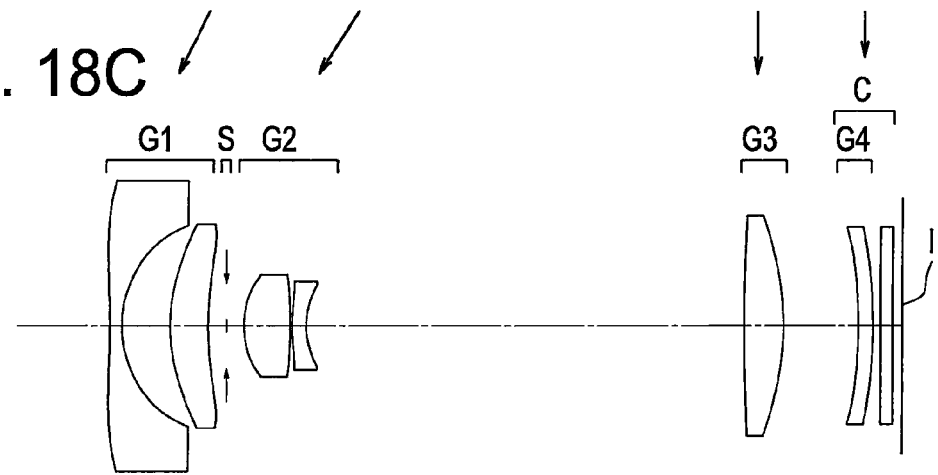

As shown in FIGS. 18A to 18C, the zoom lens according to the eighteenth example includes, in order from the object side, a first lens unit G1 having a negative refractive power, an aperture stop S, a second lens unit G2 having a positive refractive power, a third lens unit G3 having a positive refractive power, and a fourth lens unit G4 having a positive refractive power.

During zooming from the wide angle end to the telephoto end, the first lens unit G1 moves first toward the image side and thereafter reverses its moving direction to move toward the object side, the second lens unit G2 moves toward the object side, the third lens unit G3 moves first toward the image side and thereafter reverses its moving direction to move toward the object side, and the fourth lens unit is stationary.

The first lens unit G1 is composed of a biconcave negative lens and a positive meniscus lens having a convex surface directed toward the object side, which are arranged in order from the object side. The second lens unit G2 is composed of a biconvex positive lens and a negative meniscus lens having a convex surface directed toward the object side, which are arranged in order from the object side. The third lens unit G3 is composed of a biconvex positive lens. The fourth lens unit G4 is composed of a positive meniscus lens having a convex surface directed toward the image side. The fourth lens unit G4 constitutes a field lens, which is separated from an image pickup element.

There are ten aspheric surfaces, which include both surfaces of the biconcave negative lens in the first lens unit G1, both surfaces of the positive meniscus lens having a convex surface directed toward the object side in the first lens unit G1, both surfaces of the object side biconvex positive lens in the second lens unit G2, both surfaces of the negative meniscus lens having a convex surface directed toward the object side in the second lens unit G2, the image side surface of the biconvex positive lens in the third lens unit G3, and the object side surface of the positive meniscus lens having a convex surface directed toward the image side in the fourth lens unit G4.

Numerical data of each embodiment described above is shown below. Apart from symbols described above, fb denotes backfocus, f1, f2 ... denotes a focal length of each of the lens units, $F_{NO}$ denotes an F number, ω denotes a half angle of field, each of r1, r2, ... denotes radius of curvature of each lens surface, each of d1, d2, ... denotes a distance between two lenses, each of nd1, nd2, ... denotes a refractive index of each lens for a d-line (λ=587.6 nm), and each of vd1, vd2, ... denotes an Abbe constant for each lens.

Further, * denotes an aspheric data, ER denotes an effective radius, S denotes a stop.

The overall length of the lens system which will be described later is a length which is obtained by adding the back focus to a distance from the first lens surface up to the last lens surface. fb (back focus) is a unit which is expressed upon air conversion of a distance from the last lens surface up to a paraxial image plane.

When Z is let to be an optical axis with a direction of traveling of light as a positive (direction), and y is let to be in a direction orthogonal to the optical axis, a shape of the aspheric surface is described by the following expression.

$$Z=(y^2/r)/[1+\{1-(K+1)(y/r)^2\}^{1/2}]+A_4y^4+A_6y^6+A_8y^8+A_{10}y^{10}+A_{12}y^{12}$$

where, r denotes a paraxial radius of curvature, K denotes a conical coefficient, A4, A6, A8, A10, and A12 denote aspherical surface coefficients of a fourth order, a sixth order, an eight order, a tenth order, and a twelfth order respectively. Moreover, in the aspherical surface coefficients, 'e-n' (where, n is an integral number) indicates '$10^{-n}$'.

Further "A" means that the surface is an aspheric surface, and "S" means that the surface is an aperture stop, "FS" means that the surface is a flare stop.

Example 1

| Unit mm | | | |
|---|---|---|---|
| Surface data | | | |
| Surface no. | r | d | nd | vd |
| Object plane | ∞ | ∞ | | |
| 1* | −16.345 | 0.93 | 1.53071 | 55.69 |
| 2* | 5.151 | 1.33 | | |

-continued

Unit mm

| | | | | |
|---|---|---|---|---|
| 3* | 7.164 | 1.44 | 1.63493 | 23.90 |
| 4* | 12.958 | Variable | | |
| 5(Stop) | ∞ | 0.74 | | |
| 6* | 4.125 | 1.35 | 1.58313 | 59.46 |
| 7* | −12.794 | 0.10 | | |
| 8 | 7.081 | 1.21 | 1.58313 | 59.38 |
| 9 | −14.510 | 0.40 | 1.64769 | 33.79 |
| 10 | 2.942 | Variable | | |
| 11 | −37.664 | 1.53 | 1.53071 | 55.69 |
| 12* | −7.566 | Variable | | |
| 13 | ∞ | 0.30 | 1.51633 | 64.14 |
| 14 | ∞ | 0.50 | | |
| 15 | ∞ | 0.50 | 1.51633 | 64.14 |
| 16 | ∞ | 0.40 | | |
| Image plane(Light receiving surface) | ∞ | | | |

Aspherical surface data

1st surface k = 0.000
A4 = 1.36010e−03, A6 = −4.61920e−05, A8 = 7.50200e−07,
A10 = −4.88790e−09
2nd surface k = −0.026
A4 = 3.82340e−04, A6 = 5.79610e−05, A8 = −3.99820e−06
3rd surface k = 0.000
A4 = −1.19550e−03
4th surface k = 0.000
A4 = −1.15110e−03, A6 = −2.54540e−05, A8 = 1.45560e−06,
A10 = −2.09940e−08
6th surface k = 0.000
A4 = −1.57890e−03, A6 = −5.29490e−05, A8 = 5.58160e−08,
A10 = −1.28580e−07, A12 = 5.30060e−08
7th surface k = 0.000
A4 = 9.35380e−04, A6 = −4.66310e−05, A8 = 6.28670e−06
12th surface k = 0.000
A4 = 7.07160e−04, A6 = −1.32700e−05, A8 = 3.95410e−07,
A10 = −3.96690e−09

Zoom data

| | Wide angle | Intermediate | Telephoto |
|---|---|---|---|
| Focal length | 4.90 | 9.34 | 18.76 |
| Fno. | 2.95 | 4.17 | 6.64 |
| Angle of field2ω | 85.55 | 44.71 | 22.82 |
| fb(in air) | 5.23 | 4.70 | 4.72 |
| Lens total length(in air) | 27.58 | 26.23 | 32.40 |
| d4 | 10.85 | 4.56 | 0.75 |
| d10 | 2.47 | 7.94 | 17.90 |
| d12 | 3.78 | 3.28 | 3.26 |

Unit focal length

| | | |
|---|---|---|
| f1 = −10.96 | f2 = 8.65 | f3 = 17.53 |

Example 2

Unit mm

Surface data

| Surface no. | r | d | nd | νd |
|---|---|---|---|---|
| Object plane | ∞ | ∞ | | |
| 1* | −17.690 | 0.97 | 1.53110 | 55.91 |
| 2* | 4.548 | 1.53 | | |
| 3* | 7.200 | 1.40 | 1.63493 | 23.90 |
| 4* | 14.000 | Variable | | |
| 5(Stop) | ∞ | 0.70 | | |
| 6* | 3.485 | 1.58 | 1.52542 | 55.78 |
| 7* | −8.823 | 0.10 | | |
| 8 | 13.204 | 1.30 | 1.63493 | 23.90 |
| 9* | 3.229 | Variable | | |
| 10 | −30.863 | 1.60 | 1.53110 | 55.91 |
| 11* | −7.430 | Variable | | |
| 12 | ∞ | 0.30 | 1.51633 | 64.14 |
| 13 | ∞ | 0.30 | | |
| 14 | ∞ | 0.50 | 1.51633 | 64.14 |
| 15 | ∞ | 0.37 | | |
| Image plane(Light receiving surface) | ∞ | | | |

Aspherical surface data

1st surface k = 0.000
A4 = 8.43297e−04, A6 = −1.63292e−05, A8 = 1.04209e−07
2nd surface k = −0.884
A4 = 5.69444e−04, A6 = 7.10052e−05, A8 = −7.41429e−07
3rd surface k = 0.000
A4 = −1.24294e−03
4th surface k = 0.000
A4 = −1.11565e−03, A6 = −2.47496e−05, A8 = 9.40826e−07,
A10 = −3.84417e−08
6th surface k = −0.127
A4 = −1.22185e−03, A6 = −9.42415e−05, A8 = 5.18279e−06
7th surface k = 0.000
A4 = 3.56516e−03, A6 = −3.76966e−04, A8 = 3.79448e−05
9th surface k = 0.000
A4 = −9.21985e−05, A6 = 7.33874e−04
11th surface k = 0.000
A4 = 8.45238e−04, A6 = −1.29767e−05, A8 = 1.82787e−07,
A10 = 1.96786e−09

Zoom data

| | Wide angle | Intermediate | Telephoto |
|---|---|---|---|
| Focal length | 4.57 | 8.73 | 17.59 |
| Fno. | 2.95 | 4.19 | 6.62 |
| Angle of field2ω | 89.27 | 47.59 | 24.18 |
| fb(in air) | 5.29 | 4.40 | 4.25 |
| Lens total length(in air) | 27.80 | 26.48 | 32.03 |
| d4 | 10.82 | 4.65 | 0.75 |

-continued

| Unit mm | | | |
|---|---|---|---|
| d9 | 2.50 | 8.24 | 17.85 |
| d11 | 4.09 | 3.20 | 3.05 |

| Unit focal length | | |
|---|---|---|
| f1 = −10.30 | f2 = 8.59 | f3 = 18.00 |

Example 3

Unit mm

Surface data

| Surface no. | r | d | nd | νd |
|---|---|---|---|---|
| Object plane | ∞ | ∞ | | |
| 1* | −18.212 | 0.96 | 1.53110 | 55.91 |
| 2* | 5.012 | 1.28 | | |
| 3* | 7.195 | 1.36 | 1.63493 | 23.90 |
| 4* | 14.000 | Variable | | |
| 5(Stop) | ∞ | 0.70 | | |
| 6* | 3.846 | 1.47 | 1.58313 | 59.38 |
| 7* | −13.220 | 0.10 | | |
| 8 | 9.170 | 1.32 | 1.63493 | 23.90 |
| 9* | 2.992 | Variable | | |
| 10 | −40.000 | 1.60 | 1.53110 | 55.91 |
| 11* | −7.654 | Variable | | |
| 12 | ∞ | 0.30 | 1.51633 | 64.14 |
| 13 | ∞ | 0.30 | | |
| 14 | ∞ | 0.50 | 1.51633 | 64.14 |
| 15 | ∞ | 0.37 | | |
| Image plane(Light receiving surface) | ∞ | | | |

Aspherical surface data

1st surface k = 0.000
A4 = 7.02354e−04, A6 = −1.54766e−05, A8 = 1.24503e−07

2nd surface k = −0.687
A4 = 3.90910e−04, A6 = 3.69947e−05, A8 = −1.06912e−06

3rd surface k = 0.000
A4 = −1.17271e−03

4th surface k = 0.000
A4 = −1.15180e−03, A6 = 2.07735e−06, A8 = −2.39987e−07, A10 = 5.32718e−09

6th surface k = −0.038
A4 = −1.63619e−03, A6 = −5.38827e−05, A8 = −7.46946e−06

7th surface k = 0.000
A4 = 1.33473e−03, A6 = −1.20950e−04, A8 = 5.48702e−06

9th surface k = 0.000
A4 = 1.84642e−04, A6 = 2.15165e−04

11th surface k = 0.000
A4 = 6.95014e−04, A6 = −1.58986e−05, A8 = 4.76348e−07, A10 = −5.00332e−09

-continued

Unit mm

Zoom data

| | Wide angle | Intermediate | Telephoto |
|---|---|---|---|
| Focal length | 4.88 | 9.31 | 18.74 |
| Fno. | 2.95 | 4.22 | 6.66 |
| Angle of field 2ω | 85.58 | 45.24 | 23.10 |
| fb(in air) | 5.47 | 4.43 | 4.23 |
| Lens total length(in air) | 27.96 | 26.60 | 31.94 |
| d4 | 11.28 | 4.91 | 0.76 |
| d9 | 2.41 | 8.46 | 18.16 |
| d11 | 4.27 | 3.24 | 3.03 |

Unit focal length

| f1 = −11.49 | f2 = 8.94 | f3 = 17.52 |
|---|---|---|

Example 4

Unit mm

Surface data

| Surface no. | r | d | nd | νd |
|---|---|---|---|---|
| Object plane | ∞ | ∞ | | |
| 1* | −17.515 | 0.70 | 1.53071 | 55.69 |
| 2* | 4.849 | 1.00 | | |
| 3* | 6.696 | 1.80 | 1.63493 | 23.90 |
| 4* | 14.000 | Variable | | |
| 5(Stop) | ∞ | 0.74 | | |
| 6* | 4.371 | 1.38 | 1.58313 | 59.46 |
| 7* | −11.511 | 0.10 | | |
| 8 | 7.711 | 1.25 | 1.58313 | 59.38 |
| 9 | −11.568 | 0.40 | 1.64769 | 33.79 |
| 10 | 3.150 | Variable | | |
| 11 | −63.056 | 1.63 | 1.53071 | 55.69 |
| 12* | −8.183 | Variable | | |
| 13 | ∞ | 0.30 | 1.51633 | 64.14 |
| 14 | ∞ | 0.50 | | |
| 15 | ∞ | 0.50 | 1.51633 | 64.14 |
| 16 | ∞ | 0.37 | | |
| Image plane(Light receiving surface) | ∞ | | | |

Aspherical surface data

1st surface k = 0.000
A4 = 1.39425e−03, A6 = −6.09420e−05, A8 = 1.34243e−06, A10 = −1.29957e−08

2nd surface k = −0.374
A4 = 7.11209e−04, A6 = 3.55068e−05, A8 = −2.54955e−06

3rd surface k = 0.000
A4 = −1.12190e−03

4th surface k = 0.000
A4 = −9.95014e−04, A6 = −2.76050e−05, A8 = 1.47640e−06, A10 = −2.09230e−08

6th surface k = 0.370
A4 = −2.39300e−03, A6 = 5.30081e−06, A8 = −2.82042e−05

-continued

| Unit mm |
|---|

7th surface k = 0.000
A4 = 3.79008e−04, A6 = 5.93252e−05, A8 = −2.51578e−05
12th surface k = 0.000
A4 = 6.34942e−04, A6 = −1.39741e−05, A8 = 4.07374e−07,
A10 = −4.92068e−09

| Zoom data | | | |
|---|---|---|---|
| | Wide angle | Intermediate | Telephoto |
| Focal length | 5.18 | 9.88 | 19.88 |
| Fno. | 2.96 | 4.19 | 6.70 |
| Angle of field2ω | 82.42 | 42.42 | 21.58 |
| fb(in air) | 5.37 | 4.86 | 4.65 |
| Lens total length(in air) | 27.36 | 26.13 | 32.53 |
| d4 | 10.62 | 4.27 | 0.50 |
| d10 | 2.37 | 7.99 | 18.38 |
| d12 | 3.97 | 3.47 | 3.25 |

| Unit focal length | | |
|---|---|---|
| f1 = −11.67 | f2 = 8.82 | f3 = 17.54 |

Example 5

| Unit mm |
|---|
| Surface data |

| Surface no. | r | d | nd | vd |
|---|---|---|---|---|
| Object plane | ∞ | ∞ | | |
| 1* | −23.721 | 0.20 | 1.53071 | 55.69 |
| 2* | 4.902 | 1.45 | | |
| 3* | 7.725 | 1.60 | 1.63493 | 23.90 |
| 4* | 14.000 | Variable | | |
| 5(Stop) | ∞ | 0.74 | | |
| 6* | 4.387 | 1.43 | 1.58313 | 59.46 |
| 7* | −11.644 | 0.10 | | |
| 8 | 7.644 | 1.21 | 1.58313 | 59.38 |
| 9 | −15.930 | 0.40 | 1.64769 | 33.79 |
| 10 | 3.154 | Variable | | |
| 11 | −96.588 | 1.78 | 1.53071 | 55.69 |
| 12* | −8.442 | Variable | | |
| 13 | ∞ | 0.30 | 1.51633 | 64.14 |
| 14 | ∞ | 0.50 | | |
| 15 | ∞ | 0.50 | 1.51633 | 64.14 |
| 16 | ∞ | 0.37 | | |
| Image plane(Light receiving surface) | ∞ | | | |

| Aspherical surface data |
|---|

1st surface k = 0.000
A4 = 1.28899e−03, A6 = −6.37925e−05, A8 = 1.51529e−06,
A10 = −1.52648e−08
2nd surface k = −0.527
A4 = 9.71350e−04, A6 = 3.37846e−05, A8 = −2.05316e−06
3rd surface k = 0.000
A4 = −9.12718e−04

-continued

| Unit mm |
|---|

4th surface k = 0.000
A4 = −9.95014e−04, A6 = −2.76050e−05, A8 = 1.47640e−06,
A10 = −2.09230e−08
6th surface k = 0.370
A4 = −2.31889e−03, A6 = −8.42149e−06, A8 = −2.36917e−05
7th surface k = 0.000
A4 = 4.36788e−04, A6 = 4.73162e−05, A8 = −2.08166e−05
12th surface k = 0.000
A4 = 6.34942e−04, A6 = −1.39741e−05, A8 = 4.07374e−07,
A10 = −4.92068e−09

| Zoom data | | | |
|---|---|---|---|
| | Wide angle | Intermediate | Telephoto |
| Focal length | 5.01 | 9.57 | 19.25 |
| Fno. | 2.95 | 4.19 | 6.69 |
| Angle of field2ω | 84.07 | 43.72 | 22.19 |
| fb(in air) | 5.31 | 4.74 | 4.65 |
| Lens total length(in air) | 27.22 | 26.08 | 32.53 |
| d4 | 10.62 | 4.32 | 0.50 |
| d10 | 2.37 | 8.10 | 18.46 |
| d12 | 3.92 | 3.34 | 3.25 |

| Unit focal length | | |
|---|---|---|
| f1 = −11.30 | f2 = 8.85 | f3 = 17.31 |

Example 6

| Unit mm |
|---|
| Surface data |

| Surface no. | r | d | nd | vd |
|---|---|---|---|---|
| Object plane | ∞ | ∞ | | |
| 1* | −26.034 | 0.10 | 1.53071 | 55.69 |
| 2* | 4.860 | 1.50 | | |
| 3* | 7.865 | 1.60 | 1.63493 | 23.90 |
| 4* | 14.000 | Variable | | |
| 5(Stop) | ∞ | 0.74 | | |
| 6* | 4.429 | 1.48 | 1.58313 | 59.46 |
| 7* | −11.550 | 0.10 | | |
| 8 | 7.628 | 1.20 | 1.58313 | 59.38 |
| 9 | −17.498 | 0.40 | 1.64769 | 33.79 |
| 10 | 3.174 | Variable | | |
| 11 | −94.557 | 1.79 | 1.53071 | 55.69 |
| 12* | −8.432 | Variable | | |
| 13 | ∞ | 0.30 | 1.51633 | 64.14 |
| 14 | ∞ | 0.50 | | |
| 15 | ∞ | 0.50 | 1.51633 | 64.14 |
| 16 | ∞ | 0.37 | | |
| Image plane(Light receiving surface) | ∞ | | | |

| Aspherical surface data |
|---|

1st surface k = 0.000
A4 = 1.30625e−03, A6 = −6.92556e−05, A8 = 1.71259e−06,
A10 = −1.77917e−08

-continued

Unit mm

2nd surface k = −0.572
A4 = 1.11928e−03, A6 = 3.06525e−05, A8 = −2.03600e−06
3rd surface k = 0.000
A4 = −8.49690e−04
4th surface k = 0.000
A4 = −9.95014e−04, A6 = −2.76050e−05, A8 = 1.47640e−06,
A10 = −2.09230e−08
6th surface k = 0.370
A4 = −2.29302e−03, A6 = −1.20091e−05, A8 = −2.23007e−05
7th surface k = 0.000
A4 = 4.16200e−04, A6 = 4.10538e−05, A8 = −1.97552e−05
12th surface k = 0.000
A4 = 6.34942e−04, A6 = −1.39741e−05, A8 = 4.07374e−07,
A10 = −4.92068e−09

Zoom data

|  | Wide angle | Intermediate | Telephoto |
|---|---|---|---|
| Focal length | 4.99 | 9.52 | 19.16 |
| Fno. | 2.95 | 4.19 | 6.68 |
| Angle of field2ω | 84.35 | 43.92 | 22.30 |
| fb(in air) | 5.31 | 4.75 | 4.65 |
| Lens total length(in air) | 27.22 | 26.08 | 32.53 |
| d4 | 10.63 | 4.33 | 0.51 |
| d10 | 2.37 | 8.09 | 18.46 |
| d12 | 3.91 | 3.35 | 3.25 |

Unit focal length

| f1 = −11.25 | f2 = 8.85 | f3 = 17.32 |
|---|---|---|

Example 7

Unit mm

Surface data

| Surface no. | r | d | nd | νd |
|---|---|---|---|---|
| Object plane | ∞ | ∞ | | |
| 1* | −20.430 | 0.91 | 1.49700 | 81.54 |
| 2* | 5.580 | 1.60 | | |
| 3* | 9.604 | 1.32 | 1.63493 | 23.90 |
| 4* | 14.000 | Variable | | |
| 5(Stop) | ∞ | 0.74 | | |
| 6* | 4.213 | 1.34 | 1.58313 | 59.46 |
| 7* | −12.201 | 0.10 | | |
| 8 | 7.099 | 1.21 | 1.58313 | 59.38 |
| 9 | −16.655 | 0.40 | 1.64769 | 33.79 |
| 10 | 2.973 | Variable | | |
| 11 | −54.836 | 1.54 | 1.53071 | 55.69 |
| 12* | −8.059 | Variable | | |
| 13 | ∞ | 0.30 | 1.51633 | 64.14 |
| 14 | ∞ | 0.50 | | |
| 15 | ∞ | 0.50 | 1.51633 | 64.14 |
| 16 | ∞ | 0.37 | | |
| Image plane (Light receiving surface) | ∞ | | | |

Aspherical surface data

1st surface k = 0.000
A4 = 1.88172e−03, A6 = −8.26946e−05, A8 = 1.66830e−06,
A10 = −1.39650e−08
2nd surface k = 0.020
A4 = 2.22905e−03, A6 = 4.46761e−05, A8 = −4.28166e−06
3rd surface k = 0.000
A4 = −3.40638e−04
4th surface k = 0.000
A4 = −9.95014e−04, A6 = −2.76050e−05, A8 = 1.47640e−06,
A10 = −2.09230e−08
6th surface k = 0.370
A4 = −2.53287e−03, A6 = 3.51677e−05, A8 = −3.96905e−05
7th surface k = 0.000
A4 = 4.12045e−04, A6 = 1.00950e−04, A8 = −3.59184e−05
12th surface k = 0.000
A4 = 6.34942e−04, A6 = −1.39741e−05, A8 = 4.07374e−07,
A10 = −4.92068e−09

Zoom data

|  | Wide angle | Intermediate | Telephoto |
|---|---|---|---|
| Focal length | 4.86 | 9.27 | 18.61 |
| Fno. | 2.96 | 4.16 | 6.65 |
| Angle of field2ω | 86.06 | 45.11 | 23.06 |
| fb (in air) | 5.26 | 4.90 | 4.72 |
| Lens total length (in air) | 27.62 | 26.15 | 32.40 |
| d4 | 10.84 | 4.43 | 0.72 |
| d10 | 2.37 | 7.67 | 17.80 |
| d12 | 3.84 | 3.47 | 3.25 |

Unit focal length

| f1 = −10.97 | f2 = 8.66 | f3 = 17.60 |
|---|---|---|

Example 8

Unit mm

Surface data

| Surface no. | r | d | nd | νd |
|---|---|---|---|---|
| Object plane | ∞ | ∞ | | |
| 1* | −13.629 | 0.91 | 1.43875 | 94.93 |
| 2* | 6.447 | 1.60 | | |
| 3* | 11.163 | 1.16 | 1.63493 | 23.90 |
| 4* | 14.000 | Variable | | |
| 5(Stop) | ∞ | 0.74 | | |
| 6* | 4.261 | 1.34 | 1.58313 | 59.46 |

-continued

Unit mm

| | | | | |
|---|---|---|---|---|
| 7* | −13.881 | 0.10 | | |
| 8 | 6.367 | 1.20 | 1.58313 | 59.38 |
| 9 | −43.376 | 0.40 | 1.64769 | 33.79 |
| 10 | 2.895 | Variable | | |
| 11 | −43.005 | 1.57 | 1.53071 | 55.69 |
| 12* | −7.771 | Variable | | |
| 13 | ∞ | 0.30 | 1.51633 | 64.14 |
| 14 | ∞ | 0.50 | | |
| 15 | ∞ | 0.50 | 1.51633 | 64.14 |
| 16 | ∞ | 0.37 | | |
| Image plane (Light receiving surface) | ∞ | | | |

Aspherical surface data

1st surface k = 0.000
A4 = 2.19840e−03, A6 = −8.43252e−05, A8 = 1.56476e−06,
A10 = −1.20001e−08
2nd surface k = 0.405
A4 = 2.25368e−03, A6 = 5.48189e−05, A8 = −4.31752e−06
3rd surface k = 0.000
A4 = −4.43614e−04
4th surface k = 0.000
A4 = −9.95014e−04, A6 = −2.76050e−05, A8 = 1.47640e−06,
A10 = −2.09230e−08
6th surface k = 0.370
A4 = −2.52997e−03, A6 = 8.77165e−05, A8 = −5.70302e−05
7th surface k = 0.000
A4 = 1.29034e−04, A6 = 1.38889e−04, A8 = −5.35032e−05
12th surface k = 0.000
A4 = 6.34942e−04, A6 = −1.39741e−05, A8 = 4.07374e−07,
A10 = −4.92068e−09

Zoom data

| | Wide angle | Intermediate | Telephoto |
|---|---|---|---|
| Focal length | 4.98 | 9.50 | 19.11 |
| Fno. | 2.97 | 4.18 | 6.70 |
| Angle of field2ω | 84.73 | 44.28 | 22.67 |
| fb (in air) | 5.30 | 4.94 | 4.64 |
| Lens total length (in air) | 27.53 | 26.06 | 32.32 |
| d4 | 10.84 | 4.41 | 0.72 |
| d10 | 2.37 | 7.69 | 17.94 |
| d12 | 3.90 | 3.55 | 3.25 |

Unit focal length

| | | |
|---|---|---|
| f1 = −11.22 | f2 = 8.69 | f3 = 17.60 |

Example 9

Unit mm

Surface data

| Surface no. | r | d | nd | vd |
|---|---|---|---|---|
| Object plane | ∞ | ∞ | | |
| 1* | −19.931 | 0.91 | 1.58313 | 59.38 |
| 2* | 5.486 | 1.42 | | |
| 3* | 7.599 | 1.46 | 1.63493 | 23.90 |
| 4* | 14.000 | Variable | | |
| 5(Stop) | ∞ | 0.74 | | |
| 6* | 4.211 | 1.34 | 1.58313 | 59.46 |
| 7* | −11.573 | 0.10 | | |
| 8 | 7.504 | 1.22 | 1.58313 | 59.38 |
| 9 | −11.387 | 0.40 | 1.64769 | 33.79 |
| 10 | 3.028 | Variable | | |
| 11 | −88.831 | 1.56 | 1.53071 | 55.69 |
| 12* | −8.355 | Variable | | |
| 13 | ∞ | 0.30 | 1.51633 | 64.14 |
| 14 | ∞ | 0.50 | | |
| 15 | ∞ | 0.50 | 1.51633 | 64.14 |
| 16 | ∞ | 0.37 | | |
| Image plane (Light receiving surface) | ∞ | | | |

Aspherical surface data

1st surface k = 0.000
A4 = 1.71115e−03, A6 = −6.65600e−05, A8 = 1.28944e−06,
A10 = −1.06921e−08
2nd surface k = −0.001
A4 = 1.30967e−03, A6 = 3.98471e−05, A8 = −3.33999e−06
3rd surface k = 0.000
A4 = −8.55262e−04
4th surface k = 0.000
A4 = −9.95014e−04, A6 = −2.76050e−05, A8 = 1.47640e−06,
A10 = −2.09230e−08
6th surface k = 0.370
A4 = −2.42427e−03, A6 = −1.70165e−05, A8 = −2.34177e−05
7th surface k = 0.000
A4 = 6.37360e−04, A6 = 4.81909e−05, A8 = −1.85450e−05
12th surface k = 0.000
A4 = 6.34942e−04, A6 = −1.39741e−05, A8 = 4.07374e−07,
A10 = −4.92068e−09

Zoom data

| | Wide angle | Intermediate | Telephoto |
|---|---|---|---|
| Focal length | 4.76 | 9.08 | 18.23 |
| Fno. | 2.91 | 4.09 | 6.54 |
| Angle of field2ω | 86.99 | 45.92 | 23.42 |
| fb (in air) | 5.19 | 4.88 | 4.72 |
| Lens total length (in air) | 27.55 | 26.08 | 32.39 |
| d4 | 10.84 | 4.42 | 0.72 |

-continued

Unit mm

| | | | |
|---|---|---|---|
| d10 | 2.37 | 7.63 | 17.80 |
| d12 | 3.77 | 3.45 | 3.25 |

Unit focal length

| | | |
|---|---|---|
| f1 = −10.81 | f2 = 8.66 | f3 = 17.26 |

Example 10

Unit mm

Surface data

| Surface no. | r | d | nd | νd |
|---|---|---|---|---|
| Object plane | ∞ | ∞ | | |
| 1* | −38.547 | 0.91 | 1.53071 | 55.69 |
| 2* | 3.422 | 1.50 | | |
| 3* | 6.240 | 1.70 | 1.63493 | 23.90 |
| 4* | 14.000 | Variable | | |
| 5(Stop) | ∞ | 0.00 | | |
| 6* | 3.373 | 1.69 | 1.49700 | 81.54 |
| 7* | −10.068 | 0.10 | | |
| 8* | −10.093 | 1.00 | 1.68893 | 31.07 |
| 9 | −15.326 | 0.80 | 1.68893 | 31.07 |
| 10* | 29.986 | Variable | | |
| 11 | ∞ | 0.30 | 1.51633 | 64.14 |
| 12 | ∞ | 0.50 | | |
| 13 | ∞ | 0.50 | 1.51633 | 64.14 |
| 14 | ∞ | 0.37 | | |
| Image plane (Light receiving surface) | ∞ | | | |

Aspherical surface data

1st surface k = 0.000
A4 = −3.49485e−04, A6 = 2.80163e−05, A8 = −8.56328e−07,
A10 = 1.08692e−08
2nd surface k = −0.347
A4 = −2.13783e−03, A6 = 6.24157e−05, A8 = −7.24182e−06
3rd surface k = 0.000
A4 = −1.00000e−03
4th surface k = 0.000
A4 = −6.82668e−04, A6 = −8.68917e−05, A8 = 1.15687e−05,
A10 = −5.14153e−07
6th surface k = −0.474
A4 = 1.26305e−03, A6 = −7.10318e−05, A8 = 8.29015e−06
7th surface k = 0.000
A4 = 2.85991e−03, A6 = 2.04558e−04, A8 = −4.03691e−05
8th surface k = 0.000
A4 = 3.93695e−03, A6 = 4.07276e−04, A8 = −5.51515e−05

-continued

Unit mm

10th surface k = 0.000
A4 = 6.87412e−03, A6 = 4.78596e−04, A8 = 7.71144e−05

Zoom data

| | Wide angle | Intermediate | Telephoto |
|---|---|---|---|
| Focal length | 5.06 | 9.66 | 19.43 |
| Fno. | 3.27 | 4.34 | 6.64 |
| Angle of field2ω | 83.82 | 44.48 | 22.39 |
| fb (in air) | 10.09 | 14.04 | 22.43 |
| Lens total length (in air) | 30.73 | 26.73 | 30.72 |
| d4 | 12.95 | 5.00 | 0.60 |
| d10 | 8.69 | 12.64 | 21.03 |

Unit focal length

| | |
|---|---|
| f1 = −9.92 | f2 = 8.52 |

Example 11

Unit mm

Surface data

| Surface no. | r | d | nd | νd |
|---|---|---|---|---|
| Object plane | ∞ | ∞ | | |
| 1* | −39.579 | 0.10 | 1.53071 | 55.69 |
| 2* | 3.414 | 1.50 | | |
| 3* | 6.244 | 1.78 | 1.63493 | 23.90 |
| 4* | 14.000 | Variable | | |
| 5(Stop) | ∞ | 0.00 | | |
| 6* | 3.382 | 1.72 | 1.49700 | 81.54 |
| 7* | −10.093 | 0.10 | | |
| 8* | −9.747 | 1.00 | 1.68893 | 31.07 |
| 9 | −15.326 | 0.80 | 1.68893 | 31.07 |
| 10* | 35.352 | Variable | | |
| 11 | ∞ | 0.30 | 1.51633 | 64.14 |
| 12 | ∞ | 0.50 | | |
| 13 | ∞ | 0.50 | 1.51633 | 64.14 |
| 14 | ∞ | 0.37 | | |
| Image plane (Light receiving surface) | ∞ | | | |

Aspherical surface data

1st surface k = 0.000
A4 = −2.44295e−04, A6 = 2.15075e−05, A8 = −8.11541e−07,
A10 = 1.34394e−08
2nd surface k = −0.373
A4 = −1.65892e−03, A6 = 2.11303e−05, A8 = −6.30975e−06
3rd surface k = 0.000
A4 = −1.00000e−03
4th surface k = 0.000
A4 = −8.15805e−04, A6 = −6.33765e−05, A8 = 1.00141e−05,
A10 = −4.42234e−07

-continued

| Unit mm |
| --- |

6th surface k = −0.474
A4 = 1.26124e−03, A6 = −6.39958e−05, A8 = 8.12203e−06
7th surface k = 0.000
A4 = 2.89920e−03, A6 = 2.12036e−04, A8 = −4.21957e−05
8th surface k = 0.000
A4 = 3.99596e−03, A6 = 4.04408e−04, A8 = −5.52953e−05
10th surface k = 0.000
A4 = 6.79577e−03, A6 = 4.57237e−04, A8 = 7.73831e−05

Zoom data

|  | Wide angle | Intermediate | Telephoto |
| --- | --- | --- | --- |
| Focal length | 5.06 | 9.66 | 19.43 |
| Fno. | 3.26 | 4.33 | 6.62 |
| Angle of field2ω | 83.22 | 44.39 | 22.38 |
| fb (in air) | 10.06 | 14.00 | 22.35 |
| Lens total length (in air) | 30.07 | 26.02 | 29.96 |
| d4 | 13.01 | 5.02 | 0.60 |
| d10 | 8.67 | 12.60 | 20.96 |

Unit focal length

| f1 = −9.96 | f2 = 8.52 |
| --- | --- |

Example 12

| Unit mm |
| --- |
| Surface data |

| Surface no. | r | d | nd | νd |
| --- | --- | --- | --- | --- |
| Object plane | ∞ | ∞ | | |
| 1* | −18.203 | 0.97 | 1.53110 | 55.91 |
| 2* | 5.089 | 1.45 | | |
| 3* | 7.582 | 1.45 | 1.63493 | 23.90 |
| 4* | 14.339 | Variable | | |
| 5(Stop) | ∞ | 0.70 | | |
| 6* | 4.273 | 1.34 | 1.58313 | 59.46 |
| 7* | −13.794 | 0.10 | | |
| 8 | 6.820 | 1.30 | 1.58313 | 59.38 |
| 9 | −12.852 | 0.40 | 1.64769 | 33.79 |
| 10 | 2.984 | Variable | | |
| 11 | −111.414 | 1.70 | 1.53110 | 55.91 |
| 12* | −7.573 | Variable | | |
| 13* | −20.000 | 0.60 | 1.53110 | 55.91 |
| 14 | −20.000 | 0.35 | | |
| 15 | ∞ | 0.30 | 1.51633 | 64.14 |
| 16 | ∞ | 0.50 | | |
| 17 | ∞ | 0.50 | 1.51633 | 64.14 |
| 18 | ∞ | 0.37 | | |
| Image plane (Light receiving surface) | ∞ | | | |

Aspherical surface data

1st surface

K = 0.000
A4 = 8.38948e−04, A6 = −1.89877e−05, A8 = 1.53083e−07

-continued

| Unit mm |
| --- |

2nd surface

K = −0.544
A4 = 3.37209e−04, A6 = 5.93235e−05, A8 = −1.54405e−06
3rd surface

K = 0.000
A4 = −9.22596e−04
4th surface

K = 0.000
A4 = −8.85291e−04, A6 = −1.59274e−05, A8 = 1.84840e−07,
A10 = 7.29044e−10
6th surface K = −0.481
A4 = −6.76398e−04, A6 = 1.00401e−05, A8 = −1.75193e−06
7th surface K = 0.000
A4 = 7.39068e−04, A6 = −1.23302e−05, A8 = 8.91419e−08
12th surface K = 0.000
A4 = 9.89209e−04, A6 = −3.82046e−05, A8 = 1.19895e−06,
A10 = −9.86232e−09
13th surface K = 0.000
A4 = 3.00631e−04, A6 = −7.68117e−05, A8 = 2.34649e−06

Zoom data

|  | Wide angle | Intermediate | Telephoto |
| --- | --- | --- | --- |
| Focal length | 4.69 | 8.89 | 18.02 |
| Fno. | 2.93 | 4.16 | 6.58 |
| Angle of field2ω | 87.13 | 45.93 | 23.10 |
| fb (in air) | 1.75 | 1.75 | 1.75 |
| Lens total length (in air) | 28.27 | 26.71 | 32.46 |
| d4 | 11.31 | 4.91 | 0.70 |
| d10 | 2.39 | 7.85 | 17.62 |
| d12 | 2.82 | 2.19 | 2.38 |

Unit focal length

| f1 = −11.26 | f2 = 8.82 | f3 = 15.21 | f4 = 3618.76 |
| --- | --- | --- | --- |

Example 13

| Unit mm |
| --- |
| Surface data |

| Surface no. | r | d | nd | νd |
| --- | --- | --- | --- | --- |
| Object plane | ∞ | ∞ | | |
| 1* | −38.547 | 0.91 | 1.53071 | 55.69 |
| 2* | 3.422 | 1.50 | | |
| 3* | 6.240 | 1.70 | 1.63493 | 23.90 |
| 4* | 14.000 | Variable | | |
| 5(Stop) | ∞ | 0.00 | | |
| 6* | 3.373 | 1.69 | 1.49700 | 81.54 |
| 7* | −10.068 | 0.10 | | |
| 8* | −10.093 | 1.00 | 1.68893 | 31.07 |
| 9 | −15.326 | 0.80 | 1.68893 | 31.07 |
| 10* | 29.986 | Variable | | |
| 11* | −20.000 | 0.60 | 1.51633 | 64.14 |
| 12 | −20.000 | 0.80 | | |

-continued

Unit mm

| | | | | |
|---|---|---|---|---|
| 13 | ∞ | 0.50 | 1.51633 | 64.14 |
| 14 | ∞ | 0.37 | | |
| Image plane (Light receiving surface) | ∞ | | | |

Aspherical surface data

1st surface

K = 0.000
A4 = −3.49485e−04, A6 = 2.80163e−05, A8 = −8.56328e−07,
A10 = 1.08692e−08
2nd surface K = −0.358
A4 = −2.13783e−03, A6 = 6.24157e−05, A8 = −7.24182e−06
3rd surface K = 0.000
A4 = −1.00000e−03
4th surface K = 0.000
A4 = −6.99283e−04, A6 = −7.49884e−05, A8 = 1.02604e−05,
A10 = −4.49273e−07
6th surface K = −0.474
A4 = 1.26305e−03, A6 = −7.10318e−05, A8 = 8.29015e−06
7th surface K = 0.000
A4 = 2.85991e−03, A6 = 2.04558e−04, A8 = −4.03691e−05
8th surface K = 0.000
A4 = 3.93695e−03, A6 = 4.07276e−04, A8 = −5.51515e−05
10th surface K = 0.000
A4 = 6.87412e−03, A6 = 4.78596e−04, A8 = 7.71144e−05
11th surface K = 0.000
A4 = −1.19853e−03, A6 = 3.90450e−05

Zoom data

| | Wide angle | Intermediate | Telephoto |
|---|---|---|---|
| Focal length | 5.11 | 9.75 | 19.62 |
| Fno. | 3.30 | 4.38 | 6.71 |
| Angle of field 2ω | 81.09 | 43.07 | 21.66 |
| fb (in air) | 1.50 | 1.50 | 1.50 |
| Lens total length (in air) | 30.97 | 26.97 | 30.96 |
| d4 | 12.95 | 5.00 | 0.60 |
| d10 | 8.22 | 12.17 | 20.57 |

Unit focal length

| | | |
|---|---|---|
| f1 = −9.92 | f2 = 8.52 | f3 = 3791.82 |

Example 14

Unit mm

Surface data

| Surface no. | r | d | nd | vd |
|---|---|---|---|---|
| Object plane | ∞ | ∞ | | |
| 1* | −26.334 | 0.97 | 1.53110 | 55.91 |
| 2* | 4.934 | 1.37 | | |
| 3* | 7.582 | 1.43 | 1.63493 | 23.90 |
| 4* | 13.330 | Variable | | |
| 5(Stop) | ∞ | 0.70 | | |
| 6* | 4.384 | 1.35 | 1.58313 | 59.46 |
| 7* | −13.102 | 0.10 | | |
| 8 | 7.153 | 1.42 | 1.58313 | 59.38 |
| 9 | −12.442 | 0.41 | 1.64769 | 33.79 |
| 10 | 3.061 | Variable | | |
| 11 | −53.307 | 1.70 | 1.53110 | 55.91 |
| 12* | −7.094 | Variable | | |
| 13* | −20.000 | 0.60 | 1.53110 | 55.91 |
| 14 | −20.000 | 0.80 | | |
| 15 | ∞ | 0.50 | 1.51633 | 64.14 |
| 16 | ∞ | 0.37 | | |
| 17 | ∞ | | | |
| Image plane (Light receiving surface) | ∞ | | | |

Aspherical surface data

1st surface

K = 0.000
A4 = 2.64486e−04, A6 = −7.05526e−06, A8 = 5.10694e−08
2nd surface

K = −0.451
A4 = 2.16472e−04, A6 = 2.39148e−05, A8 = −8.64867e−07
3rd surface

K = 0.000
A4 = −7.91934e−04
4th surface

K = 0.000
A4 = −1.10785e−03, A6 = 5.66915e−06, A8 = −3.64211e−07,
A10 = 5.11188e−09
6th surface K = −0.119
A4 = −1.14825e−03, A6 = −4.23706e−05, A8 = 7.51943e−06
7th surface K = 0.000
A4 = 8.56046e−04, A6 = −4.09873e−05, A8 = 1.01861e−05
12th surface K = 0.000
A4 = 8.54774e−04, A6 = −2.24206e−05, A8 = 6.69265e−07,
A10 = −6.99386e−10
13th surface K = 0.000
A4 = −3.35382e−04, A6 = −5.07959e−05, A8 = 2.19598e−06

Zoom data

| | Wide angle | Intermediate | Telephoto |
|---|---|---|---|
| Focal length | 4.83 | 9.20 | 18.54 |
| Fno. | 2.98 | 4.23 | 6.68 |
| Angle of field 2ω | 87.03 | 44.38 | 22.48 |
| fb (in air) | 1.50 | 1.50 | 1.50 |
| Lens total length (in air) | 28.33 | 26.59 | 32.14 |

-continued

Unit mm

| | | | |
|---|---|---|---|
| d4 | 11.35 | 4.86 | 0.75 |
| d10 | 2.54 | 7.88 | 17.41 |
| d12 | 2.90 | 2.30 | 2.44 |

Unit focal length

| | | | |
|---|---|---|---|
| f1 = −11.44 | f2 = 8.71 | f3 = 15.21 | f4 = 3618.76 |

Example 15

Unit mm

Surface data

| Surface no. | r | d | nd | νd |
|---|---|---|---|---|
| Object plane | ∞ | ∞ | | |
| 1* | −25.103 | 0.70 | 1.43875 | 94.93 |
| 2* | 6.080 | 1.63 | | |
| 3* | 12.224 | 1.60 | 1.63493 | 23.90 |
| 4* | 14.339 | Variable | | |
| 5(Stop) | ∞ | 0.70 | | |
| 6* | 4.637 | 1.32 | 1.58313 | 59.46 |
| 7* | −14.558 | 0.10 | | |
| 8 | 6.868 | 1.54 | 1.58313 | 59.38 |
| 9 | −30.457 | 0.40 | 1.64769 | 33.79 |
| 10 | 3.127 | Variable | | |
| 11 | −20.000 | 1.70 | 1.53110 | 55.91 |
| 12* | −5.921 | Variable | | |
| 13* | −20.000 | 0.60 | 1.53110 | 55.91 |
| 14 | −20.000 | 0.35 | | |
| 15 | ∞ | 0.30 | 1.51633 | 64.14 |
| 16 | ∞ | 0.50 | | |
| 17 | ∞ | 0.50 | 1.51633 | 64.14 |
| 18 | ∞ | 0.37 | | |
| Image plane (Light receiving surface) | ∞ | | | |

Aspherical surface data

1st surface

K = 0.000
A4 = 6.85260e−04, A6 = −2.20115e−05, A8 = 2.09565e−07

2nd surface

K = −0.725
A4 = 1.44973e−03, A6 = 3.65628e−05, A8 = −7.16116e−07

3rd surface

K = 0.000
A4 = −2.87425e−04

4th surface

K = 0.000
A4 = −8.85291e−04, A6 = −1.59274e−05, A8 = 1.84840e−07, A10 = 7.29044e−10

6th surface

K = −0.488
A4 = −6.21463e−04, A6 = −7.36334e−06, A8 = −6.97893e−06

7th surface

K = 0.000
A4 = 5.11002e−04, A6 = −2.01008e−05, A8 = −6.54610e−06

Unit mm

12th surface

K = 0.000
A4 = 1.33262e−03, A6 = −2.36264e−05, A8 = 5.79195e−07, A10 = 1.09061e−08

13th surface

K = 0.000
A4 = 2.40459e−04, A6 = −5.80855e−05, A8 = 1.61734e−06

Zoom data

| | Wide angle | Intermediate | Telephoto |
|---|---|---|---|
| Focal length | 5.07 | 9.67 | 19.44 |
| Fno. | 3.01 | 4.30 | 6.74 |
| Angle of field 2ω | 83.58 | 42.38 | 21.41 |
| fb(in air) | 1.77 | 1.77 | 1.79 |
| Lens total length(in air) | 28.97 | 27.30 | 32.79 |
| d4 | 11.54 | 5.00 | 0.71 |
| d10 | 2.40 | 8.02 | 17.58 |
| d12 | 2.98 | 2.22 | 2.43 |

Unit focal length

| | | | |
|---|---|---|---|
| f1 = −12.09 | f2 = 8.91 | f3 = 15.20 | f4 = 3618.76 |

Example 16

Unit mm

Surface data

| Surface no. | r | d | nd | νd |
|---|---|---|---|---|
| Object plane | ∞ | ∞ | | |
| 1* | −50.455 | 0.30 | 1.67790 | 55.34 |
| 2* | 4.974 | 1.75 | | |
| 3* | 6.979 | 1.45 | 1.63493 | 23.90 |
| 4* | 11.559 | Variable | | |
| 5(Stop) | ∞ | 0.70 | | |
| 6* | 4.507 | 1.64 | 1.58313 | 59.46 |
| 7* | −11.278 | 0.10 | | |
| 8 | 6.745 | 1.34 | 1.58313 | 59.38 |
| 9 | −10.617 | 0.40 | 1.64769 | 33.79 |
| 10 | 3.059 | Variable | | |
| 11 | −30.000 | 1.70 | 1.53110 | 55.91 |
| 12* | −6.486 | Variable | | |
| 13* | −20.000 | 0.60 | 1.53110 | 55.91 |
| 14 | −20.000 | 0.35 | | |
| 15 | ∞ | 0.30 | 1.51633 | 64.14 |
| 16 | ∞ | 0.50 | | |
| 17 | ∞ | 0.50 | 1.51633 | 64.14 |
| 18 | ∞ | 0.37 | | |
| Image plane (Light receiving surface) | ∞ | | | |

Aspherical surface data

1st surface

K = 0.000
A4 = 1.41848e−03, A6 = −3.61224e−05, A8 = 2.59203e−07

2nd surface

K = −0.681
A4 = 1.11701e−03, A6 = 7.15746e−05, A8 = −6.98755e−07

3rd surface

K = 0.000
A4 = −1.91054e−03

-continued

| Unit mm |
|---|

4th surface

K = 0.000
A4 = −1.82170e−03, A6 = −1.55989e−05, A8 = 5.32667e−07,
A10 = −4.35573e−08
6th surface K = −0.611
A4 = −4.86853e−04, A6 = −1.84631e−05, A8 = 6.86150e−06
7th surface K = 0.000
A4 = 9.29477e−04, A6 = −3.86900e−05, A8 = 8.80117e−06
12th surface K = 0.000
A4 = 1.03184e−03, A6 = −1.29944e−05, A8 = 8.27632e−08,
A10 = 1.35500e−08
13th surface K = 0.000
A4 = 3.00631e−04, A6 = −7.68117e−05, A8 = 2.34649e−06

| Zoom data | | | |
|---|---|---|---|
| | Wide angle | Intermediate | Telephoto |
| Focal length | 4.14 | 7.90 | 15.89 |
| Fno. | 2.94 | 4.08 | 6.43 |
| Angle of field2ω | 94.63 | 51.11 | 25.98 |
| fb(in air) | 1.76 | 1.77 | 1.81 |
| Lens total length(in air) | 28.63 | 26.48 | 32.29 |
| d4 | 11.82 | 5.24 | 1.37 |
| d10 | 2.88 | 7.45 | 16.70 |
| d12 | 2.18 | 2.05 | 2.43 |

| Unit focal length | | | |
|---|---|---|---|
| f1 = −9.42 | f2 = 8.28 | f3 = 15.20 | f4 = 3618.76 |

Example 17

| Unit mm | | | | |
|---|---|---|---|---|
| Surface data | | | | |
| Surface no. | r | d | nd | νd |
| Object plane | ∞ | ∞ | | |
| 1* | −29.631 | 0.10 | 1.53110 | 55.91 |
| 2* | 4.562 | 1.59 | | |
| 3* | 6.722 | 1.45 | 1.63493 | 23.90 |
| 4* | 10.644 | Variable | | |
| 5(Stop) | ∞ | 0.70 | | |
| 6* | 4.486 | 1.43 | 1.58313 | 59.46 |
| 7* | −12.734 | 0.10 | | |
| 8 | 6.541 | 1.31 | 1.58313 | 59.38 |
| 9 | −13.845 | 0.40 | 1.64769 | 33.79 |
| 10 | 3.043 | Variable | | |
| 11 | −56.052 | 1.70 | 1.53110 | 55.91 |
| 12* | −7.131 | Variable | | |
| 13* | −20.000 | 0.60 | 1.53110 | 55.91 |
| 14 | −20.000 | 0.35 | | |
| 15 | ∞ | 0.30 | 1.51633 | 64.14 |
| 16 | ∞ | 0.50 | | |
| 17 | ∞ | 0.50 | 1.51633 | 64.14 |
| 18 | ∞ | 0.37 | | |
| Image plane (Light receiving surface) | ∞ | | | |

-continued

| Unit mm |
|---|

Aspherical surface data

1st surface

K = 0.000
A4 = 8.42149e−04, A6 = −2.17388e−05, A8 = 1.54302e−07
2nd surface

K = −0.610
A4 = 6.07843e−04, A6 = 5.34815e−05, A8 = 3.08827e−08
3rd surface

K = 0.000
A4 = −1.09830e−03
4th surface

K = 0.000
A4 = −1.16616e−03, A6 = −1.57027e−05, A8 = 2.30965e−07,
A10 = −2.92440e−08
6th surface K = −0.509
A4 = −7.13132e−04, A6 = −9.48462e−06, A8 = −4.45919e−06
7th surface K = 0.000
A4 = 5.91213e−04, A6 = −2.33970e−05, A8 = −3.72235e−06
12th surface K = 0.000
A4 = 9.60394e−04, A6 = −2.39826e−05, A8 = 5.59280e−07,
A10 = 1.84502e−09
13th surface K = 0.000
A4 = 3.00631e−04, A6 = −7.68117e−05, A8 = 2.34649e−06

| Zoom data | | | |
|---|---|---|---|
| | Wide angle | Intermediate | Telephoto |
| Focal length | 4.52 | 8.62 | 17.33 |
| Fno. | 2.91 | 4.08 | 6.41 |
| Angle of field2ω | 89.85 | 47.19 | 23.89 |
| fb(in air) | 1.76 | 1.77 | 1.81 |
| Lens total length(in air) | 27.90 | 25.95 | 31.65 |
| d4 | 11.62 | 5.00 | 0.95 |
| d10 | 2.57 | 7.61 | 17.07 |
| d12 | 2.57 | 2.19 | 2.43 |

| Unit focal length | | | |
|---|---|---|---|
| f1 = −10.73 | f2 = 8.59 | f3 = 15.20 | f4 = 3618.76 |

Example 18

| Unit mm | | | | |
|---|---|---|---|---|
| Surface data | | | | |
| Surface no. | r | d | nd | νd |
| Object plane | ∞ | ∞ | | |
| 1* | −35.202 | 0.50 | 1.67790 | 55.34 |
| 2* | 4.400 | 1.94 | | |
| 3* | 6.492 | 1.57 | 1.63493 | 23.90 |
| 4* | 12.000 | Variable | | |
| 5(Stop) | ∞ | 0.70 | | |
| 6* | 3.301 | 1.90 | 1.58313 | 59.38 |
| 7* | −16.541 | 0.10 | | |
| 8* | 8.526 | 0.59 | 1.63493 | 23.90 |
| 9* | 3.047 | Variable | | |
| 10 | 79.862 | 1.60 | 1.53110 | 55.91 |

-continued

Unit mm

| 11* | −11.016 | Variable | | |
| 12* | −20.000 | 0.60 | 1.53110 | 55.91 |
| 13 | −20.000 | 0.30 | | |
| 14 | ∞ | 0.50 | 1.51633 | 64.14 |
| 15 | ∞ | 0.37 | | |
| Image plane (Light receiving surface) | ∞ | | | |

Aspherical surface data

1st surface

K = 0.000
A4 = 9.14220e−04, A6 = −7.42017e−06
2nd surface

K = 0.000
A4 = −6.80257e−04, A6 = 1.85395e−05, A8 = 3.27506e−06
3rd surface

K = 0.000
A4 = −1.25677e−03, A6 = −6.59311e−05, A8 = 1.00599e−05,
A10 = −3.61301e−07
4th surface K = 0.000
A4 = −9.61788e−04, A6 = −5.19308e−05, A8 = 6.13359e−06,
A10 = −3.15407e−07
6th surface K = −0.425
A4 = 1.40059e−03, A6 = 2.54645e−04, A8 = −8.89659e−06
7th surface K = 0.000
A4 = 7.87603e−03, A6 = −2.36842e−03, A8 = 1.09604e−04
8th surface K = 0.000
A4 = −5.47498e−04, A6 = −2.75797e−03
9th surface K = 0.000
A4 = −3.10134e−03, A6 = −1.00404e−04
11th surface K = 0.000
A4 = 3.19804e−04, A6 = −8.29338e−07, A8 = −3.58347e−07,
A10 = 1.14196e−08
12th surface K = 0.000
A4 = 3.00631e−04, A6 = −7.68117e−05, A8 = 2.34649e−06

Zoom data

| | Wide angle | Intermediate | Telephoto |
|---|---|---|---|
| Focal length | 3.98 | 7.59 | 15.29 |
| Fno. | 3.02 | 4.17 | 6.58 |
| Angle of field2ω | 95.68 | 54.47 | 27.61 |
| fb(in air) | 1.00 | 1.00 | 1.00 |
| Lens total length(in air) | 27.78 | 26.07 | 32.13 |
| d4 | 10.68 | 4.37 | 0.75 |
| d9 | 3.42 | 8.22 | 17.83 |
| d11 | 3.16 | 2.97 | 3.05 |

Unit focal length

| f1 = −8.62 | f2 = 8.24 | f3 = 18.34 | f4 = 3618.76 |

Aberrations of the zoom lenses according to the first to eighteenth examples in the state in which the zoom lenses are focused on an object point at infinity are shown in FIGS. 19A to 36L. In these aberrations diagrams, "ω" represents the half angle of view.

FIGS. 19A, 19B, 19C, and 19D show spherical aberration (SA), astigmatism (AS), distortion (DT), and chromatic aberration of magnification (CC) respectively of the zoom lens according to the first example at the wide angle end.

FIGS. 19E, 19F, 19G, and 19H show spherical aberration (SA), astigmatism (AS), distortion (DT), and chromatic aberration of magnification (CC) respectively of the zoom lens according to the first example in the intermediate focal length state.

FIGS. 19I, 19J, 19K, and 19L show spherical aberration (SA), astigmatism (AS), distortion (DT), and chromatic aberration of magnification (CC) respectively of the zoom lens according to the first example at the telephoto end.

FIGS. 20A, 20B, 20C, and 20D show spherical aberration (SA), astigmatism (AS), distortion (DT), and chromatic aberration of magnification (CC) respectively of the zoom lens according to the second example at the wide angle end.

FIGS. 20E, 20F, 20G, and 20H show spherical aberration (SA), astigmatism (AS), distortion (DT), and chromatic aberration of magnification (CC) respectively of the zoom lens according to the second example in the intermediate focal length state.

FIGS. 20I, 20J, 20K, and 20L show spherical aberration (SA), astigmatism (AS), distortion (DT), and chromatic aberration of magnification (CC) respectively of the zoom lens according to the second example at the telephoto end.

FIGS. 21A, 21B, 21C, and 21D show spherical aberration (SA), astigmatism (AS), distortion (DT), and chromatic aberration of magnification (CC) respectively of the zoom lens according to the third example at the wide angle end.

FIGS. 21E, 21F, 21G, and 21H show spherical aberration (SA), astigmatism (AS), distortion (DT), and chromatic aberration of magnification (CC) respectively of the zoom lens according to the third example in the intermediate focal length state.

FIGS. 21I, 21J, 21K, and 21L show spherical aberration (SA), astigmatism (AS), distortion (DT), and chromatic aberration of magnification (CC) respectively of the zoom lens according to the third example at the telephoto end.

FIGS. 22A, 22B, 22C, and 22D show spherical aberration (SA), astigmatism (AS), distortion (DT), and chromatic aberration of magnification (CC) respectively of the zoom lens according to the fourth example at the wide angle end.

FIGS. 22E, 22F, 22G, and 22H show spherical aberration (SA), astigmatism (AS), distortion (DT), and chromatic aberration of magnification (CC) respectively of the zoom lens according to the fourth example in the intermediate focal length state.

FIGS. 22I, 22J, 22K, and 22L show spherical aberration (SA), astigmatism (AS), distortion (DT), and chromatic aberration of magnification (CC) respectively of the zoom lens according to the fourth example at the telephoto end.

FIGS. 23A, 23B, 23C, and 23D show spherical aberration (SA), astigmatism (AS), distortion (DT), and chromatic aberration of magnification (CC) respectively of the zoom lens according to the fifth example at the wide angle end.

FIGS. 23E, 23F, 23G, and 23H show spherical aberration (SA), astigmatism (AS), distortion (DT), and chromatic aberration of magnification (CC) respectively of the zoom lens according to the fifth example in the intermediate focal length state.

FIGS. 23I, 23J, 23K, and 23L show spherical aberration (SA), astigmatism (AS), distortion (DT), and chromatic aberration of magnification (CC) respectively of the zoom lens according to the fifth example at the telephoto end.

FIGS. 24A, 24B, 24C, and 24D show spherical aberration (SA), astigmatism (AS), distortion (DT), and chromatic aberration of magnification (CC) respectively of the zoom lens according to the sixth example at the wide angle end.

FIGS. 24E, 24F, 24G, and 24H show spherical aberration (SA), astigmatism (AS), distortion (DT), and chromatic aberration of magnification (CC) respectively of the zoom lens according to the sixth example in the intermediate focal length state.

FIGS. 24I, 24J, 24K, and 24L show spherical aberration (SA), astigmatism (AS), distortion (DT), and chromatic aberration of magnification (CC) respectively of the zoom lens according to the sixth example at the telephoto end.

FIGS. 25A, 25B, 25C, and 25D show spherical aberration (SA), astigmatism (AS), distortion (DT), and chromatic aberration of magnification (CC) respectively of the zoom lens according to the seventh example at the wide angle end.

FIGS. 25E, 25F, 25G, and 25H show spherical aberration (SA), astigmatism (AS), distortion (DT), and chromatic aberration of magnification (CC) respectively of the zoom lens according to the seventh example in the intermediate focal length state.

FIGS. 25I, 25J, 25K, and 25L show spherical aberration (SA), astigmatism (AS), distortion (DT), and chromatic aberration of magnification (CC) respectively of the zoom lens according to the seventh example at the telephoto end.

FIGS. 26A, 26B, 26C, and 26D show spherical aberration (SA), astigmatism (AS), distortion (DT), and chromatic aberration of magnification (CC) respectively of the zoom lens according to the eighth example at the wide angle end.

FIGS. 26E, 26F, 26G, and 26H show spherical aberration (SA), astigmatism (AS), distortion (DT), and chromatic aberration of magnification (CC) respectively of the zoom lens according to the eighth example in the intermediate focal length state.

FIGS. 26I, 26J, 26K, and 26L show spherical aberration (SA), astigmatism (AS), distortion (DT), and chromatic aberration of magnification (CC) respectively of the zoom lens according to the eighth example at the telephoto end.

FIGS. 27A, 27B, 27C, and 27D show spherical aberration (SA), astigmatism (AS), distortion (DT), and chromatic aberration of magnification (CC) respectively of the zoom lens according to the ninth example at the wide angle end.

FIGS. 27E, 27F, 27G, and 27H show spherical aberration (SA), astigmatism (AS), distortion (DT), and chromatic aberration of magnification (CC) respectively of the zoom lens according to the ninth example in the intermediate focal length state.

FIGS. 27I, 27J, 27K, and 27L show spherical aberration (SA), astigmatism (AS), distortion (DT), and chromatic aberration of magnification (CC) respectively of the zoom lens according to the ninth example at the telephoto end.

FIGS. 28A, 28B, 28C, and 28D show spherical aberration (SA), astigmatism (AS), distortion (DT), and chromatic aberration of magnification (CC) respectively of the zoom lens according to the tenth example at the wide angle end.

FIGS. 28E, 28F, 28G, and 28H show spherical aberration (SA), astigmatism (AS), distortion (DT), and chromatic aberration of magnification (CC) respectively of the zoom lens according to the tenth example in the intermediate focal length state.

FIGS. 28I, 28J, 28K, and 28L show spherical aberration (SA), astigmatism (AS), distortion (DT), and chromatic aberration of magnification (CC) respectively of the zoom lens according to the tenth example at the telephoto end.

FIGS. 29A, 29B, 29C, and 29D show spherical aberration (SA), astigmatism (AS), distortion (DT), and chromatic aberration of magnification (CC) respectively of the zoom lens according to the eleventh example at the wide angle end.

FIGS. 29E, 29F, 29G, and 29H show spherical aberration (SA), astigmatism (AS), distortion (DT), and chromatic aberration of magnification (CC) respectively of the zoom lens according to the eleventh example in the intermediate focal length state.

FIGS. 29I, 29J, 29K, and 29L show spherical aberration (SA), astigmatism (AS), distortion (DT), and chromatic aberration of magnification (CC) respectively of the zoom lens according to the eleventh example at the telephoto end.

FIGS. 30A, 30B, 30C, and 30D show spherical aberration (SA), astigmatism (AS), distortion (DT), and chromatic aberration of magnification (CC) respectively of the zoom lens according to the twelfth example at the wide angle end.

FIGS. 30E, 30F, 30G, and 30H show spherical aberration (SA), astigmatism (AS), distortion (DT), and chromatic aberration of magnification (CC) respectively of the zoom lens according to the twelfth example in the intermediate focal length state.

FIGS. 30I, 30J, 30K, and 30L show spherical aberration (SA), astigmatism (AS), distortion (DT), and chromatic aberration of magnification (CC) respectively of the zoom lens according to the twelfth example at the telephoto end.

FIGS. 31A, 31B, 31C, and 31D show spherical aberration (SA), astigmatism (AS), distortion (DT), and chromatic aberration of magnification (CC) respectively of the zoom lens according to the thirteenth example at the wide angle end.

FIGS. 31E, 31F, 31G, and 31H show spherical aberration (SA), astigmatism (AS), distortion (DT), and chromatic aberration of magnification (CC) respectively of the zoom lens according to the thirteenth example in the intermediate focal length state.

FIGS. 31I, 31J, 31K, and 31L show spherical aberration (SA), astigmatism (AS), distortion (DT), and chromatic aberration of magnification (CC) respectively of the zoom lens according to the thirteenth example at the telephoto end.

FIGS. 32A, 32B, 32C, and 32D show spherical aberration (SA), astigmatism (AS), distortion (DT), and chromatic aberration of magnification (CC) respectively of the zoom lens according to the fourteenth example at the wide angle end.

FIGS. 32E, 32F, 32G, and 32H show spherical aberration (SA), astigmatism (AS), distortion (DT), and chromatic aberration of magnification (CC) respectively of the zoom lens according to the fourteenth example in the intermediate focal length state.

FIGS. 32I, 32J, 32K, and 32L show spherical aberration (SA), astigmatism (AS), distortion (DT), and chromatic aberration of magnification (CC) respectively of the zoom lens according to the fourteenth example at the telephoto end.

FIGS. 33A, 33B, 33C, and 33D show spherical aberration (SA), astigmatism (AS), distortion (DT), and chromatic aberration of magnification (CC) respectively of the zoom lens according to the fifteenth example at the wide angle end.

FIGS. 33E, 33F, 33G, and 33H show spherical aberration (SA), astigmatism (AS), distortion (DT), and chromatic aberration of magnification (CC) respectively of the zoom lens according to the fifteenth example in the intermediate focal length state.

FIGS. 33I, 33J, 33K, and 33L show spherical aberration (SA), astigmatism (AS), distortion (DT), and chromatic aberration of magnification (CC) respectively of the zoom lens according to the fifteenth example at the telephoto end.

FIGS. 34A, 34B, 34C, and 34D show spherical aberration (SA), astigmatism (AS), distortion (DT), and chromatic aberration of magnification (CC) respectively of the zoom lens according to the sixteenth example at the wide angle end.

FIGS. 34E, 34F, 34G, and 34H show spherical aberration (SA), astigmatism (AS), distortion (DT), and chromatic aberration of magnification (CC) respectively of the zoom lens according to the sixteenth example in the intermediate focal length state.

FIGS. 34I, 34J, 34K, and 34L show spherical aberration (SA), astigmatism (AS), distortion (DT), and chromatic aberration of magnification (CC) respectively of the zoom lens according to the sixteenth example at the telephoto end.

FIGS. 35A, 35B, 35C, and 35D show spherical aberration (SA), astigmatism (AS), distortion (DT), and chromatic aberration of magnification (CC) respectively of the zoom lens according to the seventeenth example at the wide angle end.

FIGS. 35E, 35F, 35G, and 35H show spherical aberration (SA), astigmatism (AS), distortion (DT), and chromatic aberration of magnification (CC) respectively of the zoom lens according to the seventeenth example in the intermediate focal length state.

FIGS. 35I, 35J, 35K, and 35L show spherical aberration (SA), astigmatism (AS), distortion (DT), and chromatic aberration of magnification (CC) respectively of the zoom lens according to the seventeenth example at the telephoto end.

Values corresponded to the conditional expression are shown as below:

(1) $n_{1n}$
(2) $n_{1p}$
(3) $|v_{1n} - v_{1p}|$
(4) $\Sigma d_{1G}/(y\tan(2\omega))$
(5) $d_{1nw}/d_{1nc}$
(6) $f_w/y$
(7) $d_{12}/|r_{1nf}|$
(8) $d_{12}/|r_{1pr}|$
(9) $d_t/y$
(10) $f_t/f_w$
(11) $d_w/y$
(12) $\Sigma d_{2G}/(y\tan(2\omega))$
(13) $|f_{air}|/|f_{1G}|$
(14) $d_t/(y\tan(2\omega))$
(15) $d_w/(y\tan(2\omega))$
(16) $d_{w3i}\tan(2\omega)/y$

| Conditional expression | Example 1 | Example 2 | Example 3 |
|---|---|---|---|
| (1) | 1.53 | 1.53 | 1.53 |
| (2) | 1.63 | 1.63 | 1.63 |
| (3) | 31.79 | 32.01 | 32.01 |
| (4) | 0.07 | 0.01 | 0.07 |
| (5) | 3.31 | 3.44 | 3.39 |
| (6) | 1.27 | 1.19 | 1.27 |
| (7) | 0.08 | 0.09 | 0.07 |
| (8) | 0.10 | 0.11 | 0.09 |
| (9) | 8.49 | 8.41 | 8.39 |
| (10) | 3.84 | 3.85 | 3.84 |
| (11) | 7.25 | 7.31 | 7.35 |
| (12) | 0.06 | 0.01 | 0.06 |
| (13) | 40.32 | 7.56 | 15.14 |
| (14) | 0.65 | 0.11 | 0.65 |
| (15) | 0.56 | 0.09 | 0.57 |
| (16) | 17.77 | 107.79 | 18.44 |

| | Example 4 | Example 5 | Example 6 | Example 7 |
|---|---|---|---|---|
| (1) | 1.53 | 1.53 | 1.53 | 1.50 |
| (2) | 1.63 | 1.63 | 1.63 | 1.63 |
| (3) | 31.79 | 31.79 | 31.79 | 57.64 |
| (4) | 0.12 | 0.09 | 0.08 | 0.07 |
| (5) | 4.08 | 11.31 | 21.66 | 3.41 |
| (6) | 1.35 | 1.31 | 1.30 | 1.26 |
| (7) | 0.06 | 0.06 | 0.06 | 0.08 |
| (8) | 0.07 | 0.10 | 0.11 | 0.11 |
| (9) | 8.54 | 8.54 | 8.54 | 8.49 |
| (10) | 3.84 | 3.84 | 3.84 | 3.84 |
| (11) | 7.20 | 7.16 | 7.16 | 7.26 |
| (12) | 0.11 | 0.09 | 0.08 | 0.05 |
| (13) | 20.19 | 6.72 | 5.82 | 6.74 |
| (14) | 1.14 | 0.89 | 0.85 | 0.57 |
| (15) | 0.96 | 0.74 | 0.71 | 0.49 |
| (16) | 10.50 | 13.32 | 13.97 | 20.21 |

| | Example 8 | Example 9 | Example 10 | Example 11 |
|---|---|---|---|---|
| (1) | 1.44 | 1.58 | 1.53 | 1.53 |
| (2) | 1.63 | 1.63 | 1.63 | 1.63 |
| (3) | 71.03 | 35.48 | 31.79 | 31.79 |
| (4) | 0.09 | 0.05 | 0.12 | 0.11 |
| (5) | 3.43 | 3.26 | 3.92 | 27.59 |
| (6) | 1.30 | 1.24 | 1.32 | 1.32 |
| (7) | 0.12 | 0.07 | 0.04 | 0.04 |
| (8) | 0.11 | 0.10 | 0.11 | 0.11 |
| (9) | 8.49 | 8.49 | 8.07 | 7.87 |
| (10) | 3.84 | 3.84 | 3.84 | 3.84 |
| (11) | 7.24 | 7.24 | 8.07 | 7.90 |
| (12) | 0.07 | 0.04 | 0.10 | 0.11 |
| (13) | 17.89 | 9.13 | 3.40 | 3.34 |
| (14) | 0.78 | 0.44 | 0.87 | 0.94 |
| (15) | 0.67 | 0.37 | 0.87 | 0.94 |
| (16) | 14.97 | 26.28 | — | — |

Further, values corresponded to the conditional expression are shown as below:

| Conditional expression | Example 12 | Example 13 | Example 14 | Example 15 |
|---|---|---|---|---|
| (1) n1n | 1.53 | 1.53 | 1.53 | 1.44 |
| (2) n1p | 1.63 | 1.63 | 1.63 | 1.63 |
| (3) \|v1n − v1p\| | 32.01 | 31.79 | 32.01 | 71.03 |
| (4A) $\Sigma D1G/(y\tan(\omega))$ | 1.06 | 1.25 | 1.03 | 1.14 |
| (5) d1nw/d1nc | 3.41 | 3.74 | 3.30 | 4.17 |
| (6A) fw/y | 1.22 | 1.33 | 1.26 | 1.32 |
| (7) d12/\|r1nf\| | 0.08 | 0.04 | 0.05 | 0.06 |
| (8) d12/\|r1pr\| | 0.10 | 0.11 | 0.10 | 0.11 |
| (9A) dt/y | 8.45 | 8.06 | 8.37 | 8.54 |
| (10) ft/fw | 3.84 | 3.84 | 3.84 | 3.84 |
| (11A) dw/y | 7.36 | 8.06 | 7.38 | 7.54 |
| (12A) $\Sigma D2G/(y\tan(\omega))$ | 0.86 | 1.09 | 0.90 | 0.98 |
| (13A) \|fair\|/\|f1G\| | 11.23 | 3.40 | 7.60 | 5.86 |
| (14A) dt/(y$\tan(\omega)$) | 8.89 | 9.43 | 8.82 | 9.55 |
| (15A) dw/(y$\tan(\omega)$) | 7.74 | 9.43 | 7.77 | 8.44 |
| (16A) dw3i$\tan(\omega)$/y | 1.23 | — | 1.18 | 1.19 |
| (17) R3r/R4f | 0.38 | — | 0.35 | 0.30 |
| (18) \|d(f(h))/dh\| | 0.08 | 0.08 | 0.11 | 0.07 |
| (19) \|ff\|/fw\| | 771 | 742 | 749 | 715 |
| (20) d(f(h))/dh | −0.08 | −0.08 | −0.11 | −0.07 |
| (21) d(f(h))/dh | −0.08 | −0.08 | −0.11 | −0.07 |
| (22) \|f(h)/y\| | 0.02 | 0.03 | 0.03 | 0.01 |

| Conditional expression | Example 16 | Example 17 | Example 18 |
|---|---|---|---|
| (1) n1n | 1.68 | 1.53 | 1.68 |
| (2) n1p | 1.63 | 1.63 | 1.63 |
| (3) \|v1n − v1p\| | 31.44 | 32.01 | 31.44 |
| (4A) $\Sigma d1G/(y\tan(\omega))$ | 0.84 | 0.82 | 0.95 |
| (5) d1nw/d1nc | 7.82 | 25.93 | 5.28 |
| (6A) fw/y | 1.08 | 1.18 | 1.04 |
| (7) d12/\|r1nf\| | 0.03 | 0.05 | 0.06 |
| (8) d12/\|r1pr\| | 0.15 | 0.15 | 0.16 |
| (9A) dt/y | 8.41 | 8.24 | 8.37 |
| (10) ft/fw | 3.84 | 3.84 | 3.84 |
| (11A) dw/y | 7.46 | 7.27 | 7.23 |
| (12A) $\Sigma d2G/(y\tan(\omega))$ | 0.84 | 0.85 | 0.61 |
| (13A) \|fair\|/\|f1G\| | 4.50 | 20.91 | 4.30 |
| (14A) dt/(y$\tan(\omega)$) | 7.75 | 8.26 | 7.58 |
| (15A) dw/(y$\tan(\omega)$) | 6.88 | 7.29 | 6.55 |
| (16A) dw3i$\tan(\omega)$/y | 1.22 | 1.22 | 1.31 |
| (17) R3r/R4f | 0.32 | 0.36 | 0.55 |
| (18) \|d(f(h))/dh\| | 0.08 | 0.08 | 0.08 |

-continued

| | | | |
|---|---|---|---|
| (19) \|ffl/fw\| | 874 | 801 | 910 |
| (20) d(f(h))/dh | −0.08 | −0.08 | −0.08 |
| (21) d(f(h))/dh | −0.08 | −0.08 | −0.08 |
| (22) \|f(h)/y\| | 0.02 | 0.02 | 0.02 |

A flare stop may be provided in addition to the aperture stop in order to eliminate unwanted light that may cause ghost images, lens flare or the like. The flare stop may be disposed on the object side of the first lens unit, between the first lens unit and the second lens unit, between the second lens unit and the third lens unit, between the second lens unit and the image plane, or between the third lens unit and the image plane. A frame member or other member may be adapted to cut rays that may cause lens flare. Alternatively, a flare stop may be provided on an optical component of the optical system by direct printing or by attaching a sticker. The aperture of the flare stop may have various shapes such as circular, elliptical, rectangular, or polygonal shape, or the shape of the aperture may be defined by a curve specified by a mathematical function. The flare stop may be adapted to cut not only detrimental beams but also beams that may cause coma flare etc. in the peripheral region of the picture area.

Antireflection coating may be applied on each lens to reduce ghost images and lens flare. The use of multi-layer coating is desirable because it will reduce ghost images and lens flare effectively. Coating for cutting infrared light may be applied on a lens surface (s) and/or a surface of the cover glass etc.

Incidentally, for preventing the occurrence of the ghost and the flare, generally, the antireflection coating is applied to a surface of a lens in contact with air.

On the other hand, at a cemented surface of a cemented lens, a refractive index of an adhesive is sufficiently higher than a refractive index of air. Therefore, in many cases, a reflectance is originally of the level of a single-layer coating, or lower, and the coating is applied in few cases. However, when the antireflection coating is applied positively even to the cemented surface, it is possible to reduce further the ghost and the flare, and to achieve a more favorable image.

Particularly, recently, a glass material having a high refractive index has been widely used in an optical system of cameras, for having a high effect on the aberration correction. However, when the glass material having a high refractive index is used as a cemented lens, a reflection at the cemented surface becomes unignorable. In such a case, applying the antireflection coating on the cemented surface is particularly effective.

An effective usage of the cemented surface coating has been disclosed in Japanese Patent Application Laid-open Publication No. Hei 2-27301, No. 2001-324676, No. 2005-92115, and U.S. Pat. No. 7,116,482. In these patent literatures, a cemented lens surface coating in a first lens unit of a positive preceding zoom lens system has been described, and the same as disclosed in these patent literatures may be implemented for the cemented lens surface in the first lens unit having a positive power, of the present invention.

As a coating material to be used, according to a refractive index of the adhesive material and a refractive index of the lens which is a base, coating materials such as $Ta_2O_5$, $TiO_2$, $Nb_2O_5$, $ZrO_2$, $HfO_2$, $CeO_2$, $SnO_2$, $In_2O_3$, $ZnO$, and $Y_2O_3$ having a comparatively higher refractive index, and coating materials such as $MgF_2$, $SiO_2$, and $Al_2O_3$ having a comparatively lower refractive index may be selected appropriately, and set to a film thickness which satisfies phase conditions.

Naturally, similar to the coating on the surface of the lens in contact with air, the coating on the cemented surface may also be let to be a multi layer coating. By combining appropriately a film thickness and a coating material of number of films not less than in two layers, it is possible to reduce further the reflectance, and to control spectral characteristics and angular characteristics.

Moreover, it is needless to mention that for the cemented surface of lenses other than the lenses in the first lens unit, it is effective to apply the coating on the cemented surface based on a similar idea.

(Correction of Distortion)

Incidentally, when the zoom lens system of the present invention is used, a digital correction of distortion of an image is carried out electrically. A basic concept for the digital correction of the distortion of an image will be described below.

Figure 37:
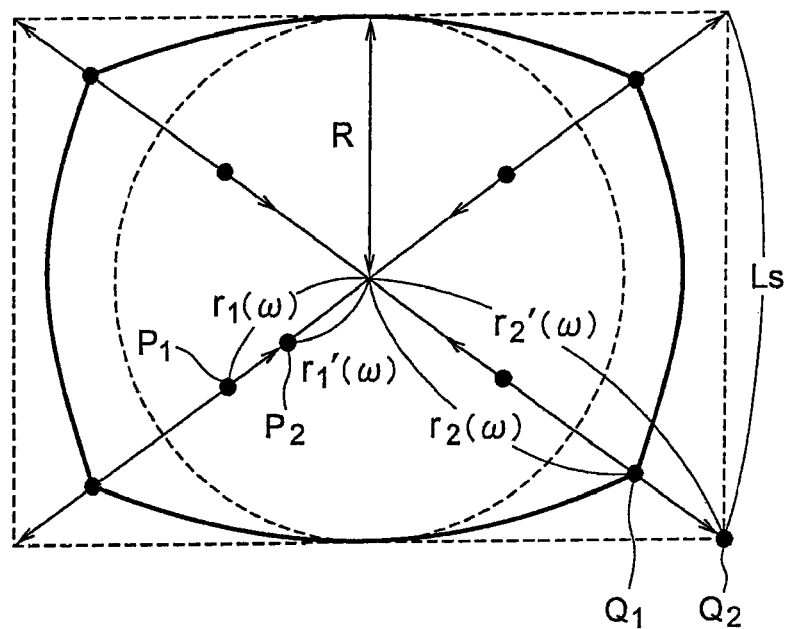
FIG. 37 illustrates correction of distortion.

For example, as shown in FIG. 37, with a point of intersection of an optical axis and an image pickup plane to be a center, a magnification on a circumference (image height) of a circle of radius R making a contact internally with a longer side of an effective image pickup plane is fixed, and this circumference is let to be a base reference for the correction. Next, each point on a circumference (image height) of an arbitrary radius r(ω) other than the radius R is moved in a substantial direction of radiation, and the correction is carried out by moving on a concentric circle such that the radius becomes r'(ω).

For example, in FIG. 37, a point $P_1$ on a circumference of an arbitrary radius $r_1(ω)$ positioned at an inner side of a circle of radius R is moved to a point $P_2$ on a circumference of a radius $r_1'(ω)$ which is to be corrected, directed toward a center of the circle. Moreover, a point $Q_1$ on a circumference of an arbitrary radius $r_2(ω)$ positioned at an outer side of the circle of radius R is moved to a point $Q_2$ on a circumference of a radius $r_2'(ω)$ which is to be corrected, directed toward a direction away from the center of the circle.

Here, r'(ω) can be expressed as follows.

$$r'(ω)=α \cdot f \tan ω (0 \leq α \leq 1)$$

where, ω is a half angle of field of an object and f is a focal length of an imaging optical system (the zoom lens system in the present invention).

Here, when an ideal image height corresponding to a circle (image height) of radius R is let to be Y, then $$α=R/Y=R/(f \tan ω).$$

The optical system, ideally, is rotationally symmetric with respect to an optical axis. In other words, the distortion also occurs in a rotationally symmetric manner with respect to the optical axis. Consequently, as it has been described above, in a case of correcting electrically the optical distortion, when it is possible to carry out correction by fixing a magnification on a circumference (image height) of the circle of radius R making a contact internally with a longer side of the effective image pickup plane, with a point of intersection of an optical axis on a reproduced image, and an image pickup plane to be a center, and moving each point on the circumference (image height) of radius r(ω) other than the radius R in a substantial direction of radiation, and moving on a concentric circle such that the radius becomes r'(ω), it can be considered to be advantageous from a point of amount of data and amount of calculation.

Incidentally, an optical image ceases to be a continuous amount at a point of time when an image is picked up by an electronic image pickup element (due to sampling). Consequently, the circle of radius R which is drawn exactly on the optical image ceases to be an accurate circle as long as pixels on the electronic image pickup element are not arranged radially.

In other words, regarding a shape correction of image data expressed for each discrete coordinate point, a circle which can fix the magnification does not exist. Therefore, for each pixel (Xi, Yj), a method of determining coordinates of a destination of movement (Xi , Yj') may be used. When two or more points (Xi, Yj) have moved to the coordinates (Xi', Yj'), an average of values of each pixel is taken. Moreover, when there is no point which has moved, interpolation may be performed by using a value of coordinate (Xi',Yj') of some of the surrounding pixels.

Such method is effective for correction when the distortion with respect to the optical axis is remarkable due to a manufacturing error etc. of the optical system or the electronic image pickup element, in the electronic image pickup apparatus having the zoom lens system in particular, and when the circle of the radius R drawn on the optical image is asymmetric. Moreover, it is effective for correction when there occurs to be a geometric distortion at the time of reproducing a signal to an image in an image pickup element or various output devices.

In the electronic image pickup apparatus of the present invention, for calculating a correction amount r'(ω)–r(ω), an arrangement may be made such that a relationship between r(ω), in other words, half angle of field and the image height, or a relationship between a real image height r and an ideal image height r'/α is recorded in a recording medium which is built-in in the electronic image pickup apparatus.

For an image after the distortion correction, not to have an extreme shortage of an amount of light at both ends in a direction of short side, the radius R may satisfy the following conditional expression.

$$0 \leq R \leq 0.6Ls$$

where, Ls is a length of a short side of the effective image pickup surface.

It is preferable that the radius R satisfies the following conditional expression.

$$0.3Ls \leq R \leq 0.6Ls$$

Furthermore, it is most advantageous to match the radius R with a radius of a circle making an internal contact in a short side direction of a substantially effective image pickup plane. In a case of correction in which, the magnification is fixed near the radius R=0, in other words, near on the axis, it is somewhat disadvantageous from an aspect of substantial number of images, but it is possible to secure an effect for making the size small even when the angle is widened.

A focal length interval which requires a correction is divided into a number of focal point zones. Moreover, the correction may be carried out with the amount of correction as in a case in which, a correction result which satisfies substantially the following relationship $$r'(\omega) = \alpha \cdot f \tan \omega$$

near a telephoto end in the focal point zones which are divided.

However, in this case, at a wide angle end in the focal point zones which are divided, a barrel-shape distortion at the wide angle end of the focal point zones which are divided is remained to some extent. Moreover, when the number of divided zones is increased, there arises a need to hold specific data necessary for correction, additionally in a recording medium. Therefore it is not preferable to increase the number of divided zones. Therefore, one or a plurality of coefficients associated with each focal length in the focal point zones which are divided, are calculated in advance. The coefficients may be determined based on a measurement by simulation or by actual equipment.

An amount of correction in a case in which, the correction result which satisfies substantially the following relationship $$r'(\omega) = \alpha \cdot f \tan \omega$$

near the telephoto end in the focal point zones which are divided may be calculated, and may let to be a final amount of correction by multiplying uniformly the coefficient for each focal length with respect to this amount of correction.

Incidentally, when there is no distortion in an image achieved by imaging (forming an image) of an infinite object, the following relationship $$f = y/\tan \omega$$

holds.

Here, y denotes a height (image height) of an image point from the optical axis, f denotes a focal length of an imaging system (zoom lens system in the present invention), and ω denotes an angle (object half angle of field) with respect to the optical axis in an object point direction corresponding to image points connecting from a center on an image pickup plane up to a position of y.

When there is a barrel-shape distortion in the imaging system, the relationship becomes $$f > y/\tan \omega.$$

In other words, when the focal length f of the imaging system, and the image height y are let to be fixed, a value of ω becomes large.

(Digital Camera)

Figure 38:
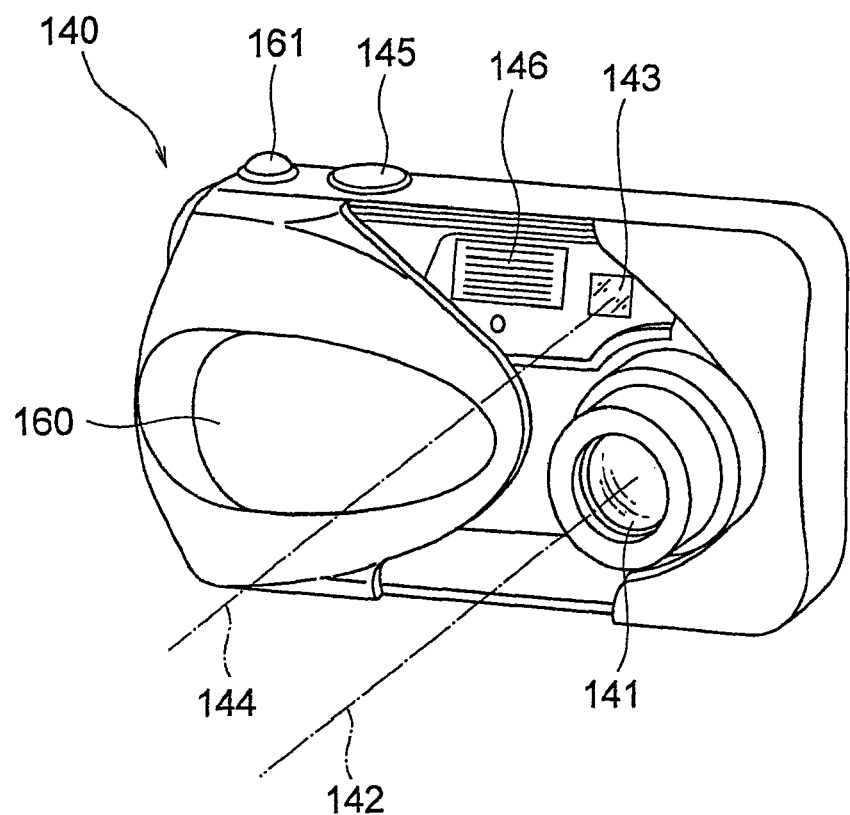
FIG. 38 is a front perspective view showing the outer appearance of a digital camera equipped with a zoom lens according to the present invention.
Figure 39:
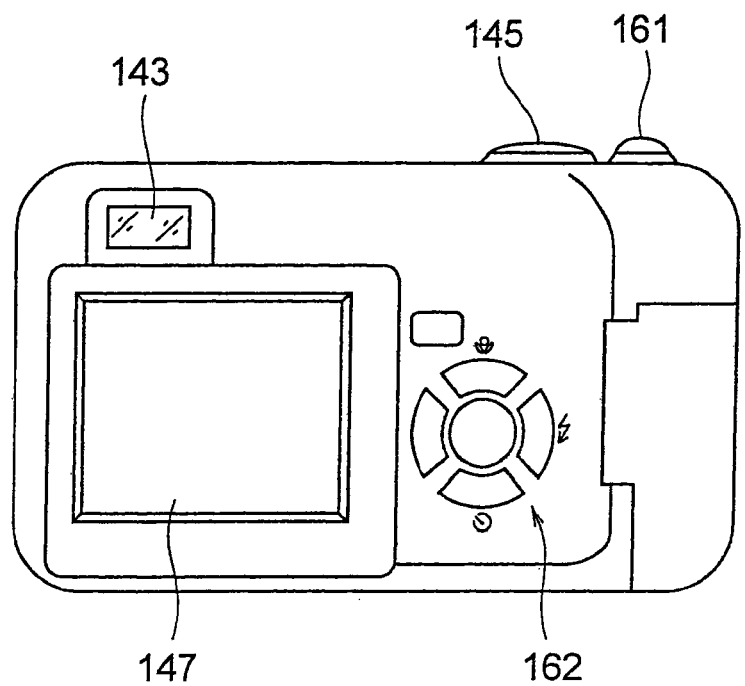
FIG. 39 is a rear perspective view of the digital camera.
Figure 40:
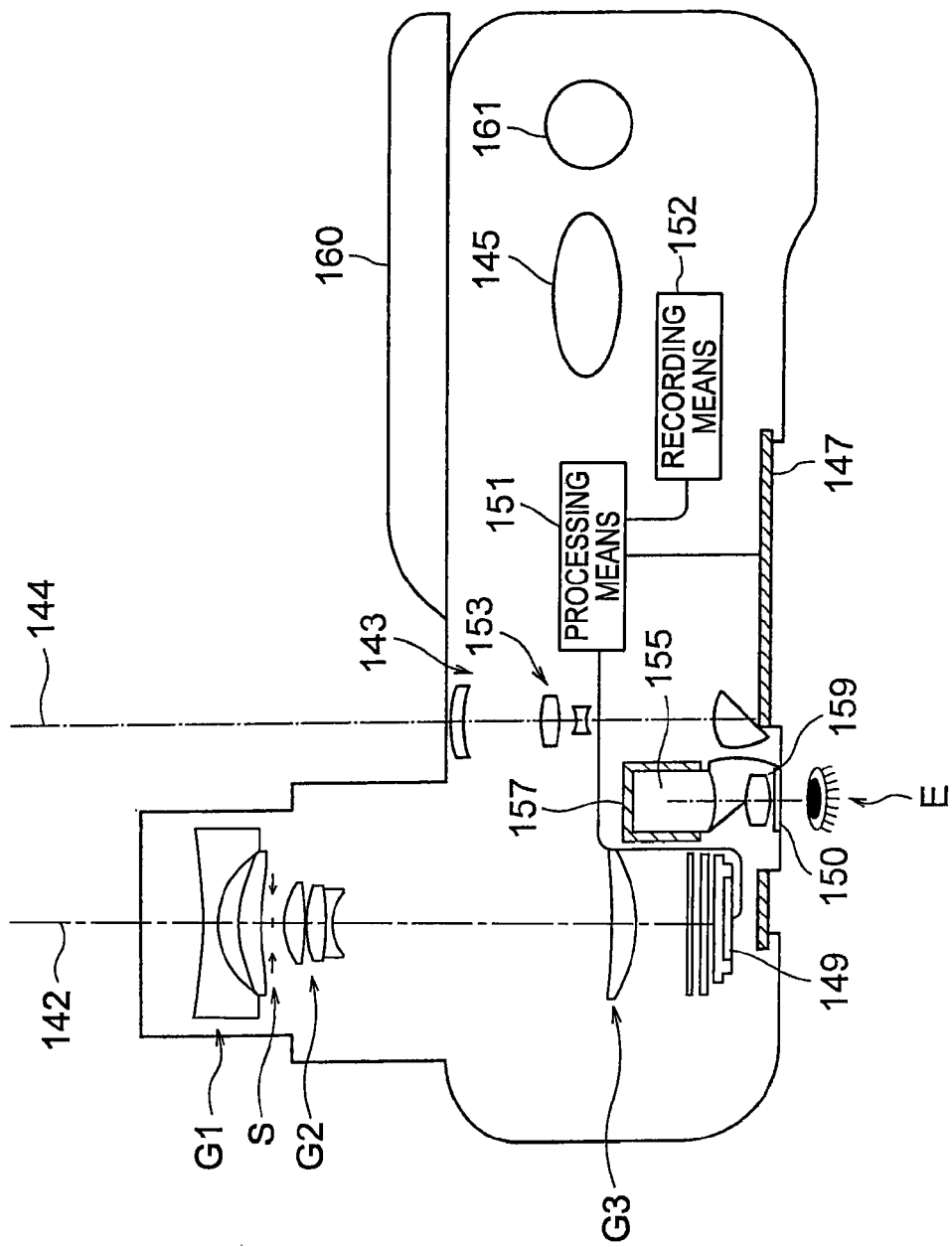
FIG. 40 is a cross sectional view of the digital camera.
Figure 41:
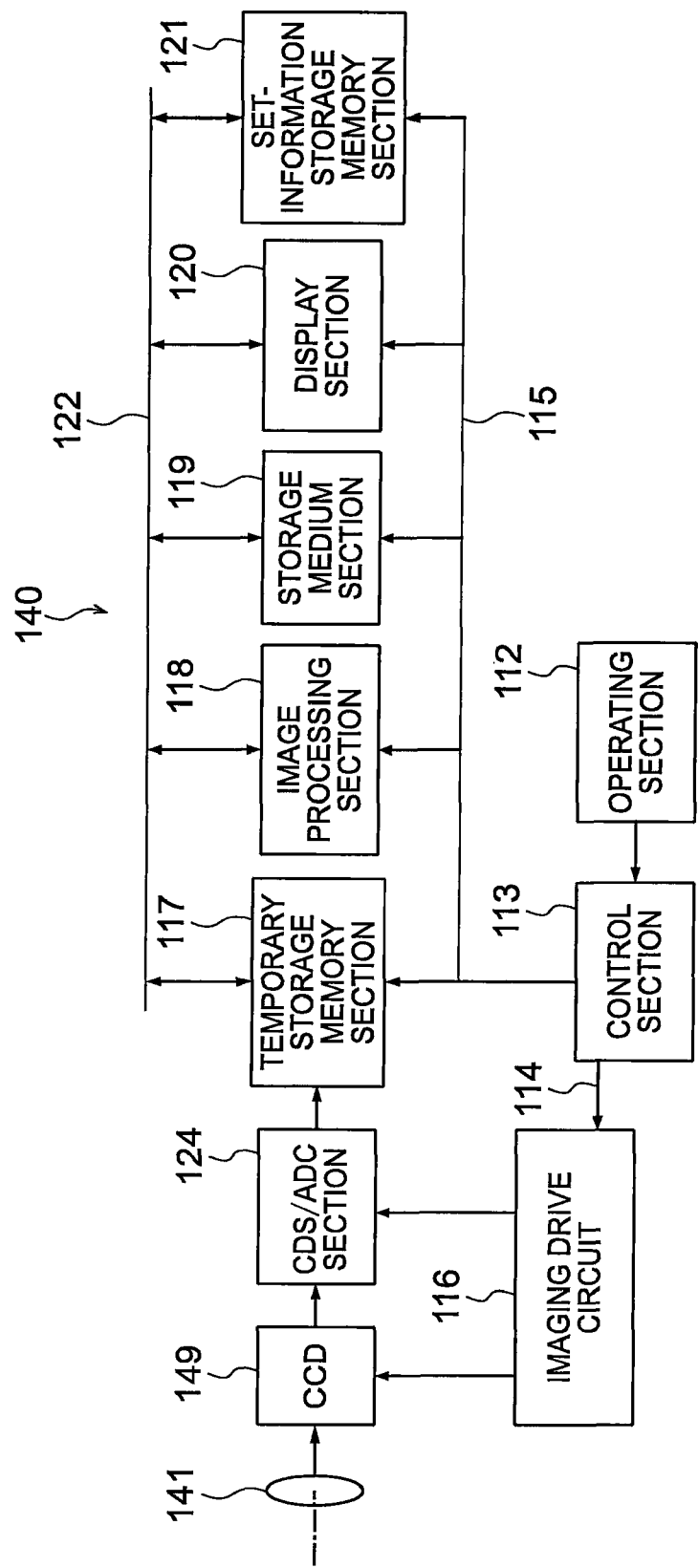
FIG. 41 is a block diagram showing the basic internal circuit configuration of the digital camera.

FIG. 38 to FIG. 40 are conceptual diagrams of a structure of a digital camera according to the present invention in which a zoom lens system described above is incorporated in a taking optical system 141. FIG. 38 is a front perspective view showing an appearance of a digital camera 140, FIG. 39 is a rear view of the same, and FIG. 40 is a schematic cross-sectional view showing a structure of the digital camera 140. In FIG. 38 and FIG. 40, show an uncollapsed state of the taking optical system 141. The digital camera 140, in a case of this example, includes the taking optical system 141 having a taking optical path 142, a finder optical system 143 having a finder optical path 144, a shutter button 145, a flash 146, a liquid-crystal display monitor 147, a focal-length changing button 161, and a setting changing switch 162 etc., and in the uncollapsed state of the taking optical system 141, by sliding a cover 160, the taking optical system 141, the finder optical system 143, and the flash 146 are covered by the cover 160. Further, when the cover 160 is opened and the digital camera is set in a photo taking state, the taking optical system 141 assumes the uncollapsed state as shown in FIG. 38, when the shutter button 145 disposed on an upper portion of the digital camera 140 is pressed, in synchronization with the pressing of the shutter button 145, a photograph is taken by the taking optical system 141 such as the zoom lens system in the first embodiment. An object image formed by the taking optical system 141 is formed on an image pickup surface of a CCD 149 via a cover glass C and a low pass filter on which a wavelength region restricting coating is applied. An object image which is received as light by the CCD 149 is displayed on the liquid-crystal display monitor 147 which is provided on a rear surface of the digital camera 140 as an electronic image, via a processing means 151. Moreover, a recording means 152 is connected to the processing means 151, and it is also possible to record the electronic image which is taken. The recording means 152 may be provided separately from the processing means 151, or may be formed by recording by writing electronically in a flexible disc, a memory card, or an MO etc. Moreover, the camera may be formed as a silver-salt camera in which a silver-salt film is disposed instead of the CCD 149.

Furthermore, a finder objective optical system 153 is disposed on the finder optical path 144. The finder objective optical system 153 consists of a plurality of lens units (three units in the diagram), and two prisms, and is made of a zoom optical system in which a focal length changes in synchronization with a zoom lens system of the taking optical system 141. An object image formed by the finder objective optical system 153 is formed on a field frame 157 of an erecting prism 155 which is an image erecting member. On a rear side of the erecting prism 155, an eyepiece optical system 159 which guides an erected image to a viewer's eyeball, is disposed. A cover member 150 is disposed on an emergence side of the eyepiece optical system 159.

Since the digital camera 140 structured in such manner has the taking optical system 141 according to the present invention, has an extremely small thickness in collapsed state, and an extremely stable imaging performance in the entire zooming region at high magnification, it is possible to realize a high-performance, a small size, and a widening of angle of field.

The zoom lens may be an interchangeable lens that can be detached from the camera body having the image pickup element.

Recently, interchangeable lens cameras not having a quick-return mirror have become popular as well as single lens reflex cameras having a quick-return mirror in the camera body. Since the zoom lenses according to the embodiments have an appropriately short back focus, they are preferred for use as interchangeable lenses for such cameras not having a quick return mirror.

(Internal Circuit Structure)

FIG. 23 is a structural block diagram of an internal circuit of main components of the digital camera 140. In the following description, the processing means 151 described above includes for instance, a CDS/ADC section 124, a temporary storage memory 117, and an image processing section 118, and a storage means 152 consists of a storage medium section 119 for example.

As shown in FIG. 23, the digital camera 140 includes an operating section 112, a control section 113 which is connected to the operating section 112, the temporary storage memory 117 and an imaging drive circuit 116 which are connected to a control-signal output port of the control section 113, via a bus 114 and a bus 115, the image processing section 118, the storage medium section 119, a display section 120, and a set-information storage memory section 121.

The temporary storage memory 117, the image processing section 118, the storage medium section 119, the display section 120, and the set-information storage memory section 121 are structured to be capable of mutually inputting and outputting data via a bus 122. Moreover, the CCD 149 and the CDS/ADC section 124 are connected to the imaging drive circuit 116.

The operating section 112 includes various input buttons and switches, and is a circuit which informs the control section, event information which is input from outside (by a user of the digital camera) via these input buttons and switches.

The control section 113 is a central processing unit (CPU), and has a built-in computer program memory which is not shown in the diagram. The control section 113 is a circuit which controls the entire digital camera 140 upon receiving instructions and commands input by the user of the camera via the operating section 112, according to a computer program stored in this computer program memory.

The CCD 149 receives as light an object image which is formed via the taking optical system 141 according to the present invention. The CCD 149 is an image pickup element which is driven and controlled by the imaging drive circuit 116, and which converts an amount of light for each pixel of the object image to an electric signal, and outputs to the CDS/ADC section 124.

The CDS/ADC section 124 is a circuit which amplifies the electric signal which is input from the CCD 149, and carries out analog/digital conversion, and outputs to the temporary storage memory 117 image raw data (Bayer data, hereinafter called as 'RAW data') which is only amplified and converted to digital data.

The temporary storage memory 117 is a buffer which includes an SDRAM (Synchronous Dynamic Random Access Memory) for example, and is a memory device which stores temporarily the RAW data which is output from the CDS/ADC section 124. The image processing section 118 is a circuit which reads the RAW data stored in the temporary storage memory 117, or the RAW data stored in the storage medium section 119, and carries out electrically various image-processing including the distortion correction, based on image-quality parameters specified by the control section 113.

The storage medium section 119 is a recording medium in the form of a card or a stick including a flash memory for instance, detachably mounted. The storage medium section 119 is a control circuit of a device in which, the RAW data transferred from the temporary storage memory 117 and image data subjected to image processing in the image processing section 118 are recorded and maintained in the card flash memory and the stick flash memory.

The display section 120 includes the liquid-crystal display monitor, and is a circuit which displays images and operation menu on the liquid-crystal display monitor. The set-information storage memory section 121 includes a ROM section in which various image quality parameters are stored in advance, and a RAM section which stores image quality parameters which are selected by an input operation on the operating section 112, from among the image quality parameters which are read from the ROM section. The set-information storage memory section 121 is a circuit which controls an input to and an output from the memories.

The digital camera 140 structured in such manner has the taking optical system 141, according to the present invention, which, while having a sufficient wide angle region, and a compact structure, has an extremely stable imaging performance in the entire magnification region at a high magnification. Therefore, it is possible to realize the high performance, the small size, and widening of the angle. Moreover, a prompt focusing operation at the wide angle side and the telephoto side is possible.

As described in the foregoing, the zoom lens according to the present invention is advantageous in achieving wide angle of view, high zoom ratio, small size, and low cost.

Furthermore, the zoom lens according to the present invention can usefully be applied to optical systems with well corrected aberrations and is suitable for use as an optical system of an image pickup apparatus having an electronic image pickup element such as a CCD or CMOS sensor.

What is claimed is:

1. A zoom lens comprising, in order from its object side:
a first lens unit having a negative refractive power; and
a second lens unit having a positive refractive power,
wherein
the first lens unit comprises a first lens having a negative refractive power and a second lens having a positive refractive power, and
the zoom lens satisfies the following conditional expressions (1), (2), and (3):

$$n_{1n} \leq 1.70 \quad (1),$$

$$n_{1p} \leq 1.70 \quad (2), \text{ and}$$

$$|v_{1n} - v_{1p}| \geq 31 \quad (3),$$

where $n_{1n}$ is the refractive index of the first lens having a negative refractive power in the first lens unit for the d-line, $v_{1n}$ is the Abbe constant of the first lens having a negative refractive power in the first lens unit, $n_{1p}$ is the refractive index of the second lens having a positive refractive power in the first lens unit for the d-line, and $v_{1p}$ is the Abbe constant of the second lens having a positive refractive power in the first lens unit, and
wherein
the zoom lens satisfies the following conditional expressions (5) and (6):

$$d_{1nw}/d_{1nc} \geq 3.0 \quad (5), \text{ and}$$

$$f_w/y \leq 1.4 \quad (6),$$

where $d_{1nw}$ is the thickness of the first lens having a negative refractive power in the first lens unit at the position at which an outermost principal ray passes through it at the wide angle end, $d_{1nc}$ is the thickness of the first lens having a negative refractive power in the first lens unit on the optical axis, and $f_w$ is the focal length of the zoom lens at the wide angle end.

2. A zoom lens comprising, in order from its object side:
a first lens unit having a negative refractive power; and
a second lens unit having a positive refractive power,
wherein
the first lens unit comprises a first lens having a negative refractive power and a second lens having a positive refractive power, and
the zoom lens satisfies the following conditional expressions (1), (2), and (3):

$$n_{1n} \leq 1.70 \quad (1),$$

$$n_{1p} \leq 1.70 \quad (2), \text{ and}$$

$$|v_{1n} - v_{1p}| \geq 31 \quad (3),$$

where $n_{1n}$ is the refractive index of the first lens having a negative refractive power in the first lens unit for the d-line, $v_{1n}$ is the Abbe constant of the first lens having a negative refractive power in the first lens unit, $n_{1p}$ is the refractive index of the second lens having a positive refractive power in the first lens unit for the d-line, and $v_{1p}$ is the Abbe constant of the second lens having a positive refractive power in the first lens unit, and
wherein
the zoom lens satisfies the following conditional expressions (9) and (10):

$$d_t/y \leq 8.5 \quad (9), \text{ and}$$

$$f_t/f_w \geq 3.0 \quad (10),$$

where $d_t$ is the overall length of the zoom lens at the telephoto end, y is the largest image height on the image plane of the zoom lens, $f_t$ is the focal length of the zoom lens at the telephoto end, and $f_w$ is the focal length of the zoom lens at the wide angle end.

3. A zoom lens comprising, in order from its object side:
a first lens unit having a negative refractive power; and
a second lens unit having a positive refractive power,
wherein
the first lens unit comprises a first lens having a negative refractive power and a second lens having a positive refractive power, and
the zoom lens satisfies the following conditional expressions (1), (2), and (3):

$$n_{1n} \leq 1.70 \quad (1),$$

$$n_{1p} \leq 1.70 \quad (2), \text{ and}$$

$$|v_{1n} - v_{1p}| \geq 31 \quad (3),$$

where $n_{1n}$ is the refractive index of the first lens having a negative refractive power in the first lens unit for the d-line, $v_{1n}$ is the Abbe constant of the first lens having a negative refractive power in the first lens unit, $n_{1p}$ is the refractive index of the second lens having a positive refractive power in the first lens unit for the d-line, and $v_{1p}$ is the Abbe constant of the second lens having a positive refractive power in the first lens unit, and
wherein
the zoom lens satisfies the following conditional expressions (11) and (10):

$$d_w/y \leq 8.1 \quad (11), \text{ and}$$

$$f_t/f_w \geq 3.0 \quad (10),$$

where $d_w$ is the overall length of the zoom lens at the wide angle end, y is the largest image height on the image plane of the zoom lens, $f_t$ is the focal length of the zoom lens at the telephoto end, and $f_w$ is the focal length of the zoom lens at the wide angle end.

4. A zoom lens comprising, in order from its object side:
a first lens unit having a negative refractive power; and
a second lens unit having a positive refractive power,
wherein
the first lens unit comprises a first lens having a negative refractive power and a second lens having a positive refractive power, and
the zoom lens satisfies the following conditional expressions (1), (2), and (3):

$$n_{1n} \leq 1.70 \quad (1),$$

$$n_{1p} \leq 1.70 \quad (2), \text{ and}$$

$$|v_{1n} - v_{1p}| \geq 31 \quad (3),$$

where $n_{1n}$ is the refractive index of the first lens having a negative refractive power in the first lens unit for the d-line, $v_{1n}$ is the Abbe constant of the first lens having a negative refractive power in the first lens unit, $n_{1p}$ is the refractive index of the second lens having a positive refractive power in the first lens unit for the d-line, and $v_{1p}$ is the Abbe constant of the second lens having a positive refractive power in the first lens unit, and
wherein
all the lenses constituting the zoom lens each has a refractive index not larger than 1.7.

5. A zoom lens comprising, in order from its object side:
a first lens unit having a negative refractive power; and
a second lens unit having a positive refractive power,
wherein
the first lens unit comprises a first lens having a negative refractive power and a second lens having a positive refractive power, and
the zoom lens satisfies the following conditional expressions (1), (2), and (3):

$$n_{1n} \leq 1.70 \qquad (1),$$

$$n_{1p} \leq 1.70 \qquad (2), \text{and}$$

$$|\nu_{1n} - \nu_{1p}| \geq 31 \qquad (3),$$

where $n_{1n}$ is the refractive index of the first lens having a negative refractive power in the first lens unit for the d-line, $\nu_{1n}$ is the Abbe constant of the first lens having a negative refractive power in the first lens unit, $n_{1p}$ is the refractive index of the second lens having a positive refractive power in the first lens unit for the d-line, and $\nu_{1p}$ is the Abbe constant of the second lens having a positive refractive power in the first lens unit, and
wherein
the zoom lens satisfies the following conditional expression (12):

$$\Sigma d_{2G}/(y \tan(2\omega)) \leq 0.35 \qquad (12),$$

where $\Sigma d_{2G}$ is the overall length of the second lens unit, and y is the largest image height on the image plane of the zoom lens, and w is the half angle of view of the zoom lens at the wide angle end.

6. A zoom lens comprising, in order from its object side:
a first lens unit having a negative refractive power; and
a second lens unit having a positive refractive power
wherein
the first lens unit comprises a first lens having a negative refractive power and a second lens having a positive refractive power, and
the zoom lens satisfies the following conditional expressions (1), (2), and (3):

$$n_{1n} \leq 1.70 \qquad (1),$$

$$n_{1p} \leq 1.70 \qquad (2), \text{and}$$

$$|\nu_{1n} - \nu_{1p}| \geq 31 \qquad (3),$$

where $n_{1n}$ is the refractive index of the first lens having a negative refractive power in the first lens unit for the d-line, $\nu_{1n}$ is the Abbe constant of the first lens having a negative refractive power in the first lens unit, $n_{1p}$ is the refractive index of the second lens having a positive refractive power in the first lens unit for the d-line, and $\nu_{1p}$ is the Abbe constant of the second lens having a positive refractive power in the first lens unit, and
wherein
the zoom lens satisfies the following conditional expression (13):

$$|f_{air}|/|f_{1G}| \geq 15 \qquad (13),$$

where $f_{air}$ is the focal length of an air lens formed between the first lens and the second lens, and $f_{1G}$ is the focal length of the first lens unit.

7. A zoom lens comprising, in order from its object side:
a first lens unit having a negative refractive power; and
a second lens unit having a positive refractive power,
wherein
the first lens unit comprises a first lens having a negative refractive power and a second lens having a positive refractive power, and
the zoom lens satisfies the following conditional expressions (1), (2), and (3):

$$n_{1n} \leq 1.70 \qquad (1),$$

$$n_{1p} \leq 1.70 \qquad (2), \text{and}$$

$$|\nu_{1n} - \nu_{1p}| \geq 31 \qquad (3),$$

where $n_{1n}$ is the refractive index of the first lens having a negative refractive power in the first lens unit for the d-line, $\nu_{1n}$ is the Abbe constant of the first lens having a negative refractive power in the first lens unit, $n_{1p}$ is the refractive index of the second lens having a positive refractive power in the first lens unit for the d-line, and $\nu_{1p}$ is the Abbe constant of the second lens having a positive refractive power in the first lens unit, and
wherein
the zoom lens satisfies the following conditional expression (14):

$$d_t/(y \tan(2\omega)) \leq 1.7 \qquad (14),$$

where $d_t$ is the overall length of the zoom lens at the telephoto end, y is the largest image height on the image plane of the zoom lens, and $\omega$ is the half angle of view of the zoom lens at the wide angle end.

8. A zoom lens comprising, in order from its object side:
a first lens unit having a negative refractive power; and
a second lens unit having a positive refractive power,
wherein
the first lens unit comprises a first lens having a negative refractive power and a second lens having a positive refractive power, and
the zoom lens satisfies the following conditional expressions (1), (2), and (3):

$$n_{1n} \leq 1.70 \qquad (1),$$

$$n_{1p} \leq 1.70 \qquad (2), \text{and}$$

$$|\nu_{1n} - \nu_{1p}| \geq 31 \qquad (3),$$

where $n_{1n}$ is the refractive index of the first lens having a negative refractive power in the first lens unit for the d-line, $\nu_{1n}$ is the Abbe constant of the first lens having a negative refractive power in the first lens unit, $n_{1p}$ is the refractive index of the second lens having a positive refractive power in the first lens unit for the d-line, and $\nu_{1p}$ is the Abbe constant of the second lens having a positive refractive power in the first lens unit, and
wherein
the zoom lens satisfies the following conditional expression (15):

$$d_w/(y \tan(2\omega)) \leq 1.7 \qquad (15),$$

where $d_w$ is the overall length of the zoom lens at the wide angle end, y is the largest image height on the image plane of the zoom lens, and $\omega$ is the half angle of view of the zoom lens at the wide angle end.

9. A zoom lens comprising, in order from its object side:
a first lens unit having a negative refractive power; and
a second lens unit having a positive refractive power,
wherein
the first lens unit comprises a first lens having a negative refractive power and a second lens having a positive refractive power, and
the zoom lens satisfies the following conditional expressions (1), (2), and (3):

$$n_{1n} \leq 1.70 \quad (1),$$

$$n_{1p} \leq 1.70 \quad (2), \text{ and}$$

$$|v_{1n} - v_{1p}| \geq 31 \quad (3),$$

where $n_{1n}$ is the refractive index of the first lens having a negative refractive power in the first lens unit for the d-line, $v_{1n}$ is the Abbe constant of the first lens having a negative refractive power in the first lens unit, $n_{1p}$ is the refractive index of the second lens having a positive refractive power in the first lens unit for the d-line, and $v_{1p}$ is the Abbe constant of the second lens having a positive refractive power in the first lens unit, and
wherein
the zoom lens satisfies the following conditional expression (16):

$$d_{w3i} \tan(2\omega)/y \geq 5 \quad (16),$$

where $d_{w3i}$ is the air distance between the image side surface of the third lens unit and the image plane at the wide angle end, $\omega$ is the half angle of view of the zoom lens at the wide angle end, and y is the largest image height on the image plane of the zoom lens.

10. A zoom lens comprising, in order from the object side:
a first lens unit having a negative refractive power;
a second lens unit having a positive refractive power; and
a field lens having no refractive power disposed closest to the image side, wherein
the first lens unit comprises a first lens having a negative refractive power and a second lens having a positive refractive power, and
the zoom lens satisfies the following conditional expressions (1), (2), and (3):

$$n_{1n} \leq 1.70 \quad (1),$$

$$n_{1p} \leq 1.70 \quad (2), \text{ and}$$

$$|v_{1n} - v_{1p}| \geq 31 \quad (3),$$

where $n_{1n}$ is the refractive index of the first lens having a negative refractive power in the first lens unit for the d-line, $v_{1n}$ is the Abbe constant of the first lens having a negative refractive power in the first lens unit, $n_{1p}$ is the refractive index of the second lens having a positive refractive power in the first lens unit for the d-line, and $v_{1p}$ is the Abbe constant of the second lens having a positive refractive power in the first lens unit, and
wherein
the zoom lens satisfies the following conditional expression (4A):

$$\Sigma d_{1G}/(y \tan(\omega)) \leq 1.5 \quad (4A),$$

where $\Sigma d_{1G}$ is the overall length of the first lens unit, y is the largest image height on the image plane of the zoom lens, and $\omega$ is the half angle of view of the zoom lens at the wide angle end.

11. An image pickup apparatus comprising:
a zoom lens according to claim 10; and
an image pickup element that is disposed on the image side of the zoom lens and converts an optical image formed by the zoom lens into an electrical signal,
wherein
the field lens moves integrally with the image pickup element.

12. A zoom lens comprising, in order from the object side:
a first lens unit having a negative refractive power;
a second lens unit having a positive refractive power; and
a field lens having no refractive power disposed closest to the image side, wherein
the first lens unit comprises a first lens having a negative refractive power and a second lens having a positive refractive power, and
the zoom lens satisfies the following conditional expressions (1), (2), and (3):

$$n_{1n} \leq 1.70 \quad (1),$$

$$n_{1p} \leq 1.70 \quad (2), \text{ and}$$

$$|v_{1n} - v_{1p}| \geq 31 \quad (3),$$

where $n_{1n}$ is the refractive index of the first lens having a negative refractive power in the first lens unit for the d-line, $v_{1n}$ is the Abbe constant of the first lens having a negative refractive power in the first lens unit, $n_{1p}$ is the refractive index of the second lens having a positive refractive power in the first lens unit for the d-line, and $v_{1p}$ is the Abbe constant of the second lens having a positive refractive power in the first lens unit, and
wherein
the zoom lens satisfies the following conditional expressions (5) and (6A):

$$d_{1nw}/d_{1nc} \geq 3.0 \quad (5), \text{ and}$$

$$f_w/y \leq 1.5 \quad (6A),$$

where $d_{1nw}$ is the thickness of the first lens having a negative refractive power in the first lens unit at the position at which an outermost principal ray passes through it at the wide angle end, $d_{1nc}$ is the thickness of the first lens having a negative refractive power in the first lens unit on the optical axis, $f_w$ is the focal length of the zoom lens at the wide angle end, and y is the largest image height on the image plane of the zoom lens.

13. A zoom lens comprising, in order from the object side:
a first lens unit having a negative refractive power;
a second lens unit having a positive refractive power; and
a field lens having no refractive power disposed closest to the image side, wherein
the first lens unit comprises a first lens having a negative refractive power and a second lens having a positive refractive power, and
the zoom lens satisfies the following conditional expressions (1), (2), and (3):

$$n_{1n} \leq 1.70 \quad (1),$$

$$n_{1p} \leq 1.70 \quad (2), \text{ and}$$

$$|v_{1n} - v_{1p}| \geq 31 \quad (3),$$

where $n_{1n}$ is the refractive index of the first lens having a negative refractive power in the first lens unit for the d-line, $v_{1n}$ is the Abbe constant of the first lens having a negative refractive power in the first lens unit, $n_{1p}$ is the refractive index of the second lens having a positive refractive power in the first lens unit for the d-line, and $v_{1p}$ is the Abbe constant of the second lens having a positive refractive power in the first lens unit, and wherein the zoom lens satisfies the following conditional expressions (9A) and (10):

$$d_t/y \leq 8.6 \quad (9A), \text{ and}$$

$$f_t/f_w \geq 3.0 \quad (10),$$

where $d_t$ is the overall length of the zoom lens at the telephoto end, y is the largest image height on the image plane of the zoom lens, $f_t$ is the focal length of the zoom lens at the telephoto end, and $f_w$ is the focal length of the zoom lens at the wide angle end.

14. A zoom lens comprising, in order from the object side:
a first lens unit having a negative refractive power;
a second lens unit having a positive refractive power; and
a field lens having no refractive power disposed closest to the image side, wherein
the first lens unit comprises a first lens having a negative refractive power and a second lens having a positive refractive power, and
the zoom lens satisfies the following conditional expressions (1), (2), and (3):

$$n_{1n} \leq 1.70 \quad (1),$$

$$n_{1p} \leq 1.70 \quad (2), \text{ and}$$

$$|v_{1n} - v_{1p}| \geq 31 \quad (3),$$

where $n_{1n}$ is the refractive index of the first lens having a negative refractive power in the first lens unit for the d-line, $v_{1n}$ is the Abbe constant of the first lens having a negative refractive power in the first lens unit, $n_{1p}$ is the refractive index of the second lens having a positive refractive power in the first lens unit for the d-line, and $v_{1p}$ is the Abbe constant of the second lens having a positive refractive power in the first lens unit, and wherein the zoom lens satisfies the following conditional expressions (10) and (11A):

$$f_t/f_w \geq 3.0 \quad (10), \text{ and}$$

$$d_w/y \leq 8.2 \quad (11A), \text{ and}$$

where $f_t$ is the focal length of the zoom lens at the telephoto end, $f_w$ is the focal length of the zoom lens at the wide angle end, $d_w$ is the overall length of the zoom lens at the wide angle end, and y is the largest image height on the image plane of the zoom lens.

15. A zoom lens comprising, in order from the object side:
a first lens unit having a negative refractive power;
a second lens unit having a positive refractive power; and
a field lens having no refractive power disposed closest to the image side, wherein
the first lens unit comprises a first lens having a negative refractive power and a second lens having a positive refractive power, and
the zoom lens satisfies the following conditional expressions (1), (2), and (3):

$$n_{1n} \leq 1.70 \quad (1),$$

$$n_{1p} \leq 1.70 \quad (2), \text{ and}$$

$$|v_{1n} - v_{1p}| \geq 31 \quad (3),$$

where $n_{1n}$ is the refractive index of the first lens having a negative refractive power in the first lens unit for the d-line, $v_{1n}$ is the Abbe constant of the first lens having a negative refractive power in the first lens unit, $n_{1p}$ is the refractive index of the second lens having a positive refractive power in the first lens unit for the d-line, and $v_{1p}$ is the Abbe constant of the second lens having a positive refractive power in the first lens unit, and wherein all the lenses constituting the zoom lens each has a refractive index not larger than 1.7.

16. A zoom lens comprising, in order from the object side:
a first lens unit having a negative refractive power;
a second lens unit having a positive refractive power; and
a field lens having no refractive power disposed closest to the image side, wherein
the first lens unit comprises a first lens having a negative refractive power and a second lens having a positive refractive power, and
the zoom lens satisfies the following conditional expressions (1), (2), and (3):

$$n_{1n} \leq 1.70 \quad (1),$$

$$n_{1p} \leq 1.70 \quad (2), \text{ and}$$

$$|v_{1n} - v_{1p}| \geq 31 \quad (3),$$

where $n_{1n}$ is the refractive index of the first lens having a negative refractive power in the first lens unit for the d-line, $v_{1n}$ is the Abbe constant of the first lens having a negative refractive power in the first lens unit, $n_{1p}$ is the refractive index of the second lens having a positive refractive power in the first lens unit for the d-line, and $v_{1p}$ is the Abbe constant of the second lens having a positive refractive power in the first lens unit, and wherein the zoom lens satisfies the following conditional expression (12A):

$$\Sigma d_{2G}/(y \tan(\omega)) \leq 1.5 \quad (12A),$$

where $\Sigma d_{2G}$ is the overall length of the second lens unit, y is the largest image height on the image plane of the zoom lens, and $\omega$ is the half angle of view of the zoom lens at the wide angle end.

17. A zoom lens comprising, in order from the object side:
a first lens unit having a negative refractive power;
a second lens unit having a positive refractive power; and
a field lens having no refractive power disposed closest to the image side, wherein
the first lens unit comprises a first lens having a negative refractive power and a second lens having a positive refractive power, and
the zoom lens satisfies the following conditional expressions (1), (2), and (3):

$$n_{1n} \leq 1.70 \quad (1),$$

$$n_{1p} \leq 1.70 \quad (2), \text{ and}$$

$$|v_{1n} - v_{1p}| \geq 31 \quad (3),$$

where $n_{1n}$ is the refractive index of the first lens having a negative refractive power in the first lens unit for the d-line, $v_{1n}$ is the Abbe constant of the first lens having a negative refractive power in the first lens unit, $n_{1p}$ is the refractive index of the second lens having a positive refractive power in the first lens unit for the d-line, and $v_{1p}$ is the Abbe constant of the second lens having a positive refractive power in the first lens unit, and wherein
the zoom lens satisfies the following conditional expression (13A):

$$|f_{air}|/|f_{1G}| \geq 3 \quad (13A),$$

where $f_{air}$ is the focal length of an air lens formed between the first lens and the second lens, and $f_{1G}$ is the focal length of the first lens unit.

18. A zoom lens comprising, in order from its object side:
a first lens unit having a negative refractive power; and
a second lens unit having a positive refractive power,
wherein
the first lens unit comprises a first lens having a negative refractive power and a second lens having a positive refractive power, and
the zoom lens satisfies the following conditional expressions (1), (2), and (3):

$$n_{1n} \leq 1.70 \quad (1),$$

$$n_{1p} \leq 1.70 \quad (2), \text{ and}$$

$$|v_{1n} - v_{1p}| \geq 31 \quad (3),$$

where $n_{1n}$ is the refractive index of the first lens having a negative refractive power in the first lens unit for the d-line, $v_{1n}$ is the Abbe constant of the first lens having a negative refractive power in the first lens unit, $n_{1p}$ is the refractive index of the second lens having a positive refractive power in the first lens unit for the d-line, and $v_{1p}$ is the Abbe constant of the second lens having a positive refractive power in the first lens unit, and
wherein
the zoom lens satisfies the following conditional expression (14A):

$$d_t/(y \tan(\omega)) \leq 12 \quad (14A),$$

where $d_t$ is the overall length of the zoom lens at the telephoto end, y is the largest image height on the image plane of the zoom lens, and $\omega$ is the half angle of view of the zoom lens at the wide angle end.

19. A zoom lens comprising, in order from the object side:
a first lens unit having a negative refractive power;
a second lens unit having a positive refractive power; and
a field lens having no refractive power disposed closest to the image side, wherein
the first lens unit comprises a first lens having a negative refractive power and a second lens having a positive refractive power, and
the zoom lens satisfies the following conditional expressions (1), (2), and (3):

$$n_{1n} \leq 1.70 \quad (1),$$

$$n_{1p} \leq 1.70 \quad (2), \text{ and}$$

$$|v_{1n} - v_{1p}| \geq 31 \quad (3),$$

where $n_{1n}$ is the refractive index of the first lens havin a negative refractive power in the first lens unit for the d-line, $v_{1n}$ is the Abbe constant of the first lens having a negative refractive power in the first lens unit, $n_{1p}$ is the refractive index of the second lens having a positive refractive power in the first lens unit for the d-line, and $v_{1p}$ is the Abbe constant of the second lens having a positive refractive power in the first lens unit, and
wherein
the zoom lens satisfies the following conditional expression (15A):

$$d_w/(y \tan(\omega)) \leq 12 \quad (15A),$$

where $d_w$ is the overall length of the zoom lens at the wide angle end, y is the largest image height on the image plane of the zoom lens, and w is the half angle of view of the zoom lens at the wide angle end.

20. A zoom lens comprising, in order from the object side:
a first lens unit having a negative refractive power;
a second lens unit having a positive refractive power;
a third lens unit having a positive refractive power; and
a field lens having no refractive power disposed closest to the image side, wherein
the first lens unit comprises a first lens having a negative refractive power and a second lens having a positive refractive power, and
the zoom lens satisfies the following conditional expressions (1), (2), and (3):

$$n_{1n} \leq 1.70 \quad (1),$$

$$n_{1p} \leq 1.70 \quad (2), \text{ and}$$

$$|v_{1n} - v_{1p}| \geq 31 \quad (3),$$

where $n_{1n}$ is the refractive index of the first lens having a negative refractive power in the first lens unit for the d-line, $v_{1n}$ is the Abbe constant of the first lens having a negative refractive power in the first lens unit, $n_{1p}$ is the refractive index of the second lens having a positive refractive power in the first lens unit for the d-line, and $v_{1p}$ is the Abbe constant of the second lens having a positive refractive power in the first lens unit, and
wherein
the zoom lens satisfies the following conditional expression (16A):

$$d_{w3i} \tan(\omega)/y \geq 0.9 \quad (16A),$$

where $d_{w3i}$ is the air distance between the image side surface of the third lens unit and the image plane at the wide angle end, y is the largest image height on the image plane of the zoom lens, and $\omega$ is the half angle of view of the zoom lens at the wide angle end.

21. An image pickup apparatus comprising:
a zoom lens according to claim 20; and
an image pickup element that is disposed on the image side of the zoom lens and converts an optical image formed by the zoom lens into an electrical signal,
wherein
the field lens moves integrally with the image pickup element.

22. A zoom lens comprising, in order from the object side:
a first lens unit having a negative refractive power;
a second lens unit having a positive refractive power;
a third lens unit having a positive refractive power; and
a field lens having no refractive power disposed closest to the image side, wherein
the first lens unit comprises a first lens having a negative refractive power and a second lens having a positive refractive power, and
the zoom lens satisfies the following conditional expressions (1), (2), and (3):

$$n_{1n} \leq 1.70 \quad (1),$$

$$n_{1p} \leq 1.70 \quad (2), \text{ and}$$

$$|v_{1n} - v_{1p}| \geq 31 \quad (3),$$

where $n_{1n}$ is the refractive index of the first lens having a negative refractive power in the first lens unit for the d-line, $v_{1n}$ is the Abbe constant of the first lens having a negative refractive power in the first lens unit, $n_{1p}$ is the refractive index of the second lens having a positive refractive power in the first lens unit for the d-line, and $v_{1p}$ is the Abbe constant of the second lens having a positive refractive power in the first lens unit, and wherein the zoom lens satisfies the following conditional expression (17):

$$0.2 \leq R_{3r}/R_{4f} \leq 1.2 \tag{17},$$

where $R_{3r}$ is the paraxial radius of curvature of the lens surface closest to the image side in the third lens unit, and $R_{4f}$ is the radius of curvature of the lens surface closest to the object side of the field lens.

23. A zoom lens comprising, in order from the object side:
a first lens unit having a negative refractive power;
a second lens unit having a positive refractive power; and
a field lens having no refractive power disposed closest to the image side, wherein
the first lens unit comprises a first lens having a negative refractive power and a second lens having a positive refractive power, and
the zoom lens satisfies the following conditional expressions (1), (2), and (3):

$$n_{1n} \leq 1.70 \tag{1},$$

$$n_{1p} \leq 1.70 \tag{2), and}$$

$$|v_{1n} - v_{1p}| \geq 31 \tag{3},$$

where $n_{1n}$ is the refractive index of the first lens having a negative refractive power in the first lens unit for the d-line, $v_{1n}$ is the Abbe constant of the first lens having a negative refractive power in the first lens unit, $n_{1p}$ is the refractive index of the second lens having a positive refractive power in the first lens unit for the d-line, and $v_{1p}$ is the Abbe constant of the second lens having a positive refractive power in the first lens unit, and wherein at least one of the lens surfaces of the field lens is an aspheric surface, the aspheric surface in the field lens is shaped in such a way that the deviation of the aspheric surface from the paraxial spherical surface along the direction of the optical axis monotonically increases or monotonically decreases from the center of the lens toward its periphery, and
the zoom lens satisfies the following conditional expressions (18) and (19):

$$|d(f(h))/dh| \leq 0.2 \tag{18), and}$$

$$|f_{f1}/f_w| \geq 100 \tag{19},$$

where $f_{f1}$ is the focal length of the field lens, $f_w$ is the focal length of the zoom lens at the wide angle end, f(h) is the amount of deviation at a position in the range from the central optical axis (h=0) to the position at which the outermost principal ray passes at the telephoto end, and f(h) is expressed by equation (B) presented below in the coordinate system with a z-axis taken along the optical axis and an h-axis taken along a direction perpendicular to the optical axis when the shape of the aspheric surface is expressed by equation (A) presented below:

$$z = h^2/R/[1 + \{1-(1+k)h^2/R^2\}^{1/2}] + A_4h^4 + A_6h^6 + A_8h^8 + A_{10}h^{10} + \ldots \tag{A},$$

$$f(h) = z - h^2/R/[1 + \{1-h^2/R^2\}^{1/2}] \tag{B}$$

where R is the radius of curvature of the spherical component on the optical axis, k is a conic constant, $A_4, A_6, A_8, A_{10}, \ldots$ are aspheric coefficients, d(f(h))/dh is the first derivative of f(h), f(h) is positive when the deviation is toward the image side, and f(h)=0 on the central optical axis.

24. A zoom lens comprising, in order from the object side:
a first lens unit having a negative refractive power;
a second lens unit having a positive refractive power; and
a field lens having no refractive power disposed closest to the image side, wherein
the first lens unit comprises a first lens having a negative refractive power and a second lens having a positive refractive power, and
the zoom lens satisfies the following conditional expressions (1), (2), and (3):

$$n_{1n} \leq 1.70 \tag{1},$$

$$n_{1p} \leq 1.70 \tag{2), and}$$

$$|v_{1n} - v_{1p}| \geq 31 \tag{3},$$

where $n_{1n}$ is the refractive index of the first lens having a negative refractive power in the first lens unit for the d-line, $v_{1n}$ is the Abbe constant of the first lens having a negative refractive power in the first lens unit, $n_{1p}$ is the refractive index of the second lens having a positive refractive power in the first lens unit for the d-line, and $v_{1p}$ is the Abbe constant of the second lens having a positive refractive power in the first lens unit, and wherein at least one of the lens surfaces of the field lens is an aspheric surface,
the aspheric surface in the field lens is shaped in such a way that the deviation of the aspheric surface from the paraxial spherical surface along the direction of the optical axis monotonically increases or monotonically decreases from the center of the lens toward its periphery, and
the zoom lens satisfies the following conditional expressions (19) and (20):

$$|f_{f1}/f_w| \geq 100 \tag{19), and}$$

$$0 \leq d(f(h))/dh \leq 0.2 \tag{20},$$

where $f_{f1}$ is the focal length of the field lens, $f_w$ is the focal length of the zoom lens at the wide angle end, f(h) is the amount of deviation at a position in the range from the central optical axis (h=0) to the position at which the outermost principal ray passes at the telephoto end, and f(h) is expressed by equation (B) presented below in the coordinate system with a z-axis taken along the optical axis and an h-axis taken along a direction perpendicular to the optical axis when the shape of the aspheric surface is expressed by equation (A) presented below:

$$z = h^2/R/[1 + \{1-(1+k)h^2/R^2\}^{1/2}] + A_4h^4 + A_6h^6 + A_8h^8 + A_{10}h^{10} + \ldots \tag{A},$$

$$f(h) = z - h^2/R/[1 + \{1-h^2/R^2\}^{1/2}] \tag{B}$$

where R is the radius of curvature of the spherical component on the optical axis, k is a conic constant, $A_4, A_6, A_8, A_{10}, \ldots$ are aspheric coefficients, d(f(h))/dh is the first derivative of f(h), f(h) is positive when the deviation is toward the image side, and f(h)=0 on the central optical axis.

25. A zoom lens comprising, in order from the object side:
a first lens unit having a negative refractive power;
a second lens unit having a positive refractive power; and
a field lens having no refractive power disposed closest to the image side, wherein the first lens unit comprises a first lens having a negative refractive power and a second lens having a positive refractive power, and the zoom lens satisfies the following conditional expressions (1), (2), and (3):

$$n_{1n} \leq 1.70 \tag{1},$$

$$n_{1p} \leq 1.70 \tag{2), and}$$

$$|\nu_{1n} - \nu_{1p}| \geq 31 \tag{3},$$

where $n_{1n}$ is the refractive index of the first lens having a negative refractive power in the first lens unit for the d-line, $\nu_{1n}$ is the Abbe constant of the first lens having a negative refractive power in the first lens unit, $n_{1p}$ is the refractive index of the second lens having a positive refractive power in the first lens unit for the d-line, and $\nu_{1p}$ is the Abbe constant of the second lens having a positive refractive power in the first lens unit, and wherein at least one of the lens surfaces of the field lens is an aspheric surface, the aspheric surface in the field lens is shaped in such a way that the deviation of the aspheric surface from the paraxial spherical surface along the direction of the optical axis monotonically increases or monotonically decreases from the center of the lens toward its periphery, and the zoom lens satisfies the following conditional expressions (19) and (21):

$$|f_{f1}/f_w| \geq 100 \tag{19), and}$$

$$-0.2 \leq d(f(h))/dh \leq 0 \tag{21},$$

where $f_{f1}$ is the focal length of the field lens, $f_w$ is the focal length of the zoom lens at the wide angle end, f(h) is the amount of deviation at a position in the range from the central optical axis (h=0) to the position at which the outermost principal ray passes at the telephoto end, and f(h) is expressed by equation (B) presented below in the coordinate system with a z-axis taken along the optical axis and an h-axis taken along a direction perpendicular to the optical axis when the shape of the aspheric surface is expressed by equation (A) presented below:

$$z = h^2/R[1+\{1-(1+k)h^2/R^2\}^{1/2}] + A_4h^4 + A_6h^6 + A_8h^8 + A_{10}h^{10} + \ldots \tag{A},$$

$$f(h) = z - h^2/R[1+\{1-h^2/R^2\}^{1/2}] \tag{B}$$

where R is the radius of curvature of the spherical component on the optical axis, k is a conic constant, $A_4, A_6, A_8, A_{10}, \ldots$ are aspheric coefficients, d(f(h))/dh is the first derivative of f(h), f(h) is positive when the deviation is toward the image side, and f(h)=0 on the central optical axis.

26. A zoom lens comprising, in order from the object side:
a first lens unit having a negative refractive power;
a second lens unit having a positive refractive power; and
a field lens having no refractive power disposed closest to the image side, wherein the first lens unit comprises a first lens having a negative refractive power and a second lens having a positive refractive power, and the zoom lens satisfies the following conditional expressions (1), (2), and (3):

$$z = h^2/R[1+\{1-(1+k)h^2/R^2\}^{1/2}] + A_4h^4 + A_6h^6 + A_8h^8 + A_{10}h^{10} + \ldots \tag{A},$$

$$f(h) = z - h^2/R[1+\{1-h^2/R^2\}^{1/2}] \tag{B}$$

where $n_{1n}$ is the refractive index of the first lens having a negative refractive power in the first lens unit for the d-line, $\nu_{1n}$ is the Abbe constant of the first lens having a negative refractive power in the first lens unit, $n_{1p}$ is the refractive index of the second lens having a positive refractive power in the first lens unit for the d-line, and $\nu_{1p}$ is the Abbe constant of the second lens having a positive refractive power in the first lens unit, and wherein at least one of the lens surfaces of the field lens is an aspheric surface, the aspheric surface in the field lens is shaped in such a way that the deviation of the aspheric surface from the paraxial spherical surface along the direction of the optical axis monotonically increases or monotonically decreases from the center of the lens toward its periphery, and the zoom lens satisfies the following conditional expressions (19) and (22):

$$|f_{f1}/f_w| \geq 100 \tag{19), and}$$

$$|f(h)/y| \leq 0.1 \tag{22},$$

where $f_{f1}$ is the focal length of the field lens, $f_w$ is the focal length of the zoom lens at the wide angle end, f(h) is the amount of deviation at a position in the range from the central optical axis (h=0) to the position at which the outermost principal ray passes at the telephoto end, and f(h) is expressed by equation (B) presented below in the coordinate system with a z-axis taken along the optical axis and an h-axis taken along a direction perpendicular to the optical axis when the shape of the aspheric surface is expressed by equation (A) presented below:

$$z = h^2/R[1+\{1-(1+k)h^2/R^2\}^{1/2}] + A_4h^4 + A_6h^6 + A_8h^8 + A_{10}h^{10} + \ldots \tag{A},$$

$$f(h) = z - h^2/R[1+\{1-h^2/R^2\}^{1/2}] \tag{B}$$

where R is the radius of curvature of the spherical component on the optical axis, k is a conic constant, $A_4, A_6, A_8, A_{10}, \ldots$ are aspheric coefficients, f(h) is positive when the deviation is toward the image side, y is the largest image height on the image plane of the zoom lens, and f(h)=0 on the central optical axis.

* * * * *